United States Patent
Koneru et al.

(10) Patent No.: US 10,437,637 B1
(45) Date of Patent: Oct. 8, 2019

(54) CONFIGURABLE SCHEDULER FOR GRAPH PROCESSING ON MULTI-PROCESSOR COMPUTING SYSTEMS

(71) Applicant: Think CI Inc., El Dorado Hills, CA (US)

(72) Inventors: Satyaki Koneru, Folsom, CA (US); Val G Cook, Shingle Springs, CA (US); Ke Yin, El Dorado Hills, CA (US)

(73) Assignee: Thin CI, Inc., El Dorado Hills, CA (US)

( * ) Notice: Subject to any disclaimer, the term of this patent is extended or adjusted under 35 U.S.C. 154(b) by 68 days.

(21) Appl. No.: 15/164,848

(22) Filed: May 25, 2016

Related U.S. Application Data

(60) Provisional application No. 62/166,507, filed on May 26, 2015.

(51) Int. Cl.
  *G06F 9/48* (2006.01)
  *G06F 8/41* (2018.01)

(52) U.S. Cl.
  CPC .............. *G06F 9/4881* (2013.01); *G06F 8/44* (2013.01)

(58) Field of Classification Search
  CPC ................................. G06F 9/4881; G06F 8/44
  See application file for complete search history.

(56) References Cited

U.S. PATENT DOCUMENTS

| | | | |
|---|---|---|---|
| 8,094,158 B1* | 1/2012 | Allen | G06T 1/20 345/535 |
| 2011/0289507 A1* | 11/2011 | Khan | G06F 8/451 718/104 |
| 2013/0036409 A1* | 2/2013 | Auerbach | G06F 8/456 717/140 |
| 2014/0130023 A1* | 5/2014 | Chen | G06F 8/451 717/140 |
| 2014/0176588 A1* | 6/2014 | Duluk, Jr. | G09G 5/001 345/541 |

* cited by examiner

*Primary Examiner* — Lewis A Bullock, Jr.
*Assistant Examiner* — Kevin X Lu
(74) *Attorney, Agent, or Firm* — Brian R. Short

(57) ABSTRACT

Systems and methods are disclosures for scheduling code in a multiprocessor system. Code is portioned into code blocks by a compiler. The compiler schedules execution of code blocks in nodes. The nodes are connected in a directed acyclical graph with a top node, terminal node and a plurality of intermediate nodes. Execution of the top node is initiated by the compiler. After executing at least one instance of the top node, an instruction in the code block indicates to the scheduler to initiate at least one intermediary node. The scheduler schedules a thread for execution of the intermediary node. The data for the nodes resides in a plurality of data buffers; the index to the data buffer is stored in a command buffer.

23 Claims, 39 Drawing Sheets

FIGURE 8a
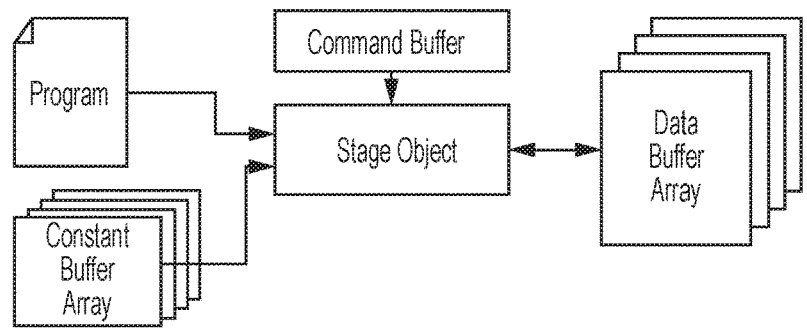
FIGURE 8b
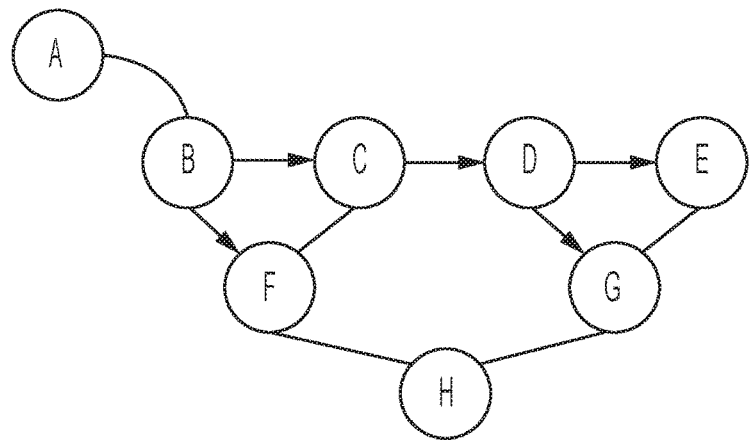
FIGURE 8c

| | |
|---|---|
| GL_NEVER | GL_NEVER |
| GL_LESS | GL_LEQUAL |
| GL_EQUAL | GL_EQUAL |
| GL_LEQUAL | GL_LEQUAL |
| GL_GREATER | GL_GEQUAL |
| GL_NOTEQUAL | GL_EQUAL |
| GL_GEQUAL | GL_GEQUAL |
| GL_ALWAYS | GL_ALWAYS |

FIGURE 15

| | |
|---|---|
| GL_NEVER | GL_NEVER |
| GL_LESS | GL_LEQUAL |
| GL_EQUAL | GL_EQUAL |
| GL_LEQUAL | GL_LEQUAL |
| GL_GREATER | GL_GEQUAL |
| GL_NOTEQUAL | GL_EQUAL |
| GL_GEQUAL | GL_GEQUAL |
| GL_ALWAYS | GL_ALWAYS |

FIGURE 16

| | |
|---|---|
| GL_NEVER | GL_NEVER |
| GL_LESS | GL_LEQUAL |
| GL_EQUAL | GL_EQUAL |
| GL_LEQUAL | GL_LEQUAL |
| GL_GREATER | GL_GEQUAL |
| GL_NOTEQUAL | GL_EQUAL |
| GL_GEQUAL | GL_GEQUAL |
| GL_ALWAYS | GL_ALWAYS |

| | |
|---|---|
| GL_NEVER | GL_NEVER |
| GL_LESS | GL_LEQUAL |
| GL_EQUAL | GL_EQUAL |
| GL_LEQUAL | GL_LEQUAL |
| GL_GREATER | GL_GEQUAL |
| GL_NOTEQUAL | GL_EQUAL |
| GL_GEQUAL | GL_GEQUAL |
| GL_ALWAYS | GL_ALWAYS |

1. Runtime invokes the OM for object creation . OM returns a handle for the object created . This runtime returns this handle to the application . The application uses the handle for future reference to the object .

1. Runtime access the state in the state object or the API state it maintains . It doesn't invoke any block in the services layer .

CONFIGURABLE SCHEDULER FOR GRAPH PROCESSING ON MULTI-PROCESSOR COMPUTING SYSTEMS

RELATED APPLICATIONS

This patent application claims priority to U.S. provisional patent application Ser. No. 62/166,507, entitled "Efficient Graph Processing", filed May 26, 2015 which is expressly incorporated herein in its entirety by reference.

FIELD OF EMBODIMENTS

The described embodiments relate generally to multi-processor systems. More particularly, the described embodiments relate to systems and methods for scheduling of code for execution in multi-processor systems.

BACKGROUND

The onset of computation heavy applications is causing a paradigm shift from centralized computing to parallel and distributed computing. Parallel computing includes distributing computing jobs to the various computing resources. These resources generally include several central processing units (CPU), memory, storage, and support for networking.

Centralized computing works well in many applications, but falls short in the execution of computation rich applications, which are increasingly popular. Programs can be executed in a serial fashion or distributed to be executed on multiple processors. When programs are executed in a serial fashion, only one processor can be utilized and hence the throughput is limited to the speed of the processor. Such systems with one processor are adequate for many applications but not for compute intensive applications. Code can be executed in parallel in multi-processor systems leading to higher throughput. Multi-processor systems entail breaking of code into smaller code blocks and efficiently managing the execution of code. In order for the processors to execute in parallel, data to each of the processors has to be independent. Instances of a same code block can be executed on several processors simultaneously to improve the throughput.

If the processors need data from a previous execution, then parallel processing efficiency could decrease. Data dependency needs to be considered when scheduling processors. Efficiently managing multiple processors and data dependency for higher throughput is challenging. It is desirable to have a method and system for efficient management of code blocks in computation rich applications.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 8*a* shows an embodiment of efficient graph processing.

FIG. 8*b* shows an embodiment of fine grained thread scheduling.

FIG. 8*c* shows an embodiment of a graph of nodes.

FIG. 15 shows an embodiment of depth test function.

FIG. 16 shows an embodiment of depth test function.

DETAILED DESCRIPTION

Figure 1:
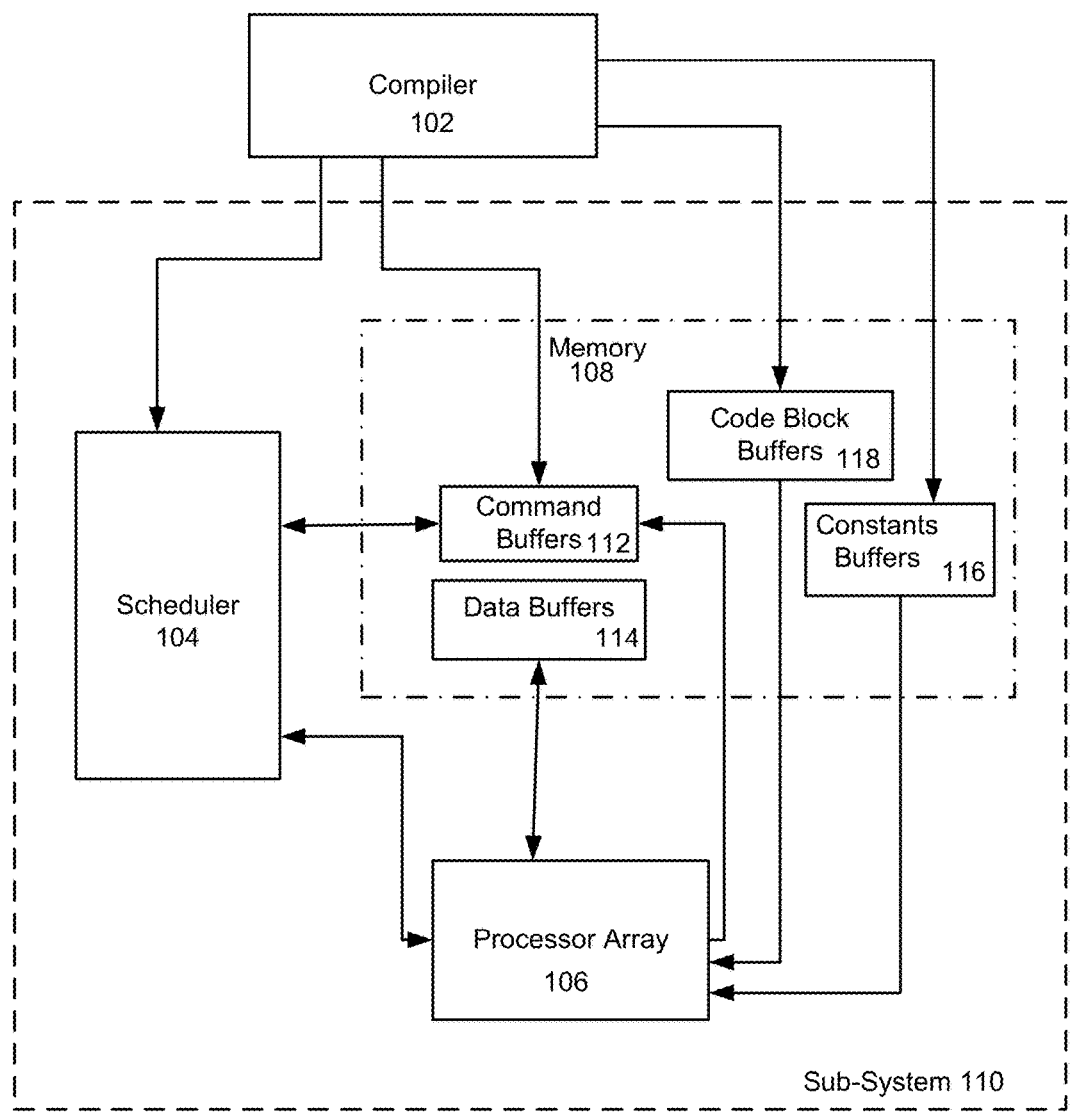
FIG. 1 shows a block diagram of an embodiment of a system of scheduling code.

In the following detailed description, numerous specific details are set forth to provide a thorough understanding of claimed subject matter. However, it will be understood by those skilled in the art that the claimed subject matter may be practiced without these specific details. In other instances, methods, apparatuses, or systems that would be known by one of ordinary skill have not been described in detail so as not to obscure claimed subject matter.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, method, logic block, process, or the like, is conceived to be a self-consistent sequence of steps or instructions leading to a desired result.

Embodiments described herein may be discussed in the general context of processor-executable instructions residing on some form of non-transitory processor-readable medium, such as program modules or code blocks, executed by one or more processors or other devices. Generally, program modules include routines, programs, objects, components, data structures, etc., that perform particular tasks or implement particular abstract data types. The functionality of the program modules may be combined or distributed as desired in various embodiments.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product.

For a firmware or software implementation, the methodologies may be implemented with modules (e.g., procedures, functions, etc.) having instructions that perform functions described herein. Any machine readable medium tangibly embodying instructions may be used in implementing methodologies described herein. For example, software codes may be stored in a memory and executed by one or more processors. Memory may be implemented within the processors or external to the processors.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. In the described embodiments, processing elements refers to a plurality of processors and the associated resources such as memory.

Some example methods, apparatuses disclosed herein that may be implemented, in whole or in part, to facilitate or support one or more operations or techniques for processing code in a plurality of processors.

Unless defined otherwise, all technical and scientific terms used herein have the same meaning as commonly understood by one having ordinary skill in the art to which the disclosure pertains.

Attention is now drawn to FIG. 1, which is a schematic diagram illustrating implementations of certain features associated with an example of a system of scheduling code blocks for execution across multiple processors operating a multi-processor system 100.

In an embodiment, system 100 comprises of compiler 102 and sub-system 110. In a non-limiting embodiment, sub-system 110 includes scheduler 104, processor array 106, and memory 108.

Compiler 102 segments code into code blocks. For the described embodiments, block or code blocks refer to a section or portions of code grouped together. Grouping enables groups of statements to be treated as if they were one statement, and to restrict the scope of variables, procedures and functions declared in a block so that they do not conflict with variables having the same name used elsewhere in a program for different purposes. Flow constructs such as if and for loops cannot straddle code blocks.

In some embodiments, compiler 102 can reside on a server or any other storage. In other instances the compiler can reside in a disk drive, optical drive, flash drive or any other information storage medium. Compiler 102 can execute on any system. In an embodiment, compiler 102 can partition code into code blocks. In an embodiment, compiler 102 describes the graph to the scheduler.

Scheduler 104, schedules execution of the code blocks in one or more processors. Scheduler 104 is coupled to the compiler, processor array and memory. In an embodiment scheduler 104 is partly implemented in hardware and software. In some embodiments, scheduler 104 can be implemented using hardware only. In certain other embodiments, scheduler 104 is a software scheduler.

Processor array 106 comprises a plurality of processors. Each processor of the processor array 106 may be implemented in hardware or a combination of hardware and software. Processor array 106 may be representative of one or more circuits capable of performing at least a portion of information computing technique or process. By way of example but not limitation, each processor of processing array 106 may include one or more processors, controllers, microprocessors, microcontrollers, application specific integrated circuits, digital signal processors, programmable logic devices, field programmable gate arrays, or the like, or any combination thereof. The processors can be any of general purpose Central Processing Unit (CPU), or special purpose processors such graphics processing unit (GPU)s, Digital Signal Processors (DSP), video processors or any other special purpose processors.

The system 100 can include memory 108 to store code blocks and data. Memory 108 may represent any suitable or desired information storage medium. Memory 108 may be coupled with processing array 106.

As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information. As such, in a particular implementation, such a change of state of the portion of the storage media to store a signal representative of information constitutes a transformation of storage media to a different state or thing. In some embodiments, memory comprises random access memory (RAM) such as synchronous dynamic random access memory (SDRAM), First-In-First-Out (FIFO) memory, or other known storage media, and the like.

In a non-limiting example, memory 108 comprises a plurality of data buffers 114, command buffers 112, constants buffers 116 and code block buffers 118. Command buffers 112 are coupled to the scheduler 104, compiler 102 and processor array 106. Command buffers 112 store the index pointing to the data buffers 114. Initial index is provided by the compiler, subsequent indices are written by the processor array. Scheduler 104 reads the command buffers 112 and schedules a processor from processor array 106 to execute instructions. The index to the data for execution of code by the processors is stored in command buffers 112. In some embodiments, command buffers 112 can also store pointer to code block buffers 118.

Data buffers 114, comprises of a plurality of buffers to store data for processing or for storing the results of processing. Data buffers 114 communicate with the processor array 106. The index to the data buffer 114 is stored in the command buffer 112. Code block buffer 118 stores the code blocks for execution by the processor array 106. In an embodiment, data buffers and command buffers are First in First out (FIFO) buffers, DRAM, or SRAM. Compiler 102 partitions the code and writes the code blocks in the code block buffer 118. The code block buffer 118 is read by the processor array 106 for execution. Compiler 102 stores constants required for code blocks in constants buffers 116. Processor array 106 reads the constants buffer 116 when required for execution of the code block. In some embodiments, constants buffer 116 is written by compiler 102 and read by the processor array 106

Figure 2:
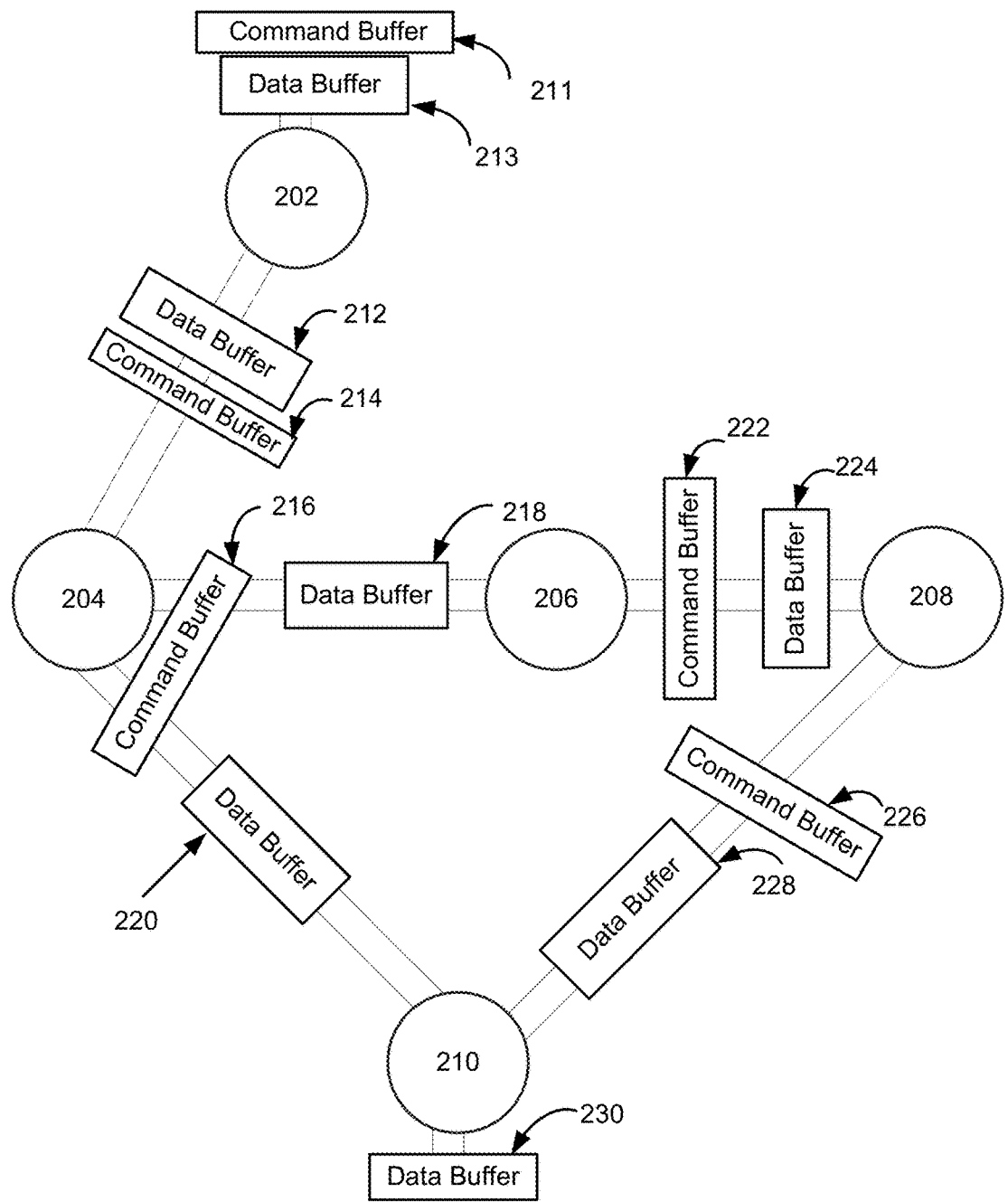
FIG. 2 is a network topology of nodes in an embodiment.

FIG. 2 is a schematic diagram illustrating an implementation of an example of a network topology of nodes. In a multiprocessor system, processors are interconnected. The topology of interconnections can be physical or logical, Physical topology refers to the physical design of a network including the devices, and location. Logical topology refers to how data is transferred in a network as opposed to its physical design. Logical topology is the way the data passes through the network from one device to the next without regard to the physical interconnection of the devices.

Network topology is determined by the graphical mapping of the configuration of physical and/or logical connections between nodes. In the described embodiments, node refers to a logical concept of the mechanism to access the various resources including the program code, the data buffers, constants buffers etc.

FIG. 2 describes an embodiment of a node topology connected in a directed acyclical graph. In other embodiments, nodes can be connected in other topologies such as mesh, tree etc. In an embodiment, directed acyclical graph, comprises of a top node 202, terminal node 210 and intermediary nodes 204-208. Intermediary nodes can be connected to more than one node at the input as well as output. Compiler 102 provides the node topology to scheduler 104.

In an embodiment, the topology comprises of nodes, data buffers, command buffers and constants buffers. Data buffers stores data while command buffers stores an index to the data buffer. In an embodiment, each node receives data from a data buffer and writes the results of the execution in another data buffer. Thus, data buffers are connected at the input and output of each node. In an embodiment, multiple data buffers can exist between nodes. In another embodiment, a data buffer can provide data to more than one node.

A node can write to more than one output data buffer. Each node can read from one or more data buffers. In an embodiment, one command buffer exists at the output of each stage. In the described embodiments, stage refers to the depth of a node in the topology. For example, top node 202 has a depth of 0, node 204 has a depth of 1, node 206 has depth of 2, node 208 has a depth of 3 and node 210 has a depth of 4. Each of the nodes of the same depth has the same stage.

In some embodiments, a command buffer can store index to more than one data buffer when a node is connected to more than one node at the output. In other embodiments, a command buffer can store index to more than one data buffer connected to a single node or multiple nodes. In certain embodiments, command buffers can store pointer to code block buffers 118 as well as data buffers 114.

In an embodiment, command buffer 211 stores index to the data buffer 213 of node 202. Node 202 being the top node, the associated command buffer, command buffer 211 is written by the compiler. The input to data buffer 213 to top node 202 is provided by compiler 102. After execution, top node 202 writes the results in data buffer 212. The index to data buffer 212 is stored in command buffer 214. Multiple instances of top node 202 or any other node can be executed in parallel. Scheduler can spawn a process in more than one node each derived from the original index.

In an embodiment, a thread to start an instance of node 204 is scheduled after top node 202 starts execution. The thread can be started upon completion of execution of one or more instances of top node 202 once all data for the referred thread for node 204 is available in data buffer 212.

In an embodiment, at the end of every thread, nodes execute a special operation embedded in the code block. The special operation indicates to the scheduler to schedule a thread in the next connected node. The operation also updates the command buffer indicating a location of data in the data buffer. For example, the special operation in top node 202 updates the command buffer 214 and indicates to scheduler 104 to start a thread in node 204. Upon writing output data into data buffer 212, the information to write into command buffer 214 is available in the code block. Updating command buffer 214 triggers scheduler 104 to schedule a thread in node 204.

Node 204, receives the index to the input data buffer 212 from command buffer 214. Node 204 reads input data, executes one or more instances and writes the result in data buffer 218 and data buffer 220. The index to each of the data buffers is stored in command buffer 216. Similarly, node 206 receives data from input data buffer 218 and the index to data buffer 218 from command buffer 216. Node 206, upon executing one or more the instances write the resulting data in data buffer 224 and an index to data buffer 224 in command buffer 222.

In an embodiment, when a downstream node receives input from more than one node, the node which generates the data required by an instance of the downstream node last will trigger that instance. In another embodiment, when a first instance of a node receives input from more than one node, all the instances of the nodes in the previous stages which provides data to this instances node are scheduled before the first instance of the node is scheduled. In an embodiment, final node 210 is triggered by node 208 since data from node 208 is output later than node 204. When a node receives data from nodes of different stages, a node from immediately previous stage triggers an instance of the node. In an example, node 210 of depth or stage 4 is triggered from a node of stage 3 or depth 3 which is node 208. Since node 210 is the resulting or final node, the final results are written in data buffer 230. In an embodiment, the operations of FIG. 2 are managed by scheduler 104. Scheduler 104 receives information about the connectivity of nodes, schedules nodes for execution. The scheduler dispatches an instance of a node for execution along with an index. The index points to the dataset in the data buffers. In an embodiment, index to the data buffer receiving data for execution of a node are stored in the command buffer while the index to the data buffer for storing the results of execution of a node are computed by the node. In another embodiment, the index to the data buffer for storing the results of execution of a node is provided by the command buffer while the index to the data buffer for reading data is computed. In an embodiment, computation could include adding or subtracting or simple operation using a fixed number or a variable provided along with the index or a complex operation as performed in the code block.

Figure 3:
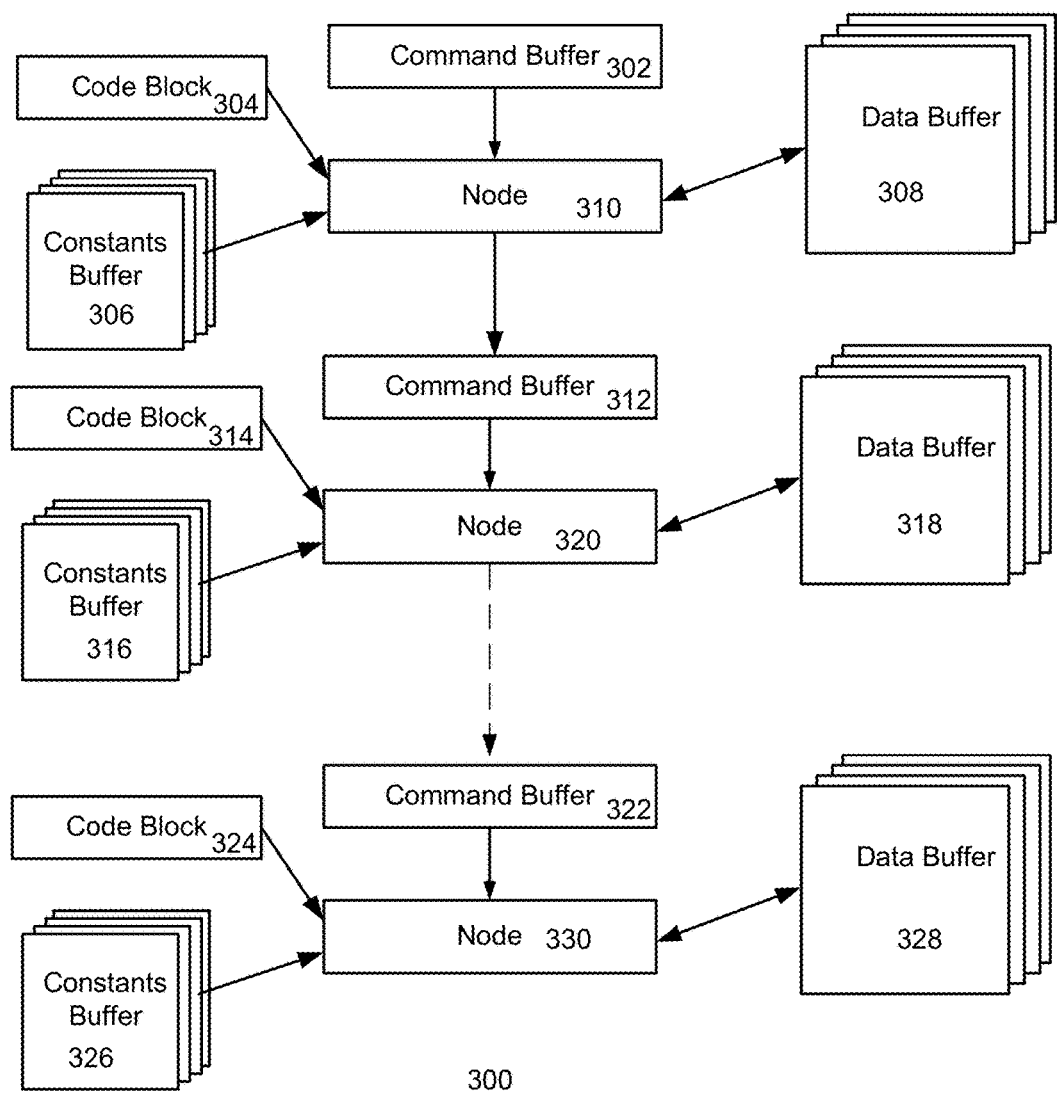
FIG. 3 is a system of nodes and the associated buffers in an embodiment.

FIG. 3 shows the diagram of a hardware managed command buffers. A node connects to one command buffer at the input and another one at the output. A set comprising of a node, a command buffer, a data buffer, a code block and a constant buffer are connected. Each such set is connected to another set and forms a chain of command buffers. Node 310 is connected to a command buffer 302 at the input. Node 310 receives an index to the data buffer 308 from command buffer 302. The code for execution from code block 304 and the constants for executing the code block from constants buffer 306. Command buffer 302 is input by the compiler. The command buffers are efficiently managed by the scheduler. In an embodiment, command buffers 302, 312 and 322 can be implemented as a FIFO in order that the command buffers are small. In an embodiment, a command buffer can be small enough to hold an index until it is read. Once the index for a node is read, the contents of the command buffer are no longer required, and hence the command buffer can be overwritten.

In an embodiment, data buffer can be implemented in a FIFO. Once data for all instances of a node is read, the contents of the input data buffer are no longer required so the data buffer can be over written.

Figure 4:
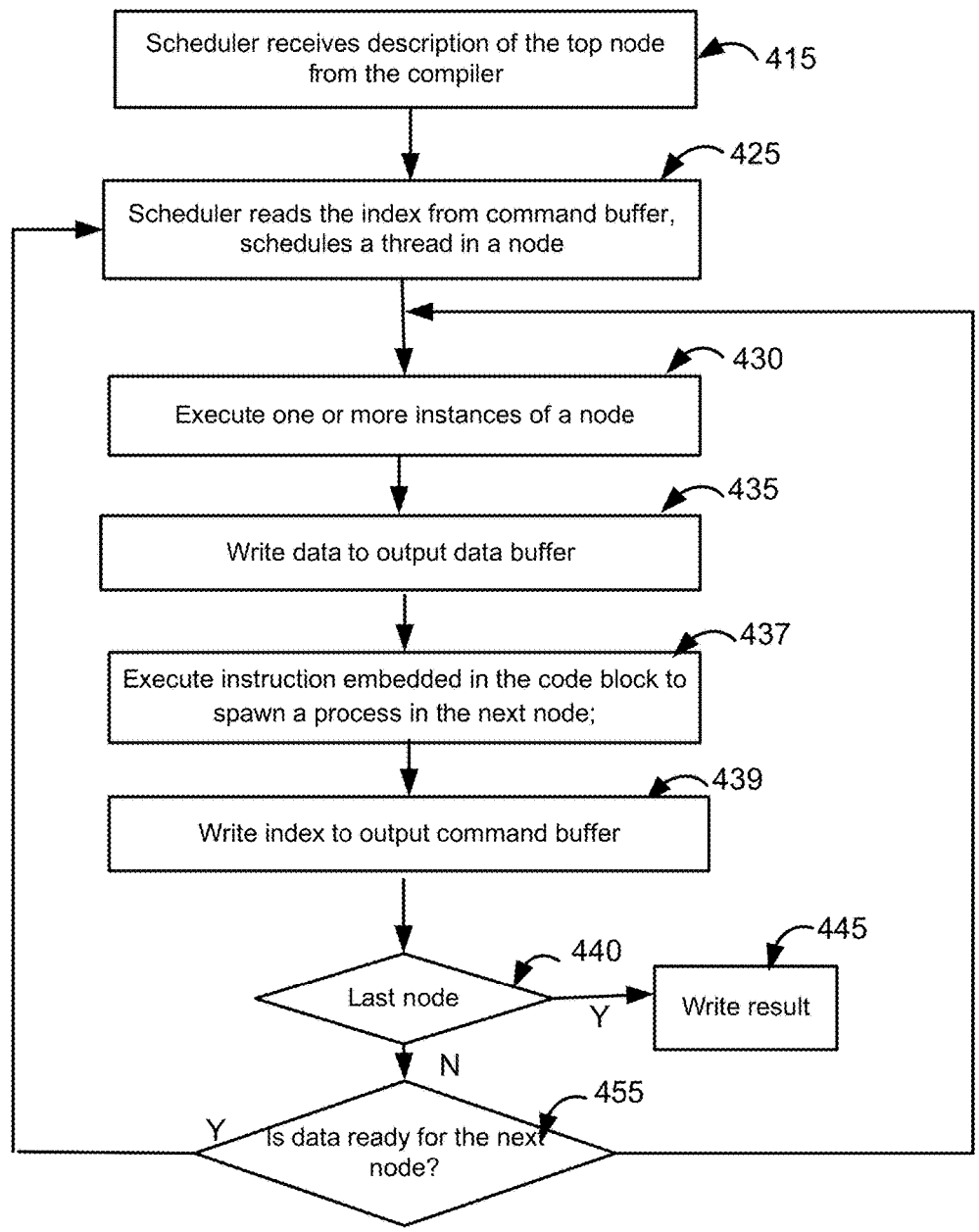
FIG. 4 is a method of steps executed by a scheduler in order to schedule threads in nodes in an embodiment.

In an embodiment, constants buffer store constants for a particular code block written by the compiler and read by the processors FIG. 4 is a flow chart that includes steps of an example of a method executed by a scheduler for scheduling threads in a node of a multi-node computing system.

In one or more example implementations, the functions described may be implemented in hardware, software, firmware, discrete/fixed logic circuitry, some combination thereof, and so forth. If implemented in software, the functions may be stored on a physical computer readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof.

In an embodiment, method 400 comprises of receiving the description of the nodes and the connectivity by the scheduler 104 in step 415. In order to schedule a thread in the first node, the scheduler reads the index from the command buffer in step 425. An instance of a node is scheduled to execute in step 430. Data is written to output data buffer in step 435. To spawn a process in a next node an embedded instruction in the code block is executed in step 437. In step 439, index to the output command buffer is written in the data buffer. In some embodiments, pointer to code block is also written in step 439. If it is a terminal or last node, the end result is written into the output data buffer in step 445. Otherwise, step 455 checks availability of output data to spawn a thread in the next node. If there is insufficient data, the node continues to execute other instances in step 430. Once enough data is available in the data buffer or all instances of the node are executed, the method loops back to step 425. Steps 425-440 are executed until all the nodes are executed. In an embodiment, multiple instances of steps 430 and 439 executed in parallel. Steps 425-455 are executed by an instance of the scheduler. Output of one instance of the scheduler is fed into the next instance.

Figure 5:
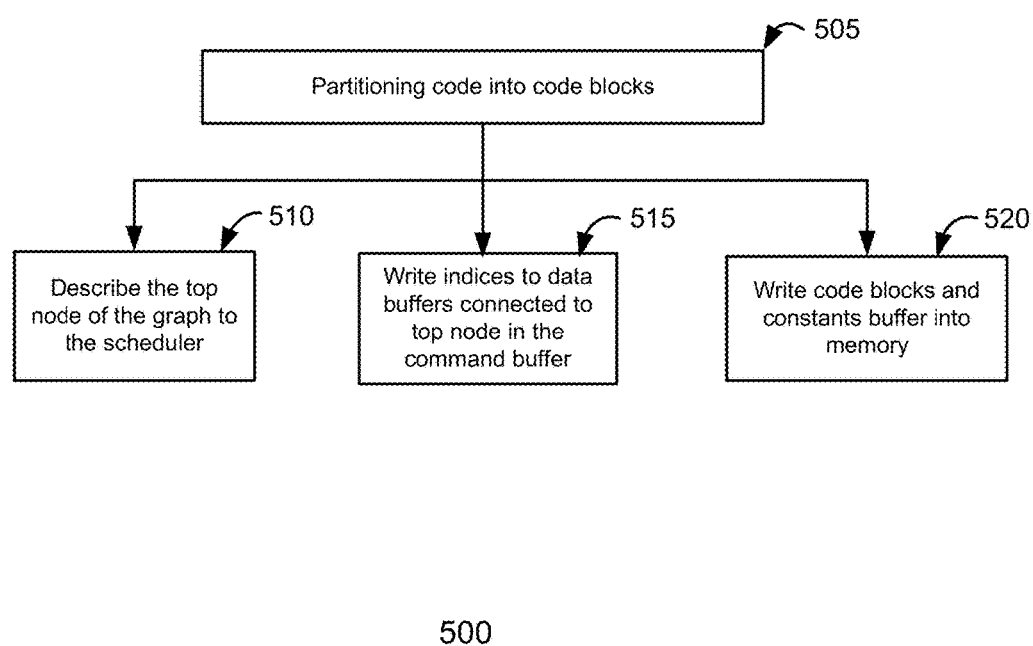
FIG. 5 shows an example of steps executed by a compiler.

FIG. 5 is a flow chart that includes steps of an example of a method executed by a compiler. Compiler 102 partitions code into code blocks in step 505. Each code block contains code structures such that it does not straddle code blocks. Compiler describes the top node by providing pointer to code block and index to the command buffer to scheduler 104 in step 510.

In step 515, compiler 102 writes the indices pointing to a data buffer 114 for every instance associated with the top node to the command buffer 112. Compiler 102 also identifies constants that are associated with each code block and writes the constants to constants buffers 116 and the code blocks to code block buffer 118 in step 520.

Extensions and Alternatives

1. Efficient Graph Processing Innovation

Several important inventions have proceeded from the development of our highly efficient graph processing architecture. They have resulted from a methodical effort to address the needs of future workloads, including Computer Vision, Video and 3D Rendering. Innovations in our architecture to enable efficient processing of these workloads are detailed.

Highly Permuted Access to Data
    Rectangular block access to data in the register file provides:
        Higher computational instruction density verses move, swizzle and format instructions.
        The ability to operate "in-place" in the register file, thus reducing the number of required registers.
        Access to rectangular blocks of data across registers by treating multiple registers as a contiguous surface of related data.
            Offset
            Size
        Multi-register Pitch, shown in FIG. 6:
    Micro-tiling in the register file allows for efficient vertical access to data, thus saving the power otherwise required to assemble a rectangular block of data. The throughput of the pipeline is also increased due to lighter demand on the register file.
    Support for reduction instructions with overlapped neighborhoods in the register file significantly reduces the number of register file accesses and computation compared to traditional SIMD approaches.
        Such as adjacent dot product instructions, which share register file reads and multiplicative min-terms, thus reducing power and increasing throughput.
    Hardware support for iterating over a rectangular block of data which is larger or smaller than the physical size of the underlying data path provides two key advantages:
        The number of instructions required to loop over a code block is reduced to one instruction.
        A single WALK instruction versus 2D index manipulation, conditional evaluation and branching.
    The values embedded in the rectangular block descriptions of each instruction remain encoded as immediate values and do not require some form of register-indirect-register addressing mode, resulting in smaller instruction encodings.

Fine Grained Thread Scheduling
    Unique definition of a schedulable thread entity (Stage Object), which supports:
        A broad spectrum of usage models, including
            Computer vision
            3D graphics rendering
            Video processing
            Many other data parallel problems generally categorized as High Performance Computing
        Attributes of the thread entity:
            Program
            Subroutines (run-time dynamically linked)
            Input/output elements (decoupled from their containing buffers)
            Input/output buffers
            Constant input buffers
            Spill/fill scratch memory buffers
            Sampling state objects
            Input buffers which support sampling (Texture Maps)
            Graph linking state
    Support for very fine grained thread scheduling by providing hardware support for:
        Iteration of 1D and 2D data
        Dispatch eligibility, such as data dependencies being met and sufficient resources being available (e.g. registers) is managed by hardware.
        Conditional boundary cases, such as the edge of a 2D surface, thus alleviating the conditional instructions in the thread kernels.
        Dynamic block size determination and sub-dividing, eliminating the need for computationally expensive software approaches to iterating over a dynamically derived block size.

Graph Streaming
    Direct hardware support for streaming data through a Directed A-Cyclical Graph (DAG)
    Stage Objects are linked to form the DAG
        Generalized inter-stage communication
            Through memory backed FIFO's providing arbitrary connectivity
            Hardware managed ring command buffers carry processing semantics, such as the task to be performed and the location of the input data.
            Hardware supported input/output data indirection through indices, thus providing efficient data storage and multi-referencing of individual data elements.
            Efficient hardware managed input and output ring buffers for temporary intermediate data, thus frequently allowing the data flowing through a graph to remain within the memory cache hierarchy.
    Specific join semantics provide hardware managed synchronization and data dependency checking, which feeds into the thread dispatch eligibility scheduling process.

A unique mechanism for self-scheduling threads within a kernel, employing only a single EMIT instruction, provides an efficient yet flexible graph support.

Decoupled thread dispatch control allows data to be written to a single shared output buffer, while emitting multiple threads to consume the data.

Multiple thread emits are supported such that a single thread may consume or generate multiple packets of data. The join synchronization hardware supports these many-to-one relationships.

A producing thread may emit dependent threads with offset and scaling properties; such that a fewer or greater number of threads are dispatched than EMIT instructions executed. This provides direct hardware support for downscaling/upscaling and offsetting of the 1D/2D data iteration process without software conditional instructions.

The offset properties produce a spatial data dependency that feeds into the dispatch eligibility logic to prevent threads from being dispatched which do not yet have their data dependencies met. This simple mechanism alleviates the need for inter-thread communication mechanisms, such as atomic shared memory operations, which are commonly used to verify data dependencies in software and which have significantly higher performance costs.

A natural extension of this dependency checking is the ability to schedule threads after completion of all the threads of the parent node in scenarios where the dependencies cannot be deterministically identified and resolved.

2. Graph Streaming Coarse-Level Tiled 3D Rendering Architecture

Conventional tiled-rendering schemes employ primitive-level bin-sorting to achieve the memory bandwidth savings. A 256×256 block of pixels will need 128 Kilo-Bytes and 256 Kilo-Bytes of memory for storing 16-bit per-pixel depth/color values and 32-bit per-pixel depth/color values respectively. The last-level caches in the processor systems which are over the size of 1 MegaByte can be used to host the above storage. The "sort-and-execute" scheme proposed here is a coarse-level tiled-rendering scheme which sorts the input workload of the graphics pipeline at draw-call granularity to make efficient use of the large last-level cache to cut down on the memory-bandwidth on the DDR-interface. The scheme also reduces the computes inside the core.

2.1 Brief Description of Operation

The input payload of the graphics engine is packets of primitives (lines/triangles/points) in 3D space a.k.a draw-calls encapsulated with some state for the graphics engine/pipeline. The graphics engine uses this state to process the primitives and render them to the screen or display. The packets of primitives and their state are converted to the native-engine format and loaded into buffers called Batch-Buffers. These batch-buffer addresses are loaded into a Ring-Buffer whose address is passed on to the graphics engine. Graphics Processing Unit/Graphics Engine/Hardware accesses the Ring-buffer and through that it accesses the batch-buffers which carry the input packets for processing. The hardware renders these input packets to the two-dimensional screen.

The screen-space is divided into blocks or tiles of n×n pixels where n>=256. The value of n is decided based on the size of the last-level cache. The driver associates each tile with a memory-block or a Bin. The hardware reads the batch-buffers and sorts the draw-calls into bins based on the tiles covered by the bounding-box of each of these draw-calls in the screen-space. Hardware then processes each of the bins separately to cut down on memory bandwidth and computes on core. Hardware takes each bin through two passes (Pre-Z pass and Render) to achieve this.

Each render-pass is taken through the following stages.

1. Sort Stage. This is the first stage. In this stage, the draw-calls are processed till viewport-transform stage in the graphics pipeline and the screen-space bounding-box is determined for the draw-call.

The draw-calls can be of two types: "Dependent" or "Independent". A dependent draw-call depends on the output of the previously issued draw-calls in the input stream. An independent draw-call is one that, when provided with all the corresponding state for the graphics pipeline, can be moved anywhere in the input stream without affecting the final rendered frame (output on the screen). A bin is moved from its default "independent" state to "dependent" state if any of the dependent draw-calls are placed into it. Also, each draw-call is assigned a weight by the driver based on the number of vertices in the draw-call and the compute requirements of the vertex-shader bound to the draw-call. This weight is an indicator of the compute heaviness of the draw-call.

The draw-calls are binned based on the above two parameters i.e. draw-call type (dependent or independent) and the weight of the draw-call as follows:

a. A draw-call which touches only 1 tile is sorted into the corresponding Bin.

b. A light-weight draw-call which touches multiple tiles is sorted into all the Bins corresponding to the tiles touched.

c. A heavy-weight independent draw-call which touches multiple tiles is sorted into the final tile-independent Bin. There is no tile boundary considered while processing the draw-calls in this Bin and pre-Z pass phase in the next stage is skipped for this Bin. This is done to avoid redundant computes that might be picked up by the hardware in cases where the independent draw-call spans multiple tiles but will fail the depth test on most of the tiles. If the draw-call is picked up for complete rendering without rendering the other tiles, there could be unnecessary pixel-shader computes and hence these draw-calls are binned into a tile-independent Bin which is picked up for processing after all the independent bins are processed and before the dependent bins are picked up for processing in the next stage. Also, if the draw-call is binned into all the tiles it touches, then it will result in an increase in vertex-shader computes in the next stage.

d. A heavy-weight dependent draw-call which touches multiple tiles is sorted into all the Bins corresponding to the tiles touched.

All the Bins touched by dependent draw-calls are tagged to be "dependent".

2. Execute Stage: Each bin in the bin-list created above is then processed and taken through the following two passes. The first pass is the Pre-Z pass and is taken to populate the depth buffer for the bin to the final values. This pass doesn't perform raster computes or pixel shader computes. The next pass is the render-pass which renders the entire bin using the depth buffer populated during the Pre-Z pass phase.

While processing the bins in the bin-list in this stage, the hardware first works on the bins which are not tagged "dependent", then to the tile-independent bin and finally the bins which are tagged "dependent". The two passes i.e. Pre-Z pass and Render-pass are detailed below:

Pre-Z pass: The draw-calls in the Bins are processed till the depth-test stage and the depth buffer is updated for the tile. The depth buffer of the bins processed during this pass is updated to final values of the depth buffer at each pixel in the screen space. The rasterization of pixels is taken up in the next pass. As the depth buffer is updated to the final values at all pixels in the bins processed in this pass, the next pass doesn't see any overdraw on any pixel in these bins. This allows reducing computes in core.

The Pre-Z pass phase is bypassed for the final tile-independent Bin.

Render pass. The final pass renders the entire Bin-List. While processing Bins in the Bin-list, the Bins which are not tagged "dependent" are processed ahead of the Bins which are tagged "dependent".

2.2 Detailed Description of Operation 2.2.1 Software Driver

The software driver of the graphics engine does the following:

1. The driver compiles the application provided vertex shaders into two versions of vertex shaders.
   a. Bin-Pass Vertex Position Shader.
   b. Render Pass Vertex shader.
2. The driver identifies the draw-calls which are order-dependent and marks them in the state to be dispatched to the hardware. A draw-call is order-dependent if it has any of the following state enabled:
   Alpha Blending.
   Computed-Z.
   Discard Instruction in Pixel Shader.
   Per Pixel tests like Alpha/Stencil tests are enabled.
3. For each render-pass, the driver allocates memory for Bin-List based on the number of draw-calls, their instance counts and the number of whole framebuffer commands like "Clear". There is memory allocated for one extra Bin which is tile-independent. Example: If there are 3 draw-calls in the render-pass with an instance count of 1, 2 and 3 respectively, then the amount of memory allocated for the Bin List Sizeof(Bin-List)={Sizeof(Bin-Header)+[Sizeof(Bin Commands)*(1+2+3)]}*[Number of 256×256 pixel tiles in the viewport+1}.

4. The driver allocates a control buffer for each render pass of a frame of the size of the rendertarget (attached to the render-pass) with a depth of 1 bit per pixel. The pointer to this "control buffer" is loaded in the Bin-List state.
5. The driver enqueues the "Sort" command in the command stream of the batch-buffer at the beginning of every render-pass. The "Sort" command carries the Bin-List state.
6. The Bin List State is programmed with the following data: Pointer to the Bin-List memory allocation, Pointer to the "control buffer", Bin Size/Stride (in Bytes), Binning Enable. The Binning Enable field provides control to the driver to turn off the Binning Scheme.
7. The driver also inserts commands in the command stream in the batch-buffer to signify the first and the last command in the stream pertaining to a draw-call. The hardware stores the pointer to the first command as the draw-call identifier in the bins during the Sort stage. During the Process stage, the hardware accesses the draw-calls using this draw-call identifier.
8. Assign a weight to each draw-call based on the number of vertices and the compute requirement of the vertex shader bound to the draw-call. While queuing the draw-calls in the batchbuffer the weights of all the draw-calls is accumulated for the entire render-pass. The software then loads this total weight for the render-pass in the Bin-List state. Also, a "ratio" is loaded which hardware can use to determine if a draw-call is heavy. The "heavy" determination task is moved to hardware to prevent the software from parsing all the batchbuffers again to tag the draw-calls "heavy". The software can program the ratio to a "1" if it wants to disable and keep the tile-independent Bin empty.
9. The driver enqueues the "Execute Bin-List" command in the command stream of the batch-buffer after the final draw-call for the render-pass. The command carries the pointer to the Bin-List to be processed.

2.2 Hardware

For a 16 b per pixel depth/color buffer, a 256×256 block of pixels will need 128 Kilo-Byte of memory and for a 32 b per pixel depth/color buffer, a 256×256 blocks of pixels will need 256 Kilo-Byte of memory. The last level caches in the processor systems which are over the size of 1 MegaByte are expected to host the above storage.

The hardware entry point is the Ring Buffer which points to the batch-buffers carrying the commands for the hardware i.e. draw commands. The first command that software enqueues for a render-pass is the "Sort" command which carries the "Bin-List State". The hardware latches on to the state carried by the command till the next "Sort" command is received. The Bin-List state carries information to determine the offset of a bin corresponding to a 256×256 tile in the rendertarget. Bin0 corresponds to the top-left 256×256 tile. Bin1 maps to the 256×256 tile to the right of the top-left left tile. Bin2 maps to the tile to the right of the tile mapped to Bin1. This continues to the next row of 256×256 tiles after the width of the render target is covered and this goes on till the entire rendertarget is covered in X and Y dimensions.

There is one more Bin attached at the end which is tile-independent. All heavyweight independent draw-calls are sorted into this bin to avoid redundant computes. This is explained in more detail in the next section.

2.2.2.1 Sort Stage:

Hardware decodes the commands from the batchbuffer and processes them. For the "Sort" command the hardware first checks the "Binning" bit in the command which tells if binning is enabled or not. If "Binning" is enabled in the command, then the hardware sets its current state to "Sort State". If "Binning" is disabled, the hardware continues to work in the conventional "Immediate-Rendering" mode i.e. the default mode. From the "Sort" state the hardware state changes to "Execute State" on the "Execute Bin-List" command. While in the "Sort" state, hardware performs the following operations on a draw-call received:

i. All the framebuffer clear commands are loaded into all the bins except the tile-independent bin.
ii. Uses the vertex position shader for vertex shading. The software compiler derives a shader, from the application provided vertex shader, which carries the computes effecting vertex positions only. This derived vertex position shader is used in the Sort Stage and Pre-Z pass phases of processing. The final render-pass uses the complete vertex shader provided by the application.
iii. After the vertex shading, the hardware takes the draw-call through the graphics pipeline till the viewport transform stage which determines the bounding box of each primitive (point/line/triangle) in 2D screen space.

The bounding boxes of all these primitives for the draw-call are accumulated to arrive at the bounding box of the draw-call. The bounding box of the draw-call is determined as follows:

Bounding Box$_{top-left-x}$=Min(Bounding Box$_{top-left-x}$ of all triangles)

Bounding Box$_{top-left-y}$=Min(Bounding Box$_{top-left-y}$ of all triangles)

Bounding Box$_{bottom-right-x}$=Max(Bounding Box$_{bottom-right-x}$ of all triangles)

Bounding Box$_{bottom-right-y}$=Max(Bounding Box$_{bottom-right-y}$ of all triangles)

Figure 13:
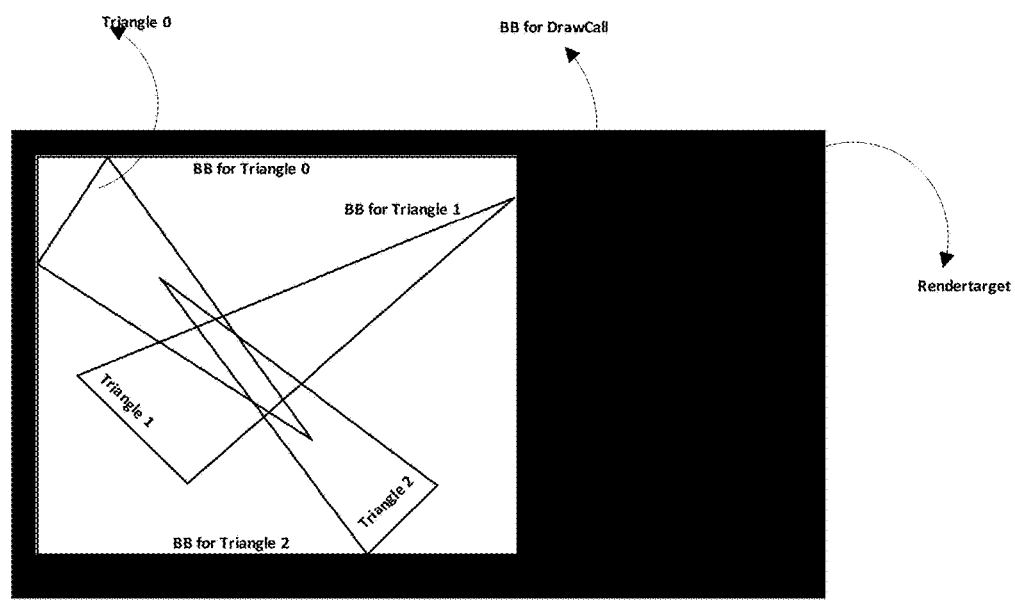
FIG. 13 shows an embodiment of efficient graph processing.
Figure 14:
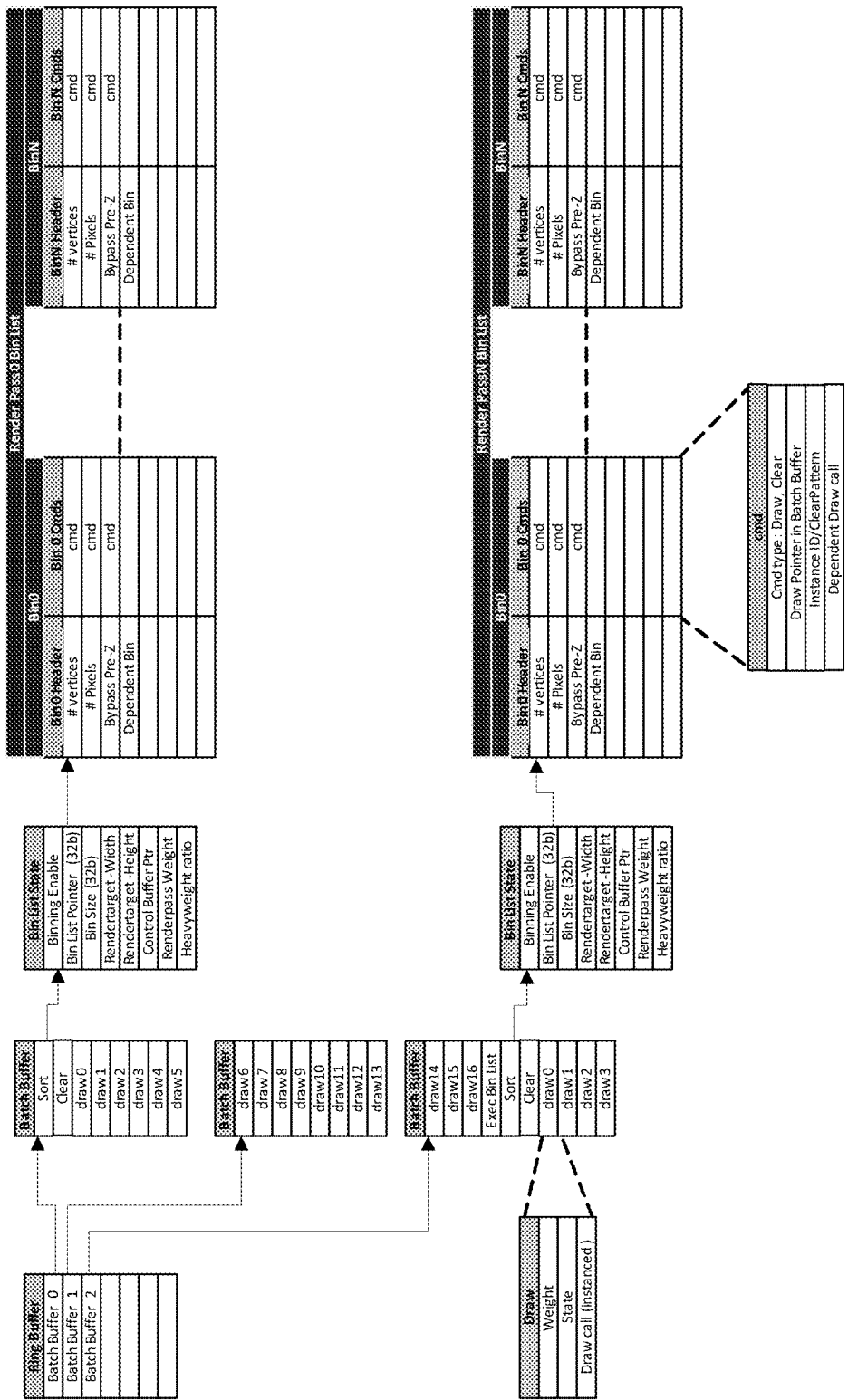
FIG. 14 shows an embodiment of efficient graph processing.

For example, if a draw-call has 3 triangles whose bounding boxes are (offset: 10,10], width: [100], Height: [100]), (offset: [20,20], width: [200], Height: [100]) and (offset: [50,50], width: [100], Height: [100]), then the bounding box of the draw-call is (offset: [10,10], width: [210], Height: [140]). Refer to the FIG. 13.

iv. Based on the bounding box determined above, the tiles or Bins touched by the draw-call are determined.

v. The total vertex count is also determined for each bin.

vi. The hardware checks if the draw-call is a dependent one. Draw-calls which have any of the following state set are tagged "dependent".

Alpha Blending.

Computed-Depth.

Discard instructions used in the pixel shader bound to the draw-call.

Per-Pixel tests (Alpha/Stencil tests) are enabled.

vii. The draw-call is then binned based on the two parameters: draw-call type and the weight of the draw-call.

A draw-call which touches only 1 tile is sorted into the corresponding Bin.

A light-weight draw-call which touches multiple tiles is sorted into all the Bins corresponding to the tiles touched.

A heavy-weight independent draw-call which touches multiple tiles is sorted into the tile-independent final Bin. This is done to avoid redundant computes that might be picked up by the hardware in cases where the independent draw-call spans multiple tiles but will fail the depth test on most of the tiles. If the draw-call is picked up for complete rendering without rendering the other tiles, there could be unnecessary pixel shader computes and hence these draw-calls are binned into a tile-independent Bin which is picked up for processing after all the independent bins are processed and before the dependent bins are picked up for processing in the next stage. Also, if these draw-calls are binned into all the tiles they touch, then it will result in redundant vertex-shader computes in the next stage.

A heavy-weight dependent draw-call which touches multiple tiles is sorted into all the Bins corresponding to the tiles touched.

viii. All the Bins touched by dependent draw-calls are tagged to be "dependent".

ix. The draw-calls which get completely clipped or culled i.e. the ones which do not reach the viewport transform stage are dropped and not placed into any bin.

In the binning scheme being proposed, the additional bandwidth requirement during Sort phase for a renderpass with 150 draw-calls is around 150*8 bytes*32 bins=50 KB*2(rd/wr)=100 KB approx.

1.a.2.2 Execute Stage:

x. When an "Execute Bin-List" command is decoded from the batch-buffer, the hardware switches to the "Execute" State. The "Execute Bin-List" command comes with the pointer to the Bin-List State which points to the Bin-List to be processed. The hardware processes the Bin-list in the following order:

The independent Bins: The hardware parses through all the Bins in the Bin-list and executes only the independent bins first. The tile boundaries are honored during the processing of all the commands in the independent bins. It takes each bin through two passes:

(i) Pre-Z pass: During the Pre-Z pass, the draw-calls are processed till the depth-test stage and the depth buffer is updated. As the tile boundaries are honored, the depth-test is only performed on pixels which lie on the corresponding tile of the bin. Hence, the depth buffer is not accessed for pixels outside of the corresponding tile of each bin. At the end of this pass, the depth buffer is updated to the final value for all the pixels corresponding to the tile Render Pass: The bin is then taken through the (ii) Render Pass which renders the draw-calls to the color buffer. In this pass, the hardware uses the application-provided shaders and depth buffer created during the previous Pre-Z pass. The depth-test function is implicitly changed as in FIG. 15.

Tile-Independent Bin: After all the "independent" bins are executed, the tile-independent bin is picked up for processing. The tile boundaries are not honoured while processing this bin. The draw-calls in this bin are not taken through a Pre-Z pass as done with the "independent" bins above in (1). They are taken through the render-pass directly and the output depth and color buffers are updated.

Dependent Bins: After all the independent bins and tile-independent bin are executed, the hardware picks the dependent bins for processing. The tile boundaries are honoured while processing these bins. As the tile boundaries are honoured, the hardware doesn't access the depth, control and color buffers for pixels outside the tile boundary. Hardware takes each of these dependent bins through two passes:

(i) Pre-Z Pass: An implicit "control buffer" clear is performed before the commands in the bin are processed. Once the control buffer is cleared, the draw-calls are processed till the depth-test stage and the depth buffer is updated for pixels whose control bits are not set in the "control buffer". The control buffer is a 1-bit per-pixel resolution buffer which is used by the hardware to tag a pixel as "dependent" when the pixel is touched by a dependent draw-call. Once a pixel is tagged "dependent", the depth buffer updates to the pixel are stopped during the Pre-Z pass phase. As the tile boundaries are honored during the Pre-Z pass, the depth-test is only performed on pixels which lie on the corresponding tile of the bin. Hence, the depth buffer is not accessed for pixels outside of the corresponding tile of each bin. At the end of this pass, the depth buffer is updated to the final value for all the pixels corresponding to the tile.

(ii) Render Pass: The bin is then taken through the Render Pass which renders the draw-calls to the color buffer. In this pass, the hardware uses the application-provided shaders and depth buffer created during the previous Pre-Z pass. The depth-test function is implicitly changed as in FIG. 16.

3. Coarse-Level Sort-Sift-Execute 3D Rendering Architecture

Conventional tiled-rendering schemes employ primitive-level bin-sorting to achieve the memory bandwidth savings. For a 16-b per-pixel depth/color-buffer, a 256×256 block of pixels will need 128 Kilo-Byte of memory and for a 32b per-pixel depth/color-buffer, a 256×256 blocks of pixels will need 256 Kilo-Byte of memory. The last-level caches in the processor systems which are over the size of 1 MegaByte can be used to host the above storage. The "sort-sift-execute" scheme proposed here is a coarse-level tiled-rendering scheme which "sorts" the input workload of the graphics pipeline at draw-call granularity into bins and then "sifts" the bins and sub-bins of the render-passes which do not affect the output of the final render-pass. The bins which are not "sifted" are only rendered by the engine. The sort helps to make efficient use of the large last-level cache to cut down on the memory-bandwidth on the DDR-interface and the sift helps in reducing the computes inside the core by masking the computes for the sifted out bins and sub-bins.

A graphics application can generate/render textures dynamically and use them to render the final scene. The applications achieve this by using multiple render-passes where each render-pass results in a frame-buffer output which is used as a texture in the ensuing render-passes.

Figure 17:
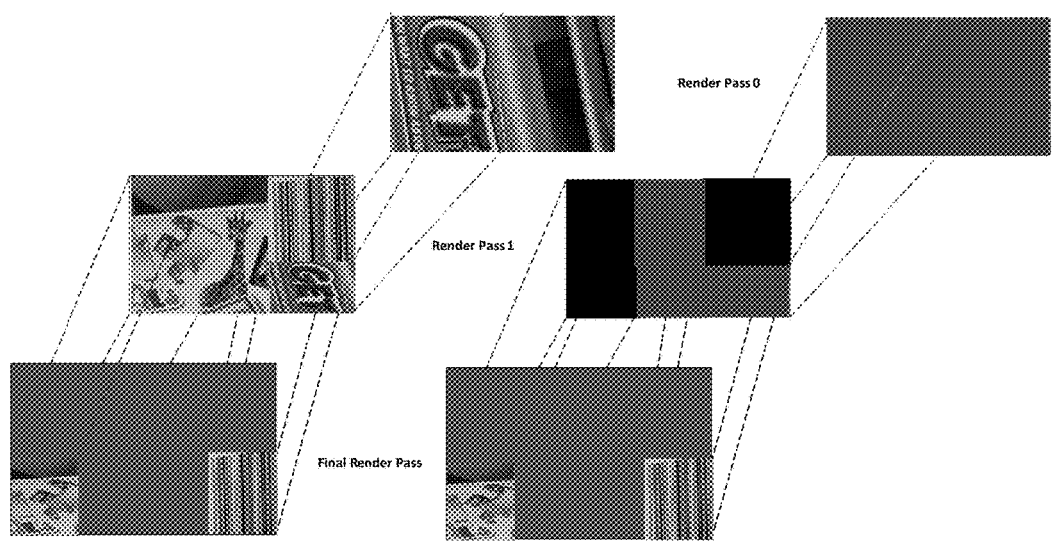
FIG. 17 shows an embodiment of efficient graph processing.
Figure 18:
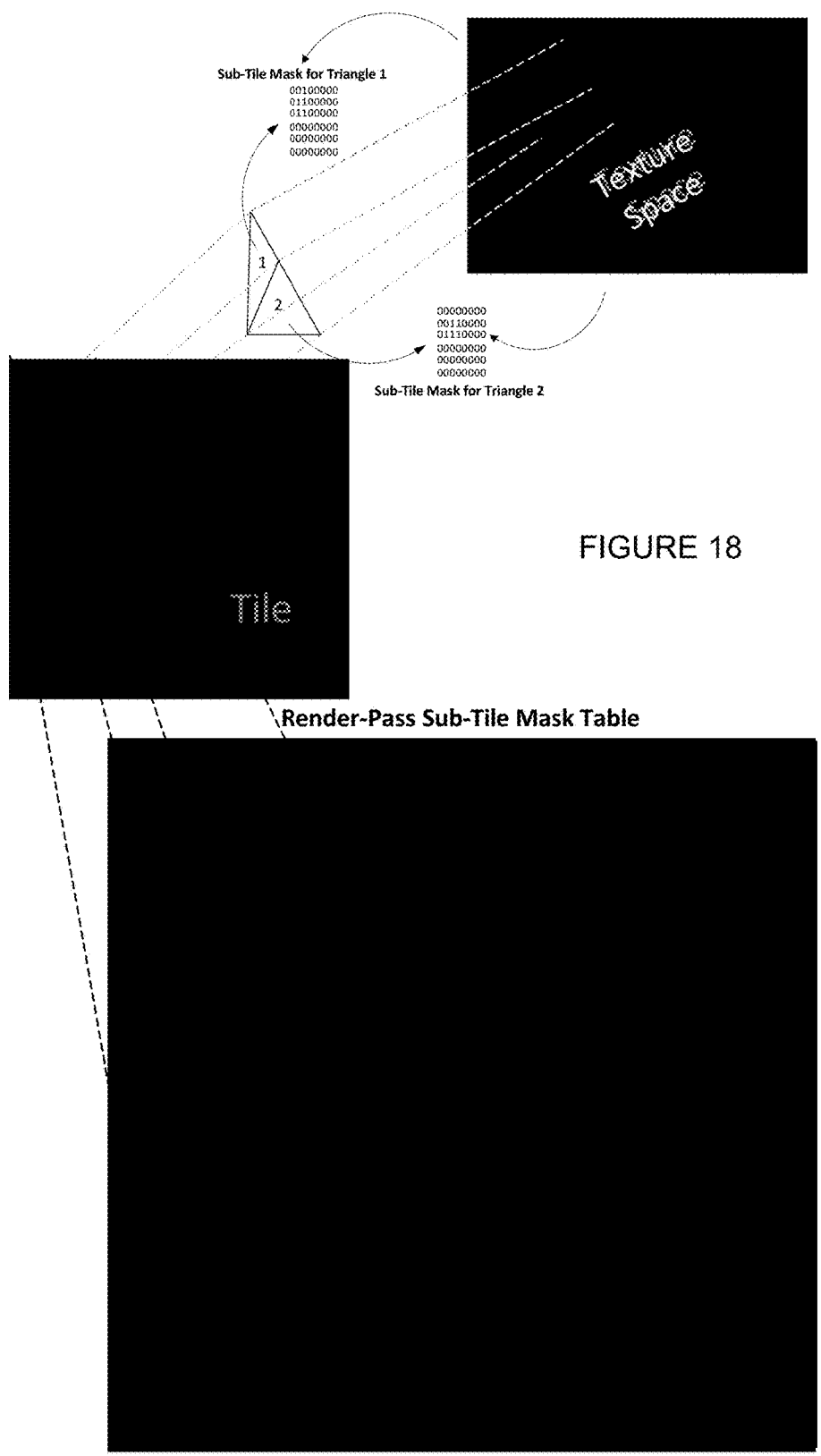
FIG. 18 shows an embodiment of efficient graph processing.

In the FIG. 17 above, the final render-pass uses portions of the texture generated during render-pass 1 and render-pass 1 uses portions of output from render-pass 0. The "Red" patches in the textures above do not affect the final output of the scene. The scheme proposed here tries to cut down on the processing required to render the "Red" patches above

3.1 Brief Description of Operation

The input payload of the graphics engine is packets of primitives (lines/triangles/points) in 3D space also known as draw-calls encapsulated with some state for the graphics engine. The graphics engine uses this state to process the primitives and render them to the screen or display. The packets of primitives and their state are converted to the native engine-format and loaded into buffers called Batch-Buffers. These batch-buffer addresses are loaded into a Ring-Buffer whose address is passed on to the graphics engine. Graphics Processing Unit/Graphics Engine/Hardware accesses the Ring-buffer and through that the batch-buffers which carry the input packets for processing. The hardware renders these input packets to the two-dimensional screen.

The screen-space is divided into blocks or tiles of M×M pixels. And each tile is broken into blocks of N×N pixels called sub-tiles. Hence, a tile comprises of a (M/N)×(M/N) sub-tiles. In the rest of the document, we use a tile size of 256×256 and sub-tile size of 64×64 to explain the scheme. The driver associates each tile with a memory-block or a Bin. In the "Sort" stage, the hardware reads the batch-buffers and executes the draw-calls in the batch-buffers. Hardware sorts the draw-calls into bins based on the tiles covered by the bounding-box of each of these draw-calls in the screen-space. While sorting the draw-calls into bins, hardware also creates a sub-tile mask table for each render-pass whose output is used as a texture during the current render-pass. The table carries an entry for each sub-tile of the current render-target. The entry is a mask whose bits correspond to the sub-tiles of the texture being used in the current render-pass. For example, the two triangles below, in the figure, map to a certain set of sub-tiles in the screen space and texture space. A texture-space sub-tile-mask is generated for each triangle where each bit in the mask corresponds to a sub-tile in the texture space. This sub-tile-mask generated is overlaid onto all the sub-tiles that the triangle straddles in the screen space.

The above is expanded in scope to a frame with the below example where a frame has 3 render-passes with the final render-pass depending on render-pass 1 which in turn depends on render-pass 0. As the final render-pass depends on the render-pass 1 whose output can be divided into a grid of 7×4 sub-tiles, the sub-tile-mask generated by the final render-pass for render-pass 1 is a 7×4 bit mask. Each bit in the mask corresponds to 1 sub-tile of render-pass 1. Render-pass 1 screen space can be broken into a grid of 7×4 sub-tiles and it depends on render-pass 0 whose output render-target also can be divided into a 7×4 grid of sub-tiles. Hence, render-pass 1 creates a 7×4 (render-pass 1 grid size) entry table of sub-tile-masks of size 7×4 (render-pass 0 grid size). All the entries in the table are bit-wise ORed to generate the final sub-tile mask for render-pass 0.

Figure 19:
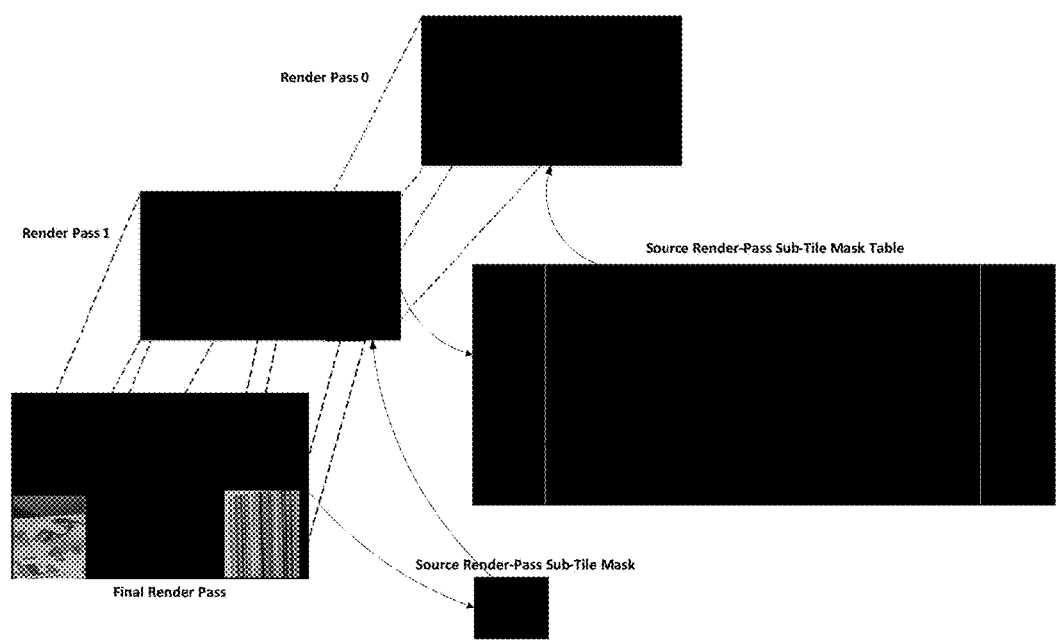
FIG. 19 shows an embodiment of efficient graph processing.
Figure 20:
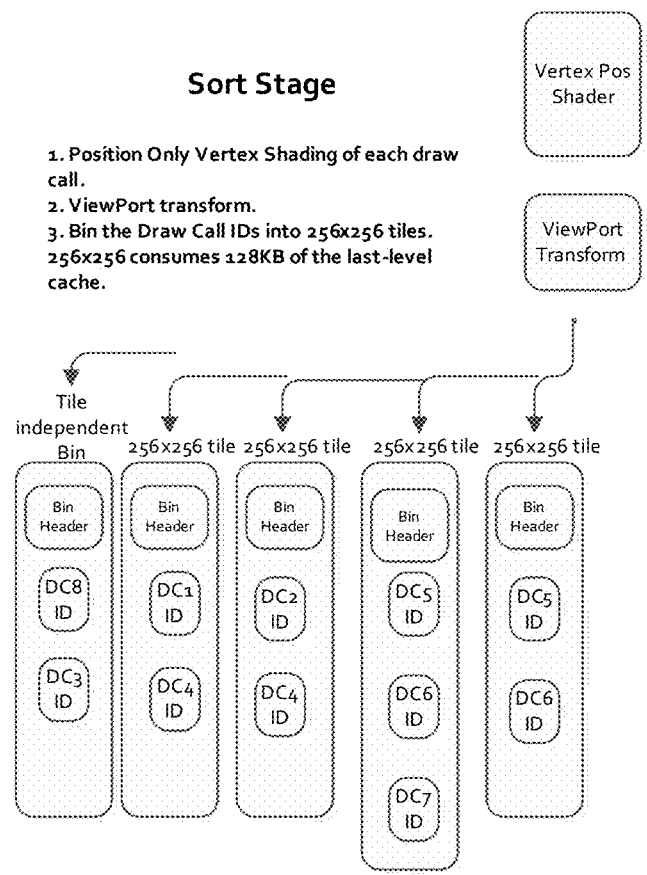
FIG. 20 shows an embodiment of sort stage.
Figure 21:
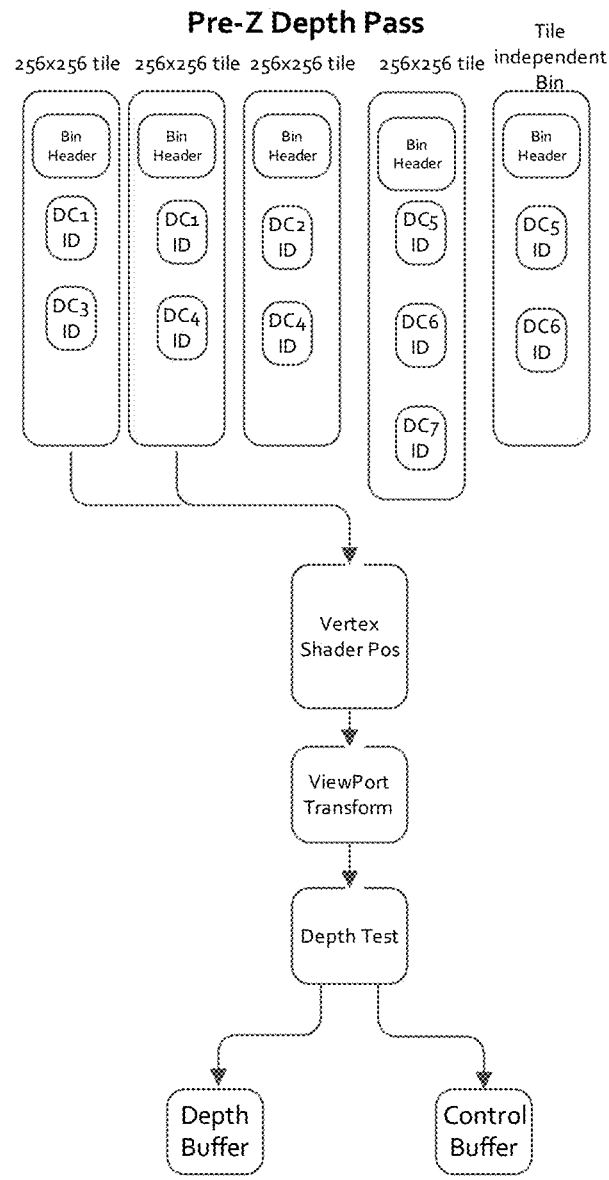
FIG. 21 shows an embodiment of efficient graph processing.
Figure 22:
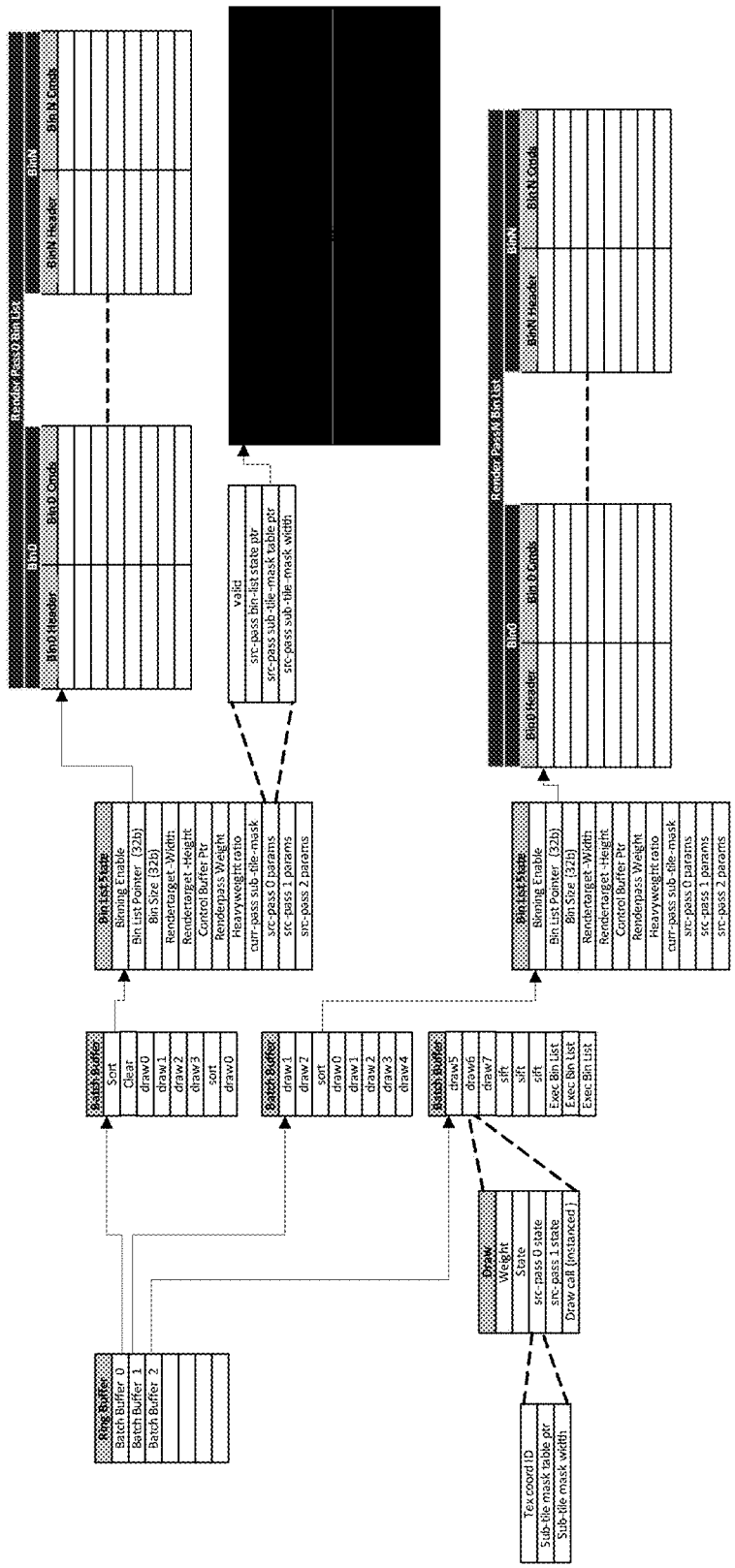
FIG. 22 shows an embodiment of efficient graph processing.
Figure 23:
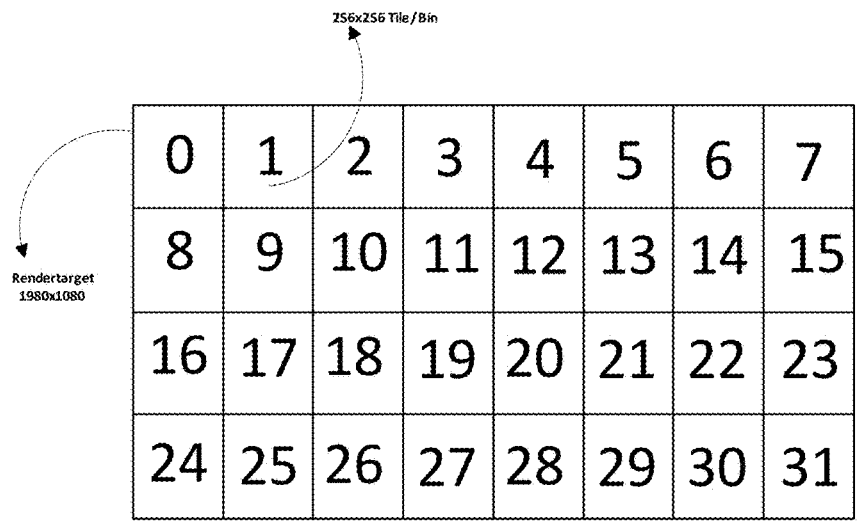
FIG. 23 shows an embodiment of efficient graph processing.

The FIG. 19 scheme is implemented by the system in three stages: Sort, Sift and Execute. At first, all the render-passes are sorted their corresponding sub-tile-mask tables are generated. The system then uses the sub-tile-mask tables to "Sift" the sub-tiles in each render-pass which affect the output of the final render-pass. Finally, the system "executes" each sub-bin of each render-pass that was sifted earlier.

The system takes each frame through the following stages.

1. Sort Stage. This is the first stage. In this stage, all the render-passes are processed till viewport-transform stage in the graphics pipeline and the draw-calls within each render-pass are sorted into bins corresponding to the render-pass. The draw-calls can be of two types: "Dependent" or "Independent". A dependent draw-call depends on the output of the previously issued draw-calls in the input stream. An independent draw-call is one that, when provided with all the corresponding state for the graphics pipeline, can be moved anywhere in the input stream without affecting the final rendered frame (output on the screen). A bin is moved from its default "independent" state to "dependent" state if any of the dependent draw-calls are placed into it. Also, each draw-call is assigned a weight by the driver based on the number of vertices in the draw-call and the compute requirements of the vertex-shader bound to the draw-call. This weight is an indicator of the compute heaviness of the draw-call.

The draw-calls are binned based on the above two parameters i.e. draw-call type and the weight of the draw-call as follows:
    a. A draw-call which touches only 1 tile is sorted into the corresponding Bin.
    b. A light-weight draw-call which touches multiple tiles is sorted into all the Bins corresponding to the tiles touched.
    c. A heavy-weight independent draw-call which touches multiple tiles is sorted into the final tile-independent Bin. There is no tile boundary considered while processing the draw-calls in this Bin and pre-Z pass phase in the next stage is skipped for this Bin. This is done to avoid redundant computes that might be picked up by the hardware in cases where the independent draw-call spans multiple tiles but will fail the depth test on most of the tiles. If the draw-call is picked up for complete rendering without rendering the other tiles, there could be unnecessary pixel-shader computes and hence these draw-calls are binned into a tile-independent Bin which is picked up for processing after all the independent bins are processed and before the dependent bins are picked up for processing in the next stage. Also, if the draw-call is binned into all the tiles it touches, then it will increase the vertex-shader computes in the next stage.
d. A heavy-weight dependent draw-call which touches multiple tiles is sorted into all the Bins corresponding to the tiles touched.
All the Bins touched by dependent draw-calls are tagged to be "dependent".
While sorting the draw-calls, the system also generates the sub-tile-mask tables for all the render-passes. Each render-pass can have multiple sub-tile-mask tables. The number of sub-tile mask tables for each render-pass is dependent on the number of render-passes whose outputs are used as textures in the current render-pass.
2. Sift Stage: The second stage; the system traverses back from the final render-pass to the first render-pass to sift out the sub-tiles in each render-pass which do not affect the final output.
3. Execute Stage: After the sift stage, the (bin-lists corresponding to all the) render-passes are executed in the order in which the application issued them. Each bin in the bin-list created during the sort stage is taken through the following two passes. The first pass is the Pre-Z pass and is taken to populate the depth buffer to the final values. This pass doesn't perform raster computes or pixel-shader computes. The next pass is the Render pass which renders the entire bin using the depth buffer populated during the Pre-Z pass phase. During both the passes above, the hardware executes only those sub-tiles (sub-bins) which were sifted out during the "sift" stage above.
While processing the bins in the bin-list in this stage, the hardware first works on the bins which are not tagged "dependent", then to the tile-independent bin and finally the bins which are tagged "dependent". The two passes i.e. Pre-Z pass and Render pass are detailed below:
a. Pre-Z pass: The draw-calls in the Bins are processed till the depth-test stage and the depth buffer is updated for the tile. The depth buffer of the bins processed during this pass is updated to final values of the depth buffer at each pixel in the screen space. The rasterization of pixels is taken up in the next pass. As the depth buffer is updated to the final values at all pixels in the bins processed in this pass, the next pass doesn't see any overdraw on any pixel in these bins. This allows reducing computes in core. The Pre-Z pass phase is bypassed for the final tile-independent Bin.
b. Render pass. The final pass renders the entire Bin-List. While processing Bins in the Bin-list, the Bins which are not tagged "dependent" are processed ahead of the Bins which are tagged "dependent".
3.2 Detailed Description of Operation
3.2.1 Driver
The software driver of the graphics engine does the following:
The driver compiles the application provided vertex shaders into three versions of vertex-shaders.
A. Vertex-Position-Shader. This version of the shader carries only those instructions which affect the position attribute.
B. Vertex-Position and Texture-Coordinate Shader. This version of the shader carries instructions pertaining to vertex position and texture attributes.
C. Render-Pass Vertex-Shader.
For each render-pass, the driver allocates memory for Bin-List based on the number of draw-calls, their instance counts and the number of whole frame-buffer commands like "Clear". There is memory allocated for one extra Bin which is tile-independent. Example: If there are 3 draw-calls in the render-pass with an instance count of 1, 2 and 3 respectively, then the amount of memory allocated for the Bin List $$\text{Sizeof(Bin-List)} = \{\text{Sizeof(Bin-Header)} + [\text{Sizeof(Bin Commands)}*(1+2+3)]\} * [\text{Number of 256} \times \text{256 pixel tiles in the viewport} + 1]$$

The driver identifies and marks the draw-calls whose pixel-shaders use raw interpolated texture coordinates to access textures which are the frame-buffer outputs of the previous render-passes. The hardware will use the "Vertex-Position and Texture-Coordinate Shader" for these draw-calls in the sort stage.
For the draw-calls identified in (3) above, the driver:
(i) Allocates memory for a "src-pass sub-tile-mask table" based on the render-target sizes of the source render-pass and the current render-pass. The pointer to this allocation and the source render-passes bin-list state pointers are paired and loaded in the bin-list of the current render-pass as "src-pass params". There could be multiple "src-pass params" associated with a bin-list.
(ii) Identifies the texture coordinate in the vertex-shader which is used to access the texture from the previous render-pass. The texture-coordinate ID, the pointer to the memory allocated are paired and loaded in a "src-pass" state packet of the draw-call. There could be multiple "src-pass" state packets associated with a draw-call.
The driver also identifies the draw-calls which are order-dependent and marks them in the state to be dispatched to the hardware. A draw-call is order-dependent if it has any of the following state enabled:
Alpha Blending.
Computed-Z.
Discard Instruction in Pixel Shader.
Per Pixel tests like Alpha/Stencil tests are enabled.
The driver allocates a control buffer for each render-pass of the frame of the size of the render-target with a depth of 1 bit per pixel. The pointer to this "control buffer" is loaded in the Bin-List state.
The driver en-queues the "Sort" command in the command stream of the batch-buffer at the beginning of every render-pass. The "Sort" command carries the Bin-List state.
The Bin List State is programmed with the following data: Pointer to the Bin-List memory allocation, Pointer to the "control buffer", Bin Size/Stride (in Bytes), current-pass sub-tile-mask, src-pass parameters and Binning Enable. The Binning Enable field provides control to the driver to turn off the Binning Scheme.
The driver also signifies the first command in the stream pertaining to every draw-call. The hardware stores the pointer to the first command as the draw-call identifier in the bins during the Sort stage. During the Process stage, the hardware accesses the draw-calls using this draw-call identifier.
Assign a weight to each draw-call based on the number of vertices and the compute requirement of the vertex shader bound to the draw-call. While queuing the draw-calls in the batch-buffer the weights of all the draw-calls is accumulated for the entire render-pass. The software then loads this total weight for the render-pass in the Bin-List state. Also, a "ratio" is loaded which hardware can use to determine if a draw-call is heavy. The "heavy" determination task is moved to hardware to prevent the software from parsing all the batch-buffers again to tag the draw-calls "heavy". The software can program the ratio to a "1" if it wants to disable and keep the tile-independent Bin empty.

The driver repeats 1-10 above for all the render-passes.

After all the render-passes for a frame are taken through 1-10 above, the driver en-queues "sift" commands for each render-pass in the command stream of the batch-buffers. The "sift" command carries a render-pass bin-list state pointer. When the hardware receives the "sift" command, it reads the src-pass parameters in the bin-list and generates a final sub-tile mask for the src-pass using the src-pass sub-tile-mask table. The final sub-tile mask is then overlaid onto the "current sub-tile-mask" field of the src-pass bin-list state. The "sift" commands are en-queued in the reverse-order of the order in which the render-passes were issued to the system by the application.

Finally, the driver en-queues the "Execute Bin-List" commands in the command stream of the batch-buffer for all the render-passes. The command carries the pointer to the Bin-List to be processed.

3.2.2 Hardware

For a 16b per-pixel depth/color buffer, a 256×256 block of pixels will need 128 Kilo-Byte of memory and for a 32b per pixel depth/color buffer, a 256×256 blocks of pixels will need 256 Kilo-Byte of memory. The last-level unified-caches in the processor systems which are over the size of 1 MegaByte can be used to host the above storage.

The hardware entry point is the Ring Buffer which points to the batch-buffers carrying the commands for the hardware i.e. draw commands. The first command that software en-queues for a render-pass is the "Sort" command which carries the "Bin-List State". The hardware latches on to the state carried by the command till the next "Sort" command is received. The Bin-List state carries information to determine the offset of a bin corresponding to a 256×256 tile in the render-target. Bin0 corresponds to the top-left 256×256 tile. Bin1 maps to the 256×256 tile to the right of the top-left tile. Bin2 maps to the tile to the right of the tile mapped to Bin1. This continues to the next row of 256×256 tiles after the width of the render target is covered and this goes on till the entire render-target is covered in X and Y dimensions.

There is one more Bin attached at the end which is tile-independent. All heavy-weight independent draw-calls are sorted into this bin to avoid redundant computes. This is explained in more detail in the next section.

3.2.2.1 Sort Stage:

Hardware decodes the commands from the batch-buffer and if the command is "Sort" and "Binning" is enabled in the command, then its sets its state to "Sort State". If "Binning" is disabled, the hardware continues to work in the conventional "Immediate-Rendering" mode i.e. the default mode. The hardware state changes to "Sift State" and "Execute State" upon the arrival of the "Sift Render-pass" and "Execute Bin-List" command respectively. While in the sort state, hardware performs the following operations on a draw-call received:

i. All the frame-buffer clear commands are loaded into all the bins except the tile-independent bin.
ii. Uses the vertex-position shader for vertex shading if the src-pass states do not point to any source render-pass. The software compiler extracts a shader which carries the computes effecting vertex positions only from the application provided vertex-shader. This extracted vertex-position shader is used in the Sort Stage and Pre-Z pass phases of processing. The final render-pass uses the complete vertex-shader provided by the application.
iii. Uses the vertex-position and texture-coordinate shader if the source-pass states point to any source render-pass. The software compiler extracts a shader which carries the computes affecting vertex positions and texture coordinate attributes from the vertex shader provided by the application.
iv. After the vertex shading, the hardware takes the draw-call through the graphics pipeline till the viewport-transform stage which determines the bounding box of each primitive (point/line/triangle) in 2D screen space. The bounding boxes of all these primitives for the draw-call are accumulated to arrive at the bounding box of the draw-call. The bounding box of the draw-call is determined as follows:

$$\text{Bounding Box}_{top-left-x} = \text{Min}(\text{Bounding Box}_{top-left-x} \text{ of all triangles})$$

$$\text{Bounding Box}_{top-left-y} = \text{Min}(\text{Bounding Box}_{top-left-y} \text{ of all triangles})$$

$$\text{Bounding Box}_{bottom-right-x} = \text{Max}(\text{Bounding Box}_{bottom-right-x} \text{ of all triangles})$$

$$\text{Bounding Box}_{bottom-right-y} = \text{Max}(\text{Bounding Box}_{bottom-right-y} \text{ of all triangles})$$

Figure 24:
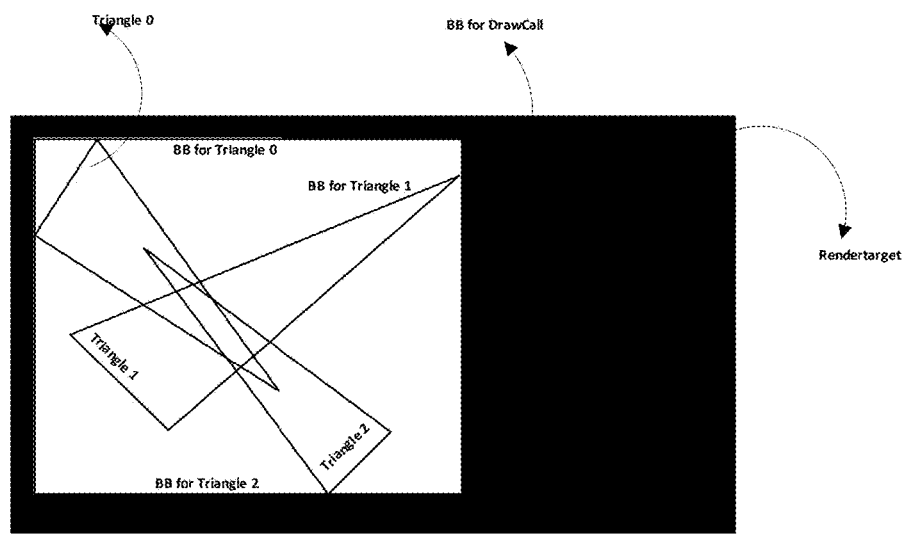
FIG. 24 shows an embodiment of efficient graph processing.
Figure 25:
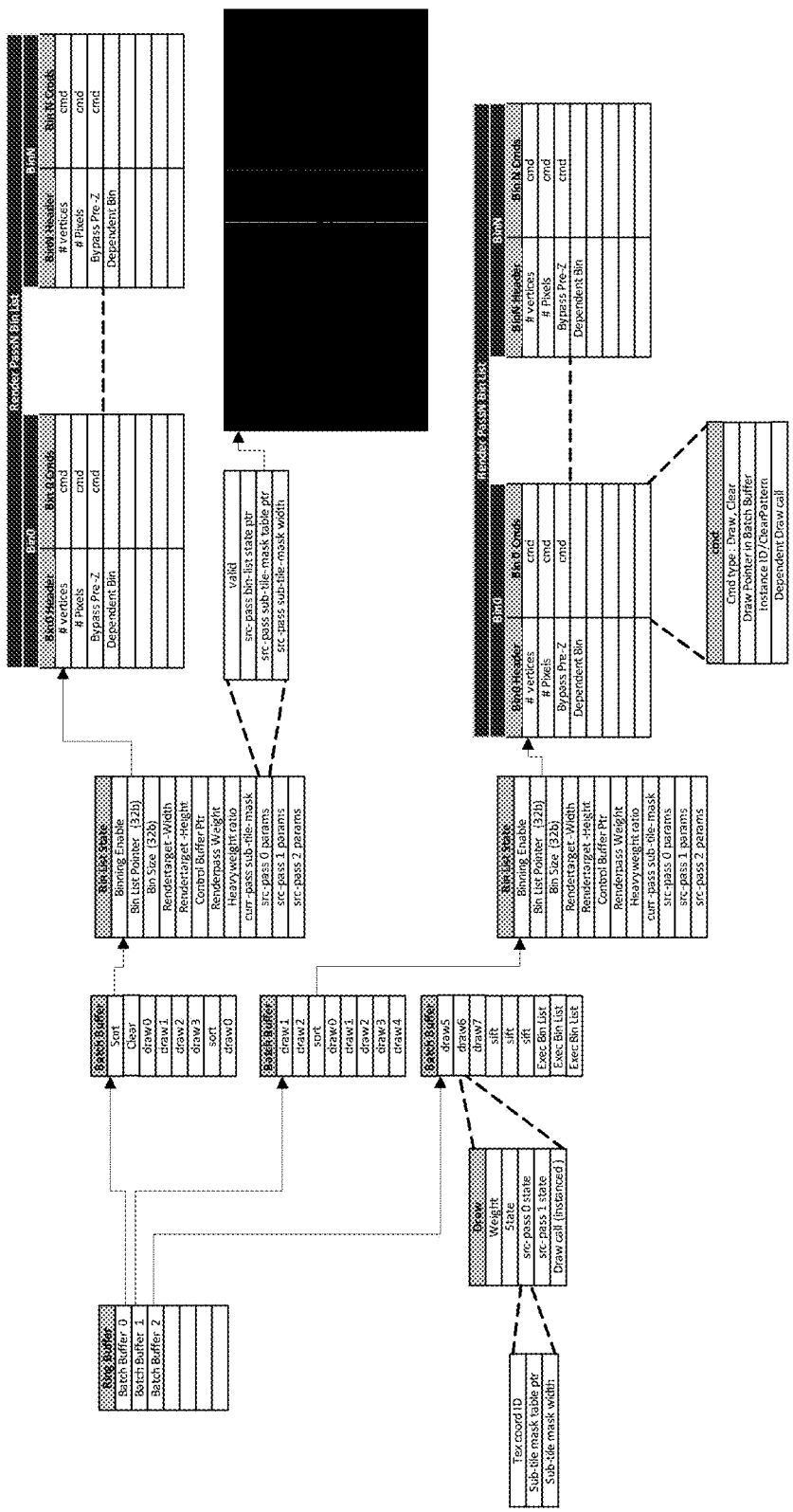
FIG. 25 shows an embodiment of efficient graph processing.

For example, if a draw-call has 3 triangles whose bounding boxes are (offset: 10,10], width: [100], Height: [100]), (offset: [20,20], width: [200], Height: [100]) and (offset: [50,50], width: [100], Height: [100]), then the bounding box of the draw-call is (offset: [10,10], width: [210], Height: [140]). Refer to the FIG. 24.

v. Based on the bounding box determined above, the tiles or Bins touched by the draw-call are determined.
vi. Also, the hardware walks each triangle in the screen-space to determine the 64×64 sub-tiles that it covers in the screen-space.
vii. If the draw-call carries source-pass state, the hardware walks each triangle in the texture-space using the texture coordinates to determine the 64×64 sub-tiles covered in the texture-space. Hardware then uses this information along with the size of the sub-tile-mask to determine the bits to be set in the sub-tile-mask for the texture. This texture-space sub-tile-mask generated is overlaid onto all the sub-tiles that were determined to be covered in screen-space ((vi) above).
viii. The total vertex count is also determined for each bin.
ix. The draw-call is then binned based on the two parameters: draw-call type and the weight of the draw-call.
  a. A draw-call which touches only 1 tile is sorted into the corresponding Bin.
  b. A light-weight draw-call which touches multiple tiles is sorted into all the Bins corresponding to the tiles touched.
  c. A heavy-weight independent draw-call which touches multiple tiles is sorted into the tile-independent final Bin. This is done to avoid redundant computes that might be picked up by the hardware in cases where the independent draw-call spans multiple tiles but will fail the depth test on most of the tiles. If the draw-call is picked up for complete rendering without rendering the other tiles, there could be unnecessary pixel shader computes and hence these draw-calls are binned into a tile-independent Bin which is picked up for processing after all the independent bins are processed and before the dependent bins are picked up for processing in the next stage. Also, if these draw-calls are binned into all the tiles they touch, then it will result in redundant vertex shader computes in the next stage.

d. A heavy-weight dependent draw-call which touches multiple tiles is sorted into all the Bins corresponding to the tiles touched.
x. All the Bins touched by dependent draw-calls are tagged to be "dependent".
xi. The draw-calls which get completely clipped or culled i.e. the ones which do not reach the viewport transform stage are dropped and not placed into any bin.

In the binning scheme being proposed, the additional bandwidth requirement during Sort phase for a render-pass with 150 draw-calls is around 150*8 bytes*32 bins=50 KB*2(rd/wr)=100 KB approx.

3.2.2.2 Sift Stage

The hardware moves to "SIFT" state when it receives the "sift" commands. The sift command carries the bin-list state pointer for a render-pass. Hardware traverses through the src-pass-parameters entries in the bin-list state and does the following for each entry:
  (i) Use the src-pass sub-tile-mask table pointer and the sub-tile-mask width to read in all the sub-tile-mask entries in the table.
  (ii) All the sub-tile-mask entries are bit-wise ORed to arrive at a single sub-tile-mask.
  (iii) The sub-tile mask generated in (ii) is overlaid onto the curr-pass sub-tile-mask field in the bin-list state of the source render-pass. The bin-list state of the source render-pass is pointed to by the src-pass bin-list state ptr field in the source-pass parameters.

The software issues a SIFT command for each render-pass in the reverse order of the order in which the render-passes were issued by the application to the system. After all the SIFT commands are executes, the curr-pass sub-tile-masks of all the render-passes will be signifying the sub-tiles of each render-pass which need to be processed.

3.2.2.3 Execute Stage

Figures 26, 27, 28:
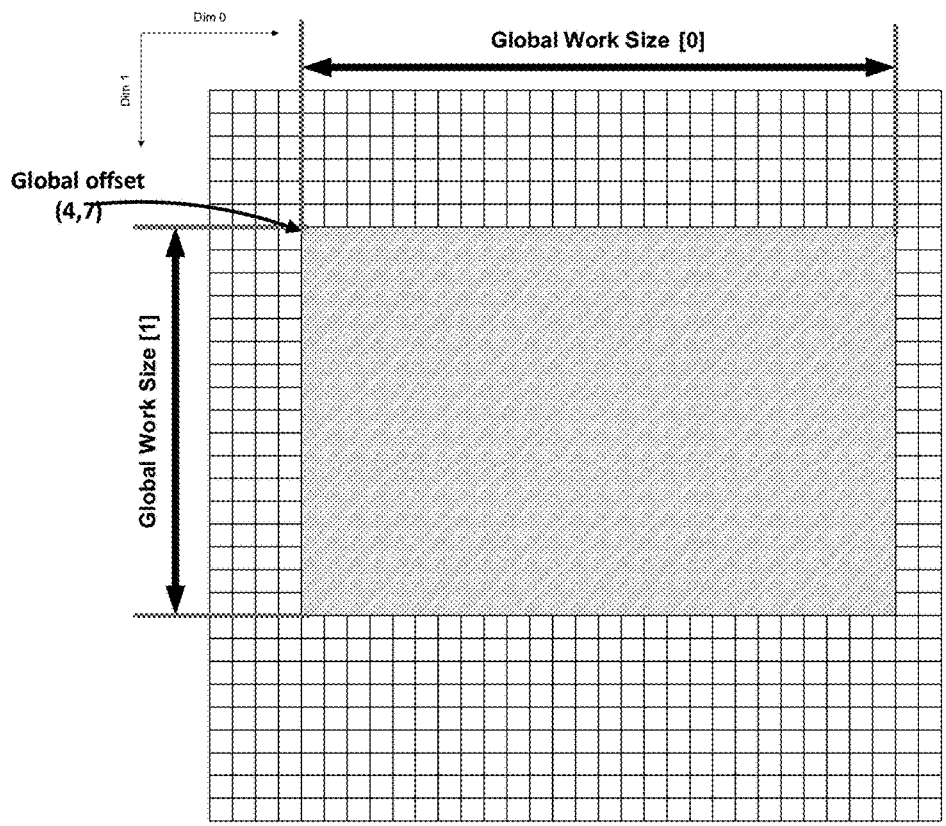
FIG. 26 shows an embodiment of depth test function.
FIG. 27 shows an embodiment of depth test function.
FIG. 28 shows an embodiment of efficient graph processing.
Figure 29:
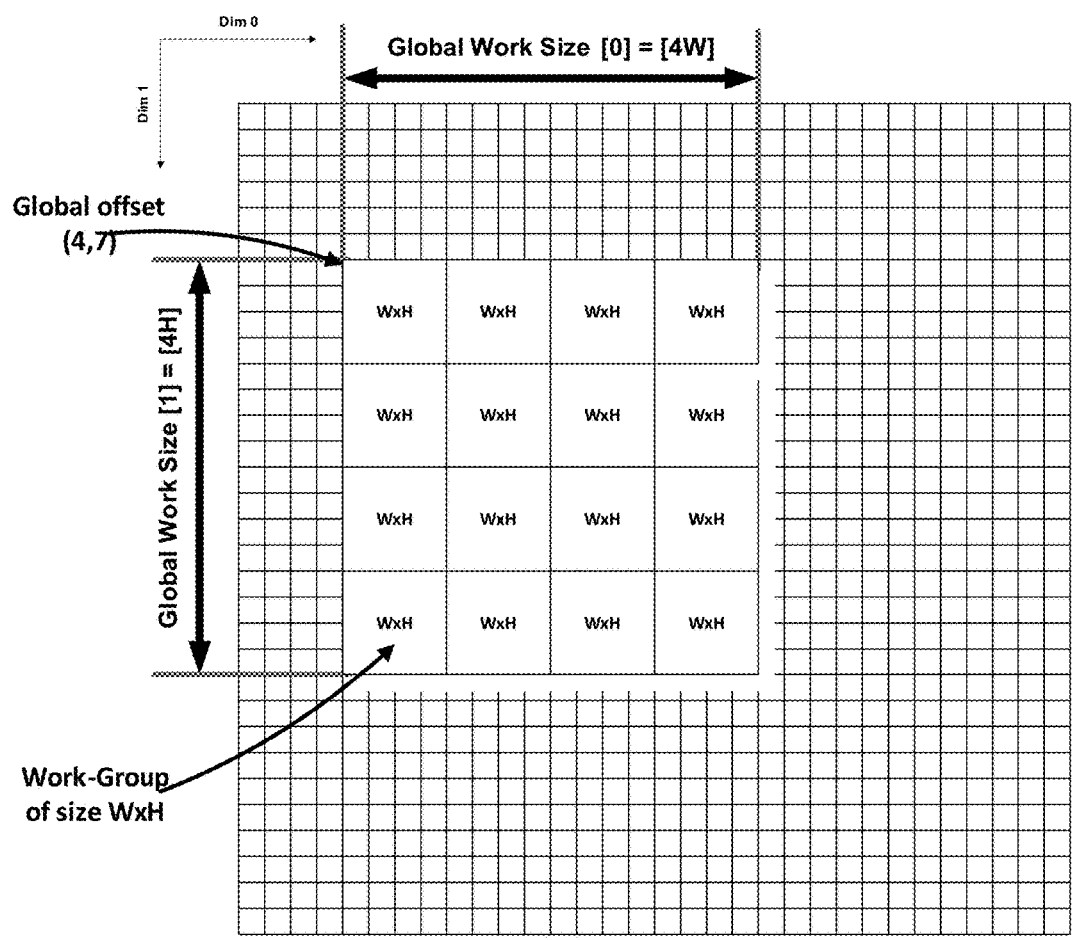
FIG. 29 shows an embodiment of efficient graph processing.2
Figure 30:
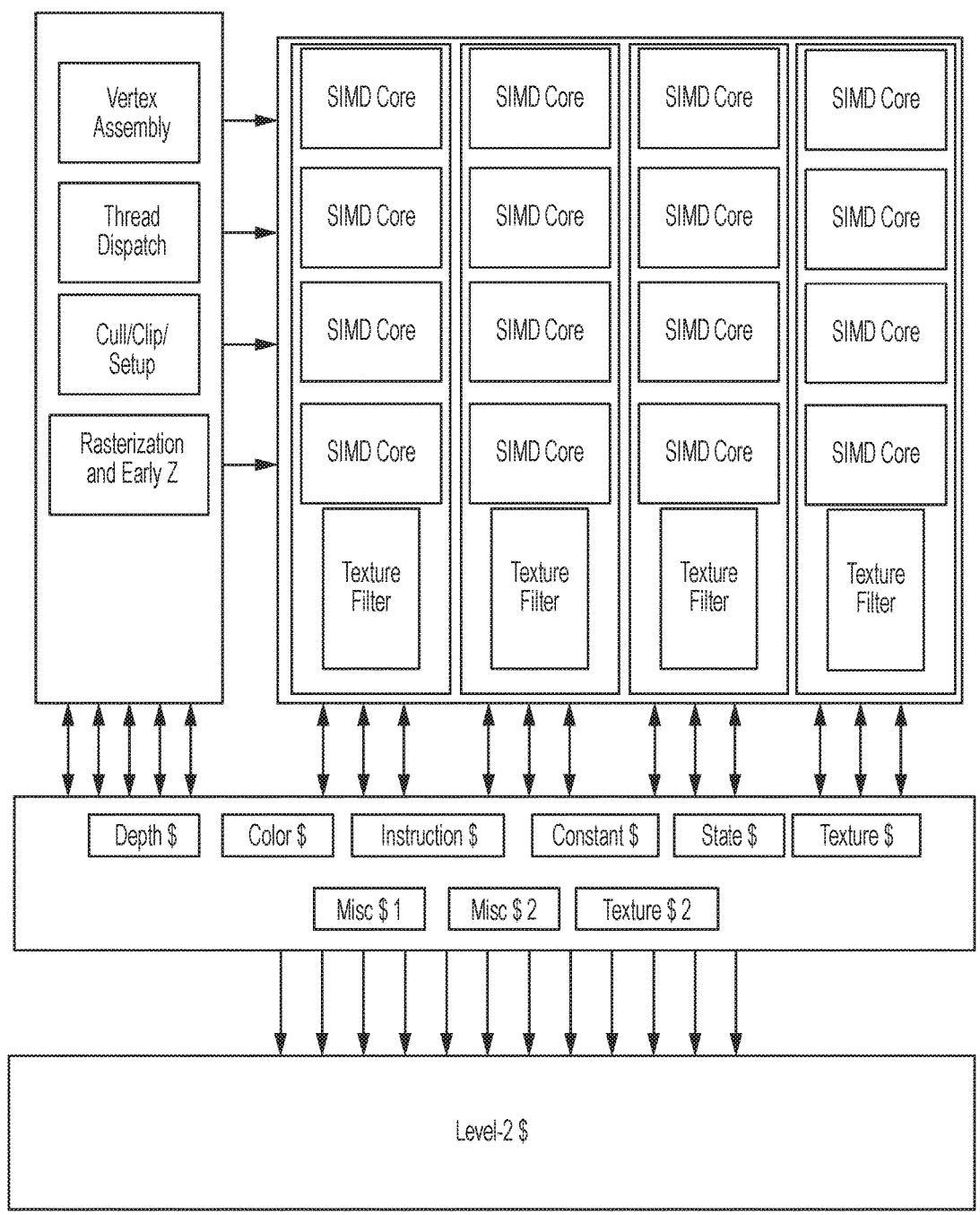
FIG. 30 shows an embodiment of efficient graph processing.
Figure 31:
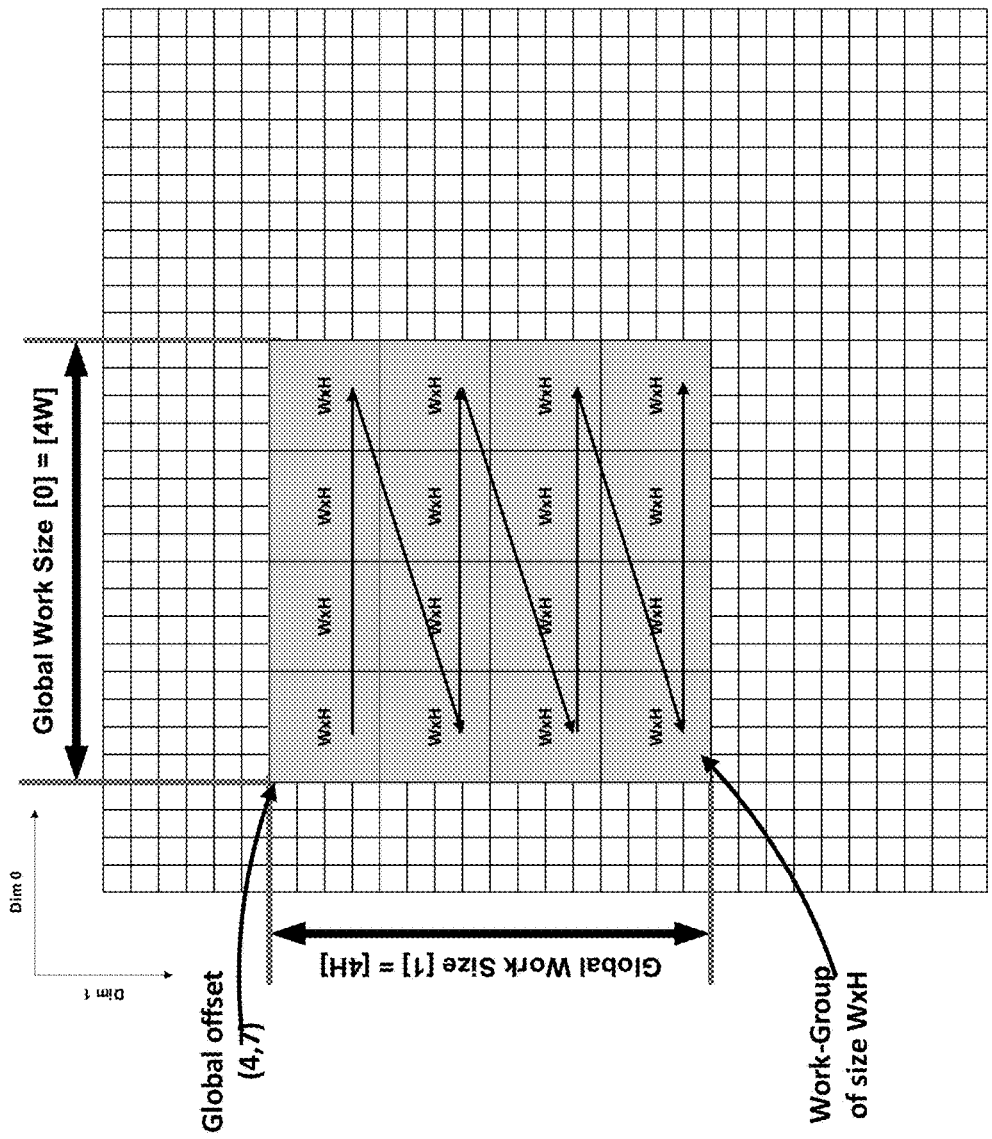
FIG. 31 shows an embodiment of efficient graph processing.
Figure 32:
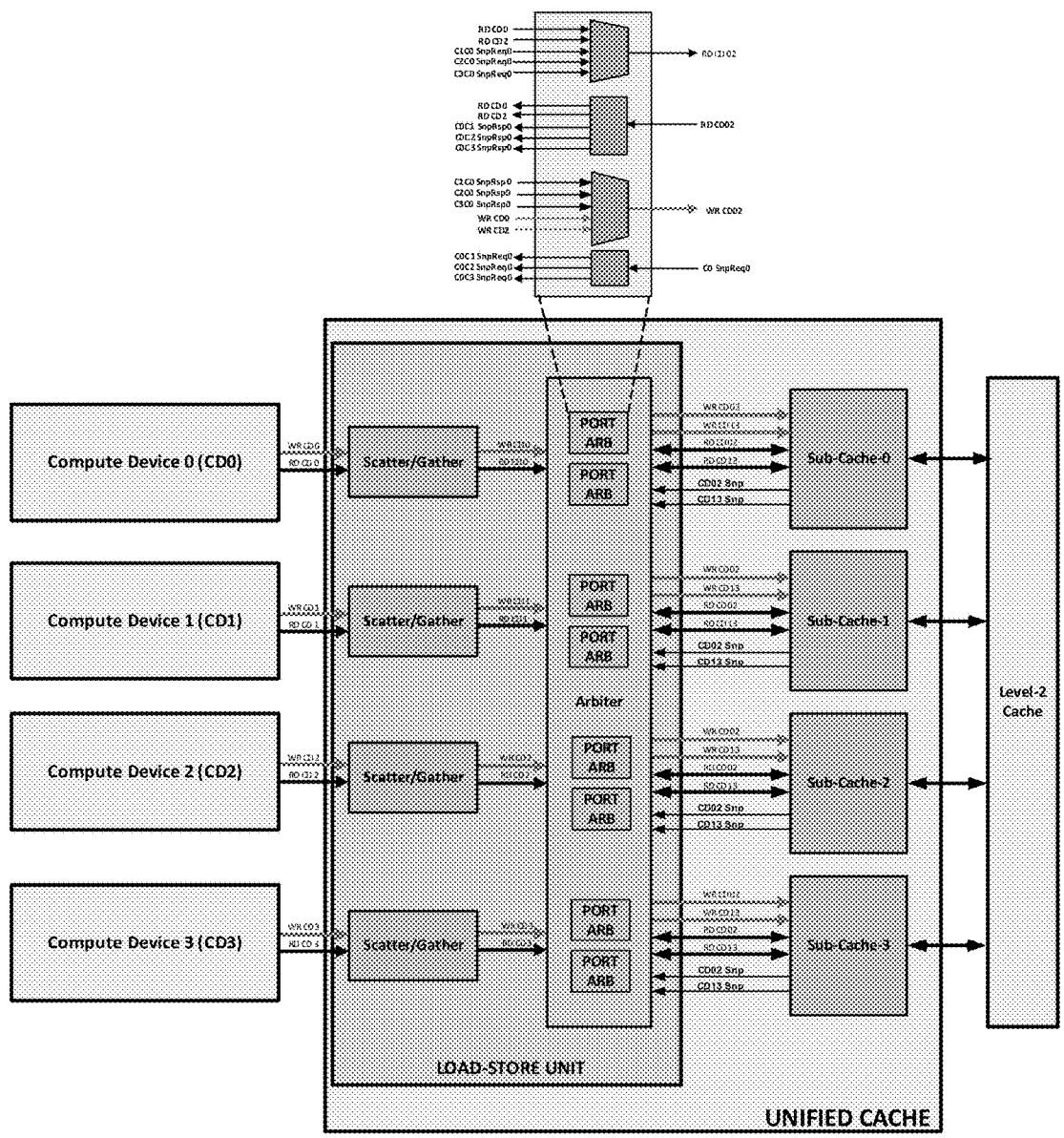
FIG. 32 shows an embodiment of a computing system.
Figure 33:
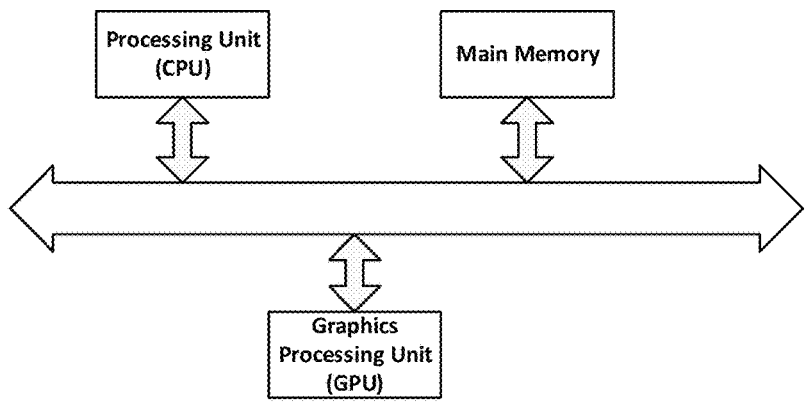
FIG. 33 shows an embodiment of efficient graph processing.

When an "Execute Bin-List" command is decoded from the batch-buffer, the hardware switches to the "Execute" State. The "Execute Bin-List" command comes with the pointer to the Bin-List State which points to the Bin-List to be processed. The hardware uses the current-pass sub-tile-mask generated during the "SIFT" stage to determine the sub-tiles whose pixels will be processed during the "Execute" stage. The hardware processes the Bin-list in the following order:
  1. The independent Bins: The hardware parses through all the Bins in the Bin-list and executes only the independent bins first. The tile boundaries are honored during the processing of all the commands in the independent bins. It takes each bin through two passes:
     (i) Pre-Z pass: During the Pre-Z pass, the draw-calls are processed till the depth-test stage and the depth buffer is updated. As the tile boundaries are honored, the depth-test is only performed on pixels which lie on the corresponding tile of the bin and which lie on the sub-tiles which are enabled in the sub-tile-mask. Hence, the depth buffer is not accessed for pixels outside of the corresponding tile of each bin and for sub-tiles which are masked off. At the end of this pass, the depth buffer is updated to the final value for all the pixels corresponding to the tile.
     (ii) Render Pass: The bin is then taken through the Render Pass which renders the draw-calls to the color buffer. The hardware processes only those pixels which on the corresponding tile of the bin and while on the sub-tiles which are enabled in the sub-tile-mask. In this pass, the hardware uses the application-provided shaders and depth buffer created during the previous Pre-Z pass. The depth-test function is implicitly changed as in FIG. 26:

Tile-Independent Bin: After all the "independent" bins are executed, the tile-independent bin is picked up for processing. The tile boundaries are not honored while processing this bin but the curr-sub-tile-mask is used to suppress the processing of pixels corresponding to the sub-tiles which are masked off. The draw-calls in this bin are not taken through a Pre-Z pass as done with the "independent" bins above in (1). They are taken through the render-pass directly and the output depth and color buffers are updated.

Dependent Bins: After all the independent bins and tile-independent bin are executed, the hardware picks the dependent bins for processing. The tile boundaries are honored while processing these bins. As the tile boundaries are honored, the hardware doesn't access the depth, control and color buffers for pixels outside the tile boundary and those which fall on the sub-tiles which are disabled in the sub-tile-mask. Hardware takes each of these dependent bins through two passes:
  (i) Pre-Z Pass: An implicit "control buffer" clear is performed before the commands in the bin are processed. Once the control buffer is cleared, the draw-calls are processed till the depth-test stage and the depth buffer is updated for pixels whose control bits are not set in the "control buffer". The control buffer is a 1-bit per-pixel resolution buffer which is used by the hardware to tag a pixel as "dependent" when the pixel is touched by a dependent draw-call. Once a pixel is tagged "dependent", the depth buffer updates to the pixel are stopped during the Pre-Z pass phase. As the tile boundaries are honored during the Pre-Z pass, the depth-test is only performed on pixels which lie on the corresponding tile of the bin and which lie on the sub-tiles which are enabled in the current-pass sub-tile-mask. Hence, the depth buffer is not accessed for pixels outside of the corresponding tile of each bin. At the end of this pass, the depth buffer is updated to the final value for all the pixels corresponding to the tile.
  (ii) Render Pass: The bin is then taken through the Render Pass which renders the draw-calls to the color buffer. As the tile boundaries are honored during this pass also, the pixels which lie on the corresponding tile of the bin and which lie on the sub-tiles which are enabled in the curr-pass sub-tile-mask are only processed. In this pass, the hardware uses the application-provided shaders and depth buffer created during the previous Pre-Z pass. The depth-test function is implicitly changed as in FIG. 27.

Methodology and Apparatus to Unify Fixed-Function Caches of a GPU in GPGPU Mode of Operation Traditional/conventional GPUs use an array of compute devices (execution units) and function-specific caches like depth-cache and color-cache. These caches are each tied to a surface like depth, color etc. While the surface-tied cache scheme works well for conventional 3D graphics API, it has its shortcomings for General-Purpose Graphics Processing Unit (GPGPU) APIs like temporal clogging of accesses to a cache. This happens due to the data-parallel nature of the workloads which the APIs address. One such API is Open Compute Language (OpenCL). A scheme is presented below to unify the function specific caches in a manner to evenly balance the accesses across the caches. While OpenCL is used in the rest of the document for explanatory purposes, the scheme can be extended to other APIs as well.

OpenCL is an open industry standard for programming a heterogeneous collection of CPUs, GPUs and other discrete computing devices organized into a single platform. Using OpenCL, for example, a programmer can write general purpose programs that execute on GPUs without the need to map their algorithms onto a 3D graphics API such as OpenGL or DirectX.

An OpenCL program consists of a host code segment that controls one or more OpenCL devices.

Devices in OpenCL can refer to both CPUs and GPUs. Host code contains the sequential code sections of the program, which is run only on the CPUs, and a parallel code is dynamically loaded into a program's segment. The parallel code section, i.e. kernel, can be compiled at runtime if the target devices cannot be recognized at compile time, or if kernel runs on multiple devices. The OpenCL programming model assumes that underlying devices consist of multiple compute units (CUs) which is further divided into processing elements (PEs). When a kernel is submitted for execution by the host, an index space is defined. An instance of the kernel executes for each point in this index space. This kernel instance is called a work-item and is identified by its point in the index space, which provides a global ID for the work-item. Each work-item executes the same code but the specific execution pathway through the code and the data operated upon can vary per work-item. Work-items are organized into work-groups. The work-groups provide a more coarse-grained decomposition of the index space. Work-items in a work-group are synchronized together through an explicit barrier operation. When executing a kernel, work-groups are mapped to CUs, and work-items are assigned to PEs. In real hardware, since the number of cores are limited, CUs and PEs are virtualized by the hardware scheduler.

The clEnqueueNDRangeKernel API call carries the global-work-sizes and local-work-sizes. The application can choose to allow the implementation to determine the local work-group size by setting the local-work-size argument to NULL.

The global workgroup is divided into local workgroups and each of these local workgroups is processed using a compute device.

OpenCL defines two kinds of memory objects that can be bound to a kernel:
  (i) Buffer Objects: The buffer objects are 1-Dimensional arrays of elements. The elements of a buffer object can be a scalar data type (such as int, float), vector data type or a user-defined structure. The data-type of the elements and the resource view (i.e. height, width etc) are not known at the buffer allocation time. Hence, these resources can't be tiled.
  (ii) Image Objects: Images objects are used to store one, two or three dimensional textures, frame-buffers or images. OpenCL defines special built-in functions for access to image objects.

The above memory objects are bound to an OpenCL kernel as input arguments.

Traditional/conventional GPUs use an array of compute devices (execution units) and function-specific caches like depth-cache and color-cache. These caches are each tied to a surface like depth, color etc.

The surface-tied cache scheme can be extended to GPGPU mode as well i.e. the surfaces bound to a kernel that is being executed on the device can be tied to specific caches. Hence, all the accesses for a surface from the compute devices will go to a specific cache. While the surface-tied cache scheme works well for conventional 3D graphics applications, the scheme results in following inefficiencies for GPGPU applications:

Under-utilization of caches: If the number of surfaces tied to a kernel are not an exact multiple of the number of caches being unified, some caches will have less number of surfaces tied to them.
  If the data formats of the surfaces tied to a kernel vary, then the caches tied to surfaces with larger formats (i.e. with larger bytes/work-item) will see more clogging of requests then the caches tied to surfaces with smaller formats (i.e. smaller bytes/work-item).
  Temporal access clogs on a cache: The threads of a workgroup are scheduled in close temporal proximity. Hence, the thread execution also progresses in close temporal proximity. This temporal proximity in execution can result in temporal proximity of buffer accesses across threads in a work-group. This could result in a temporal clogging of accesses/requests on a cache.

Another possible scheme for unification of the caches is a cache-line based address hashing scheme wherein the bits upward of bit 6 of the address decide the cache hosting a 64-Byte cache-line amongst the 4 caches being unified. Eg: In an architecture with 4 caches, bits [7:6] are used to decide the cache number. Cache-0 hosts the addresses with bit [7:6] carrying "00", cache-1 host the addresses with bit [7:6] carrying "01" etc. This scheme results in frequent data-straddling across caches for a request. A request in an openCL implementation on a GPU originates from a thread which carries multiple work-items of a work-group. Hence a buffer access request from a thread is a collection of sub-requests to different addresses and these addresses could be scattered across multiple cache-lines and caches.

The scheme presented below unifies all the caches into a single unified cache and mitigates the inefficiencies described in the above schemes. The rest of document assumes 4 compute devices and 4 function-specific caches for explanatory purposes. The scheme could be appropriately extended to architectures with a different number of compute devices and function-specific caches.

4.2 Unified Cache
4.2.1 Block Hashing

The surfaces bound to kernels are hashed across all the caches using a block-hash-size decided by the work-group size (M) and surface format size (S) in bytes/work-item as follows:

$$\text{Block-Hash-Size} = M*S$$

The compiler determines the surface format size (S) in bytes/work-item for each surface accessed in the kernel at compile time. It also determines the SIMD-Width of the kernel. The software then decides the work-group-size (M) based on the SIMD-Width of the kernel and the number of threads "T" supported by each compute device which hosts a work-group as follows:

$$(M)\text{work-group-size} = T*\text{SIMD-Width}$$

Eg: Let us assume and architecture with 4 surface-tied caches and 4 compute devices with 64 threads each. If a kernel kernel executed on the above architecture has a SIMD-Width of 16 and is bound to two surfaces A and B with surface format sizes (in bytes/work-item) of 16 and 4 respectively, the block-hash-size of surfaces A and B will be 16 KiloBytes and 4 KiloBytes respectively. Hence, for surface A, address range 0-16383 is mapped to cache-0, address range 16384-32767 is mapped to cache-1, address-range 32768-49151 is mapped to cache-2, address range 49152-65535 is mapped to cache-3, address range 65536-81920 is mapped to cache-0 and so on. Similarly, for surface B, address range 0-4095 is mapped to cache-0, address range 4096-8191 is mapped to cache-1, address range 8192-12287 is mapped to cache-2, address range 12288-16383 is mapped to cache-3 and 16384-20479 is mapped to cache-0 and so on.

As portions of all the surfaces are mapped to each of the caches, the caches are completely utilized irrespective of the number of surfaces bound to a kernel. The surface format size usage in the hash-block-size helps in mitigating the request clogging on caches due to surface format size. As the block-hash-size is determined based on the work-group-size, the temporal burst of requests from all the compute devices is now distributed across all the caches. Hence, the temporal clogging of requests at a single cache is reduced. Also, as the hash-size is based on the surface format and the number of threads in a work-group, the probability of sub-requests within a request straddling across multiple caches is reduced.

Work-Group Dimensions

The dimensions Width×Height of the work-group are derived as follows:

$$H<=(W=\text{workgroup width})<=2H$$

$H=$Workgroup Height is a power-of-2 number.

The hardware thread scheduler breaks the rectangular 2D index table into rectangular workgroups with the above dimensions W×H and dispatches each workgroup onto a compute device. The workgroup is dispatched with multiple threads belonging to a compute device and with each thread working in SIMD mode on multiple work-items.

Local Memory

The software implements local memory of the device as a buffer object of size L in the global memory.

$$L=(D\times\text{Local Memory Size}),$$

where D is the number of compute devices in the system.

4.2.2 Hardware Architecture

The Thread Scheduler in the hardware breaks the index space received with the EnqueueNDRangeKernel command into work-groups using the work-group dimensions programmed by the software. Each work-group is spawned onto a compute device with multiple threads. The work-groups are processed in row-major order to enable better utilization of the caches being unified. The threads operate in SIMD mode and hence each thread carries multiple work-items equal to the SIMD-Width programmed by the software.

Loads and Stores originating from a thread carry addresses for all the work-items of the thread. The multiple addresses carried by the loads/stores could be scattered across address ranges hashed to different caches being unified. A Scatter/Gather block in the LOAD-STORE unit examines all the addresses carried by a load/store using the hash-block-size and determines the destination sub-cache (a cache amongst the caches being unified) for each of these addresses.

After the determination of the destination sub-cache for each of the addresses, the loads are routed to the sub-cache to which the load has the maximum affinity (i.e. the sub-cache hosting maximum number of addresses in the Load) through the port arbiters. When routing the Load to the affine cache, each address is marked with the actual destination sub-cache for the address. This affine cache gathers and packs the data for all the addresses in the Load and returns the packed data to the compute device. While gathering the data for a load, the affine cache snoops the other sub-caches for addresses that are marked for other sub-caches. The port arbiters in the LOAD-STORE unit arbitrate the snoop read and normal read requests to the sub-caches. For the purposes of explanation we assume each sub-cache to be having 2 access ports. Each of these access ports have a read, write and snoop port. Access port0 is dedicated for requests from compute device0 and device2. Access port1 is dedicated for requests from compute device1 and compute device3. The scatter/gather block in the load-store unit can receive requests with 16 different CL addresses. The gather logic looks up the state associated with the buffer being accessed and based on the block hash in the state the gather logic tags each of these addresses with the sub-cache id to which the address corresponds to. The gather block then forwards the request to the cache-arbiter. The cache arbiter constitutes of smaller port arbiters. There will be port arbiter per access port for each sub-cache.

Gather

The gather block marks the sub-cache ID for each of the addresses in the read request from compute device and forwards it to the affine sub-cache through the corresponding port arbiter. Upon receiving the request, the sub-cache checks the sub-cache ID of each of the addresses in the request.

If the sub-cache ID of all addresses match with its own sub-cache ID, it indicates that all the data can be gathered from within this sub-cache and no snoop to other sub-caches will be required. The sub-cache gathers the data for each of these addresses and returns the data to the cache arbiter.

If the sub-cache ID of the addresses in the request point to other sub-caches, then a snoop to the corresponding sub-caches will be required. The sub-cache then sequentially issues all the snoop requests on the snoop port of the access port on which the request arrived. The cache arbiter segregates the snoop requests as per their sub-cache IDs and routes them to the respective port arbiters. The port arbiter arbitrates between the requests from the gather block and the snoop requests. During arbitration priority is given to the snoop requests and these snoop requests are issued on the read port of the corresponding access port. When the cache arbiter receives a read response it checks the response to identify if the response corresponds to a snoop request or a gather. If the response corresponds to a snoop request, the response is re-routed to the corresponding sub-cache on the write port of the corresponding destination access port. The sub-cache receiving the snoop response, although stores the response in its data-ram (storage of the sub-cache, doesn't update the corresponding tag qualifier. Hence, any explicit read requests to these snooped data in a sub-cache will not result in a cache-hit. The sub-cache gathers the data from all the snoop responses and sends the gathered data back to the cache arbiter on the read response port. The port arbiter forwards this response back to the respective compute device which made the corresponding request.

Scatter

For a scatter request, the scatter/gather unit first determines the destination sub-cache for each address in the request using the block-hash state for the buffer being accessed. The scatter unit then scatters the stores to the cache arbiter which in turn uses the respective access ports of the sub-caches to issues stores.

Texture Layout in Memory 5.1

A graphics engine is used in a number of applications such as 3D games, 3D movies, CAD and User Interface applications. A conventional 3D graphics engine takes a database of 3D objects described with basic primitives as triangles, lines, points and corresponding state as input and takes it through multiple stages of the graphics pipeline to render two-dimensional images. At each vertex of these primitives, a set of attributes like color, fog, depth and texture coordinates are defined. The three-dimensional primitives are mapped to the screen space and the attribute values are interpolated at each pixel covered by the primitive in the screen space. The texture mapping engine uses the interpolated texture attribute values to map textures onto primitives, hence adding detail to each pixel.

The 3D Graphics API provides support for a variety of textures like 1D, 2D, 3D, Cube, 2D Array textures.

The applications can generate a set of multiple images (mip-maps) at varying resolutions for every texture and pass them to the graphics engine for texturing pixels. The base image has the highest resolution and every image after that is of half resolution in each axis/direction to the resolution of the previous image. Hence, the size of the second image will be one-fourth of the base image; the size of the third image will be one-fourth of the second image and so on. Each of these images are also referred to as Level-Of-Detail (LOD); LOD-0 being the base image; LOD-1 the second; LOD-2 the third image and so forth till the image is of 1×1 resolution.

The rasterizer projects the 3D primitives to screen space and the texture sampling engine uses a 2×2 (quad) group of pixels to arrive at the LOD levels to be used to texture the quad. Hence, the quads within a triangle can access different LODs for texturing. A memory layout scheme is presented below which allows in optimizing texture fetches for the quad and the memory footprint of all the mip-maps.

5.2 Texture Layout

The application hands the textures over to the graphics engine (device) in a linear layout. The device driver allocates a contiguous chunk of memory in the GPU address space enough to store all the mip-maps of the texture. The total memory required to store all the images contiguously is calculated based on the texture dimensions (width, height and depth/array size) of the base image, number of LOD levels and the texture format which could be 1 Byte/Texture-Element (texel), 2 Bytes/texel, 4 Bytes/texel, 8 Bytes/texel or 16 Bytes/texel.

Figure 34:
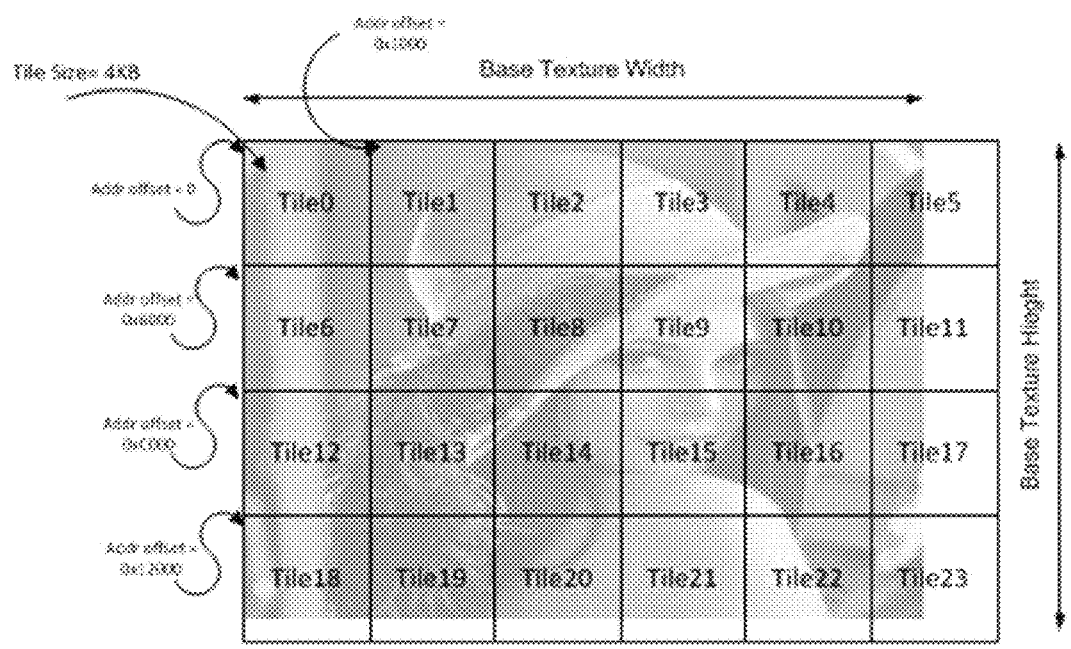
FIG. 34 shows an embodiment of 2D texture.
Figure 34:
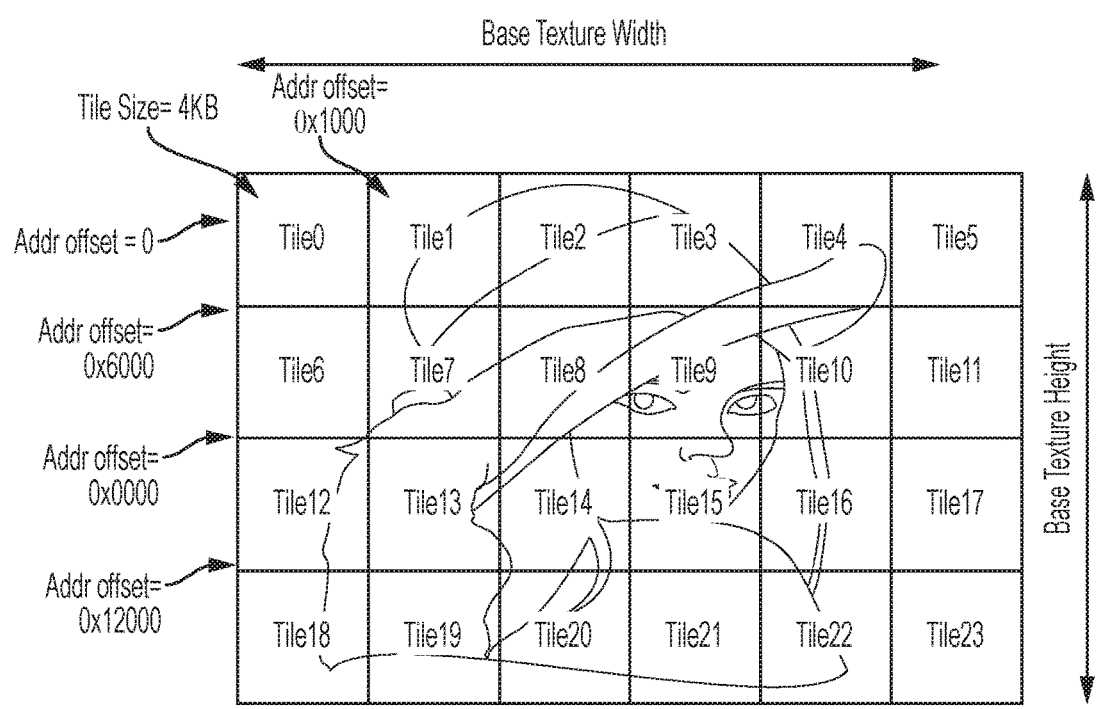

The 2D texture is tiled into square blocks and each block is stored in a 4096 Byte memory block or a Tile (FIG. 34).

Figure 35:
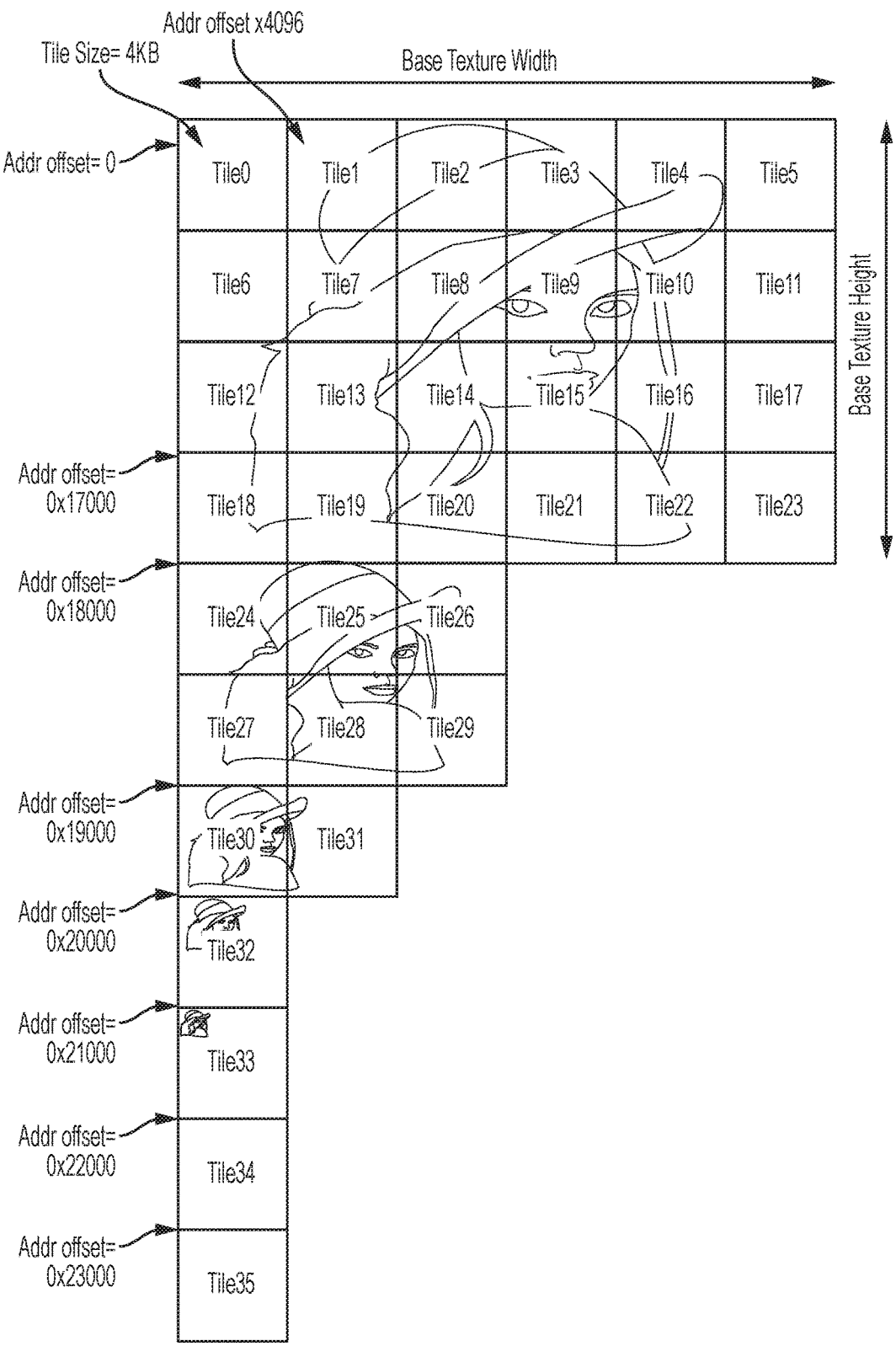
FIG. 35 shows an embodiment of 2D texture.
Figure 36:
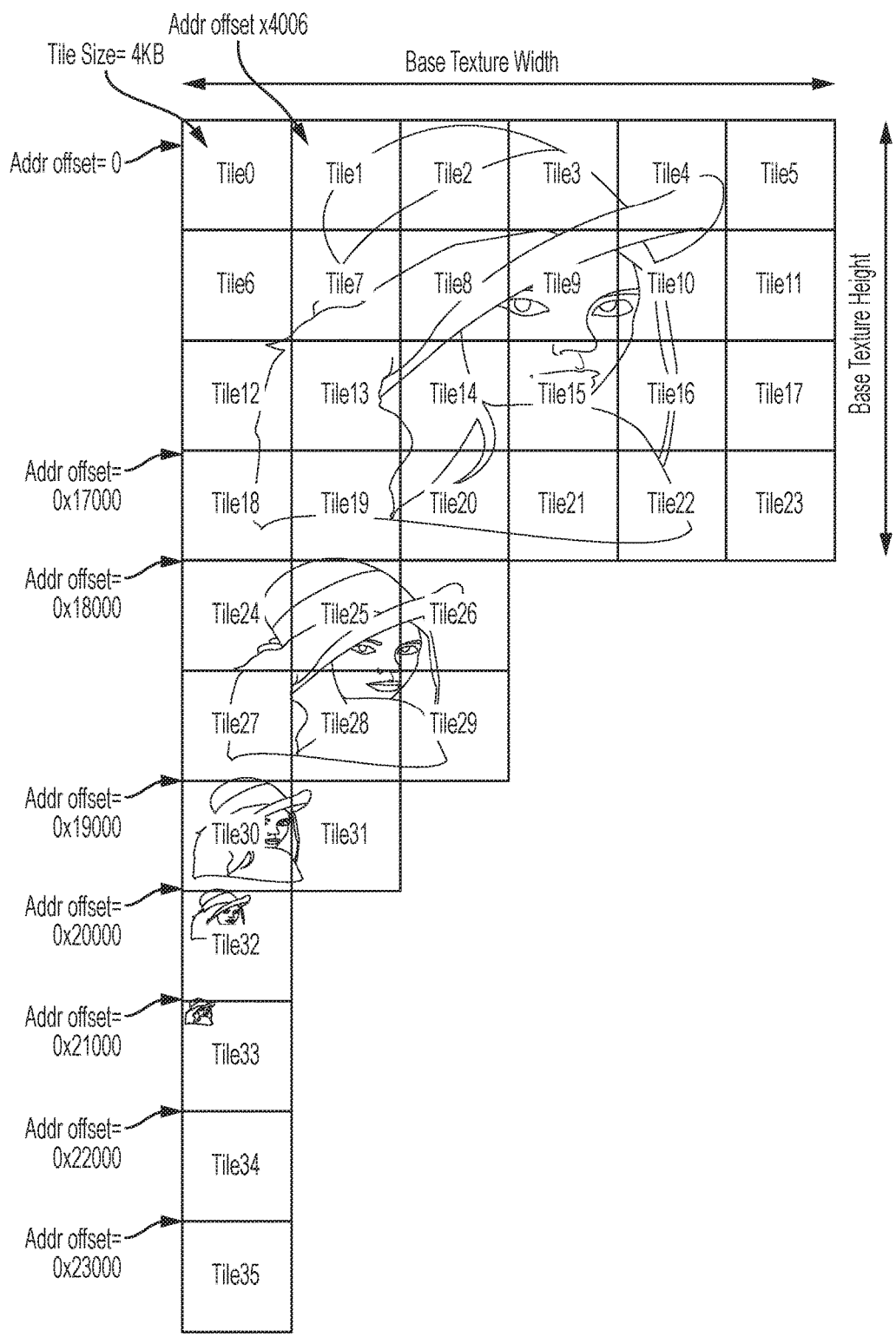
FIG. 36 shows an embodiment of memory layout for base image 0 and its mip-maps
Figure 37:
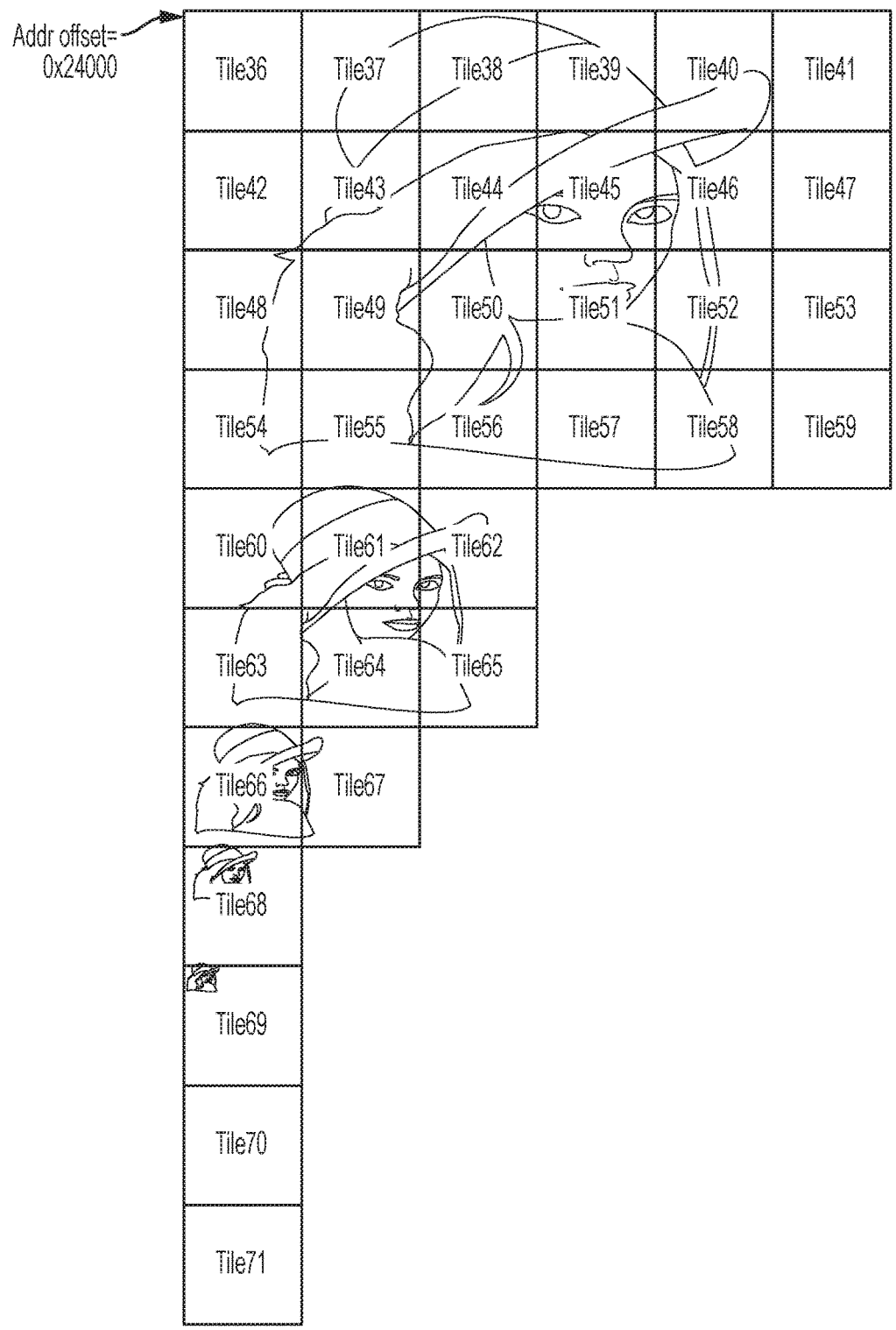
FIG. 37 shows an embodiment of memory layout for base image 1 and its mip-maps.
Figure 38:
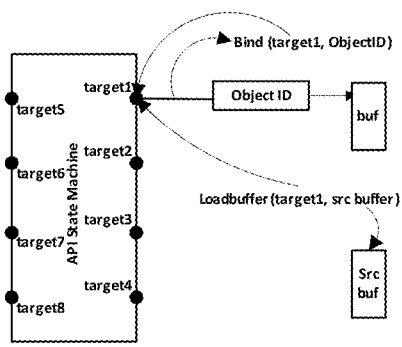
FIG. 38 shows an embodiment of efficient graph processing.
Figure 39:
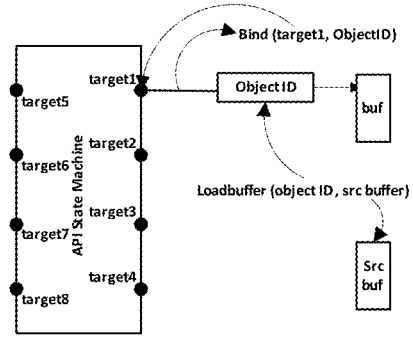
FIG. 39 shows an embodiment of efficient graph processing.
Figure 40:
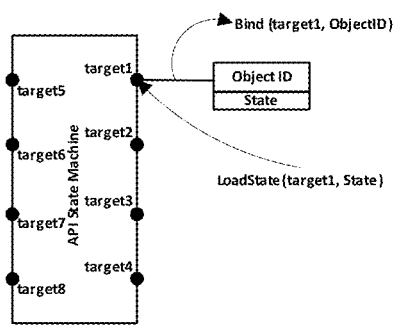
FIG. 40 shows an embodiment of efficient graph processing.
Figure 41:
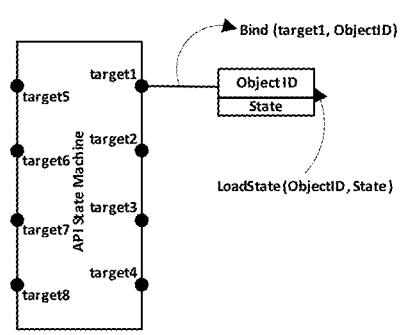
FIG. 41 shows an embodiment of efficient graph processing.
Figure 42:
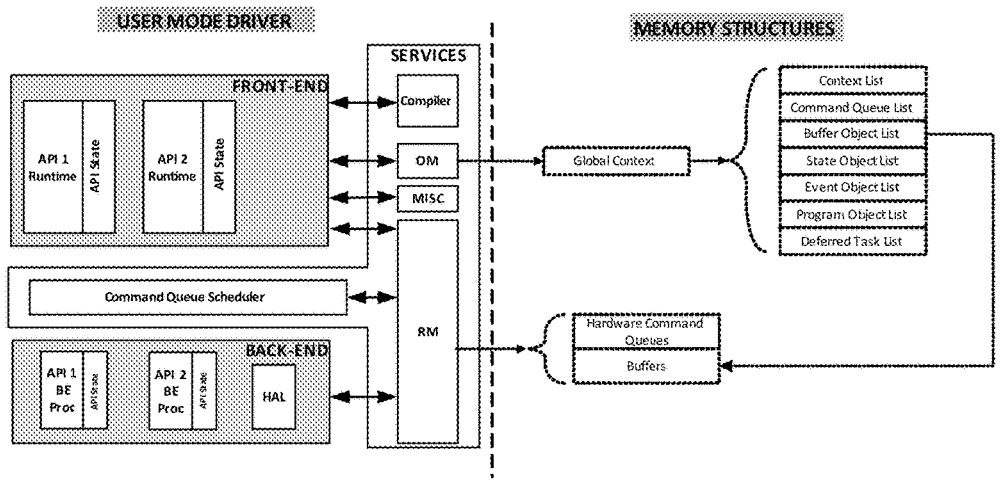
FIG. 42 shows an embodiment of efficient graph processing.
Figure 43:
FIG. 43 shows an embodiment of efficient graph processing.

For 2D textures, the base image and all its corresponding mip-maps are laid out in contiguous 4 KB memory blocks (FIG. 35).

Figures 6, 7:
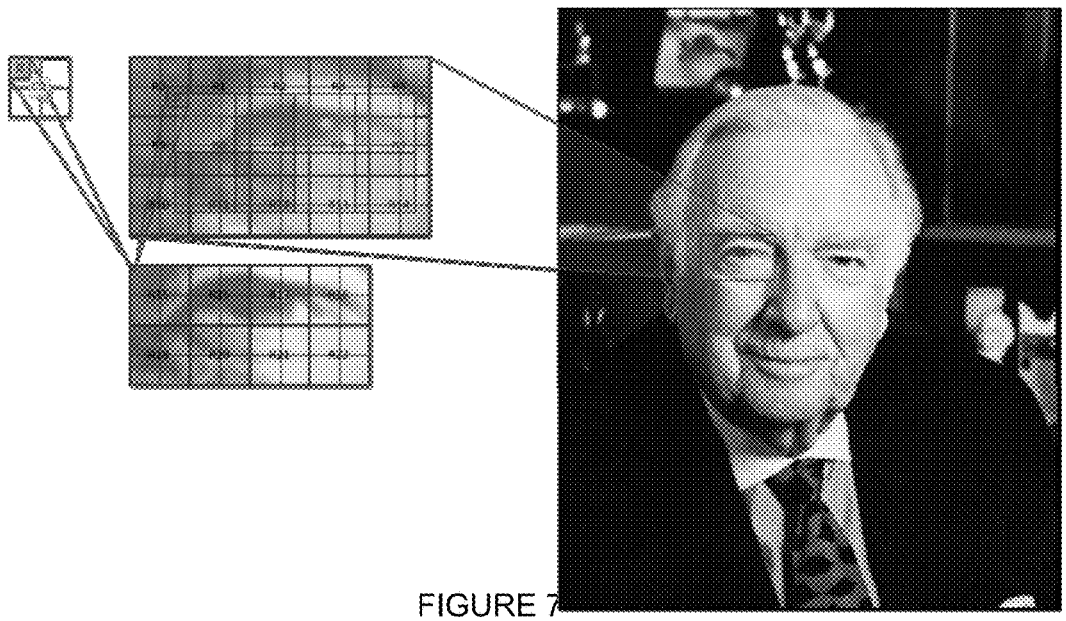
FIG. 6 shows an example of permuted data access.
FIG. 7 shows an embodiment of efficient graph processing.
Figure 8D:
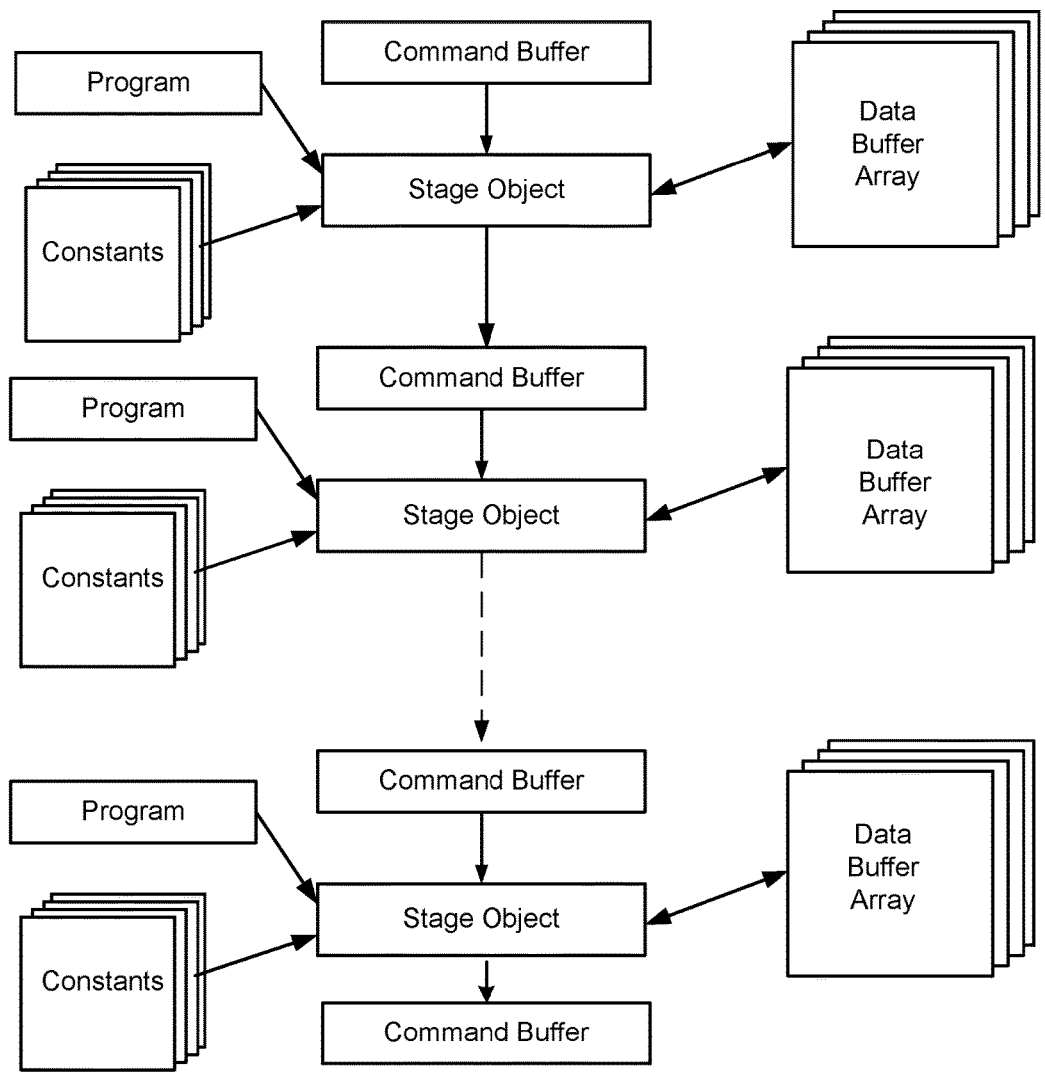
FIG. 8*d* shows an embodiment of nodes and their connectivity.
Figure 8E:
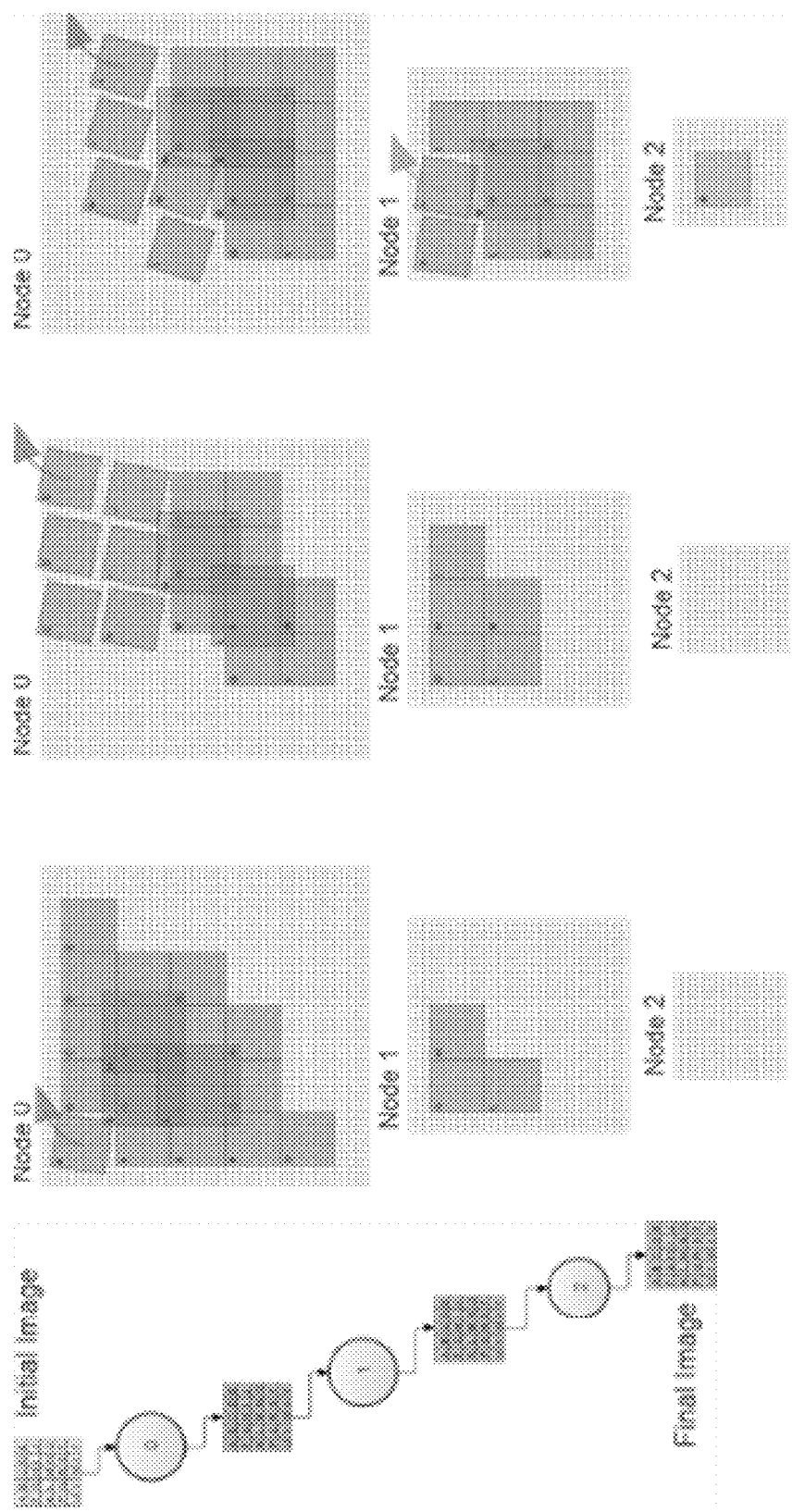
FIG. 8*e* shows an embodiment of nodes and their connectivity
Figure 9:
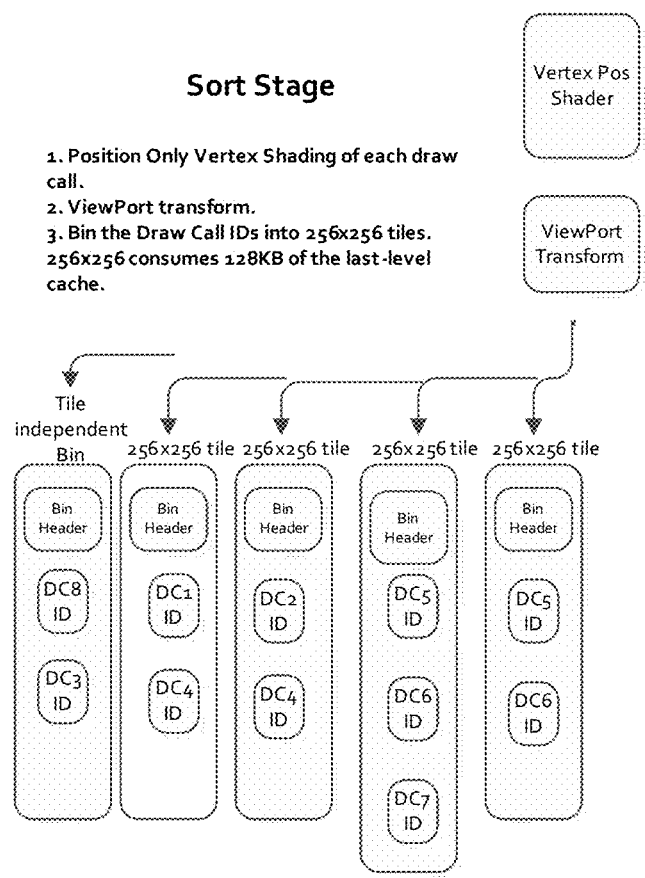
FIG. 9 shows an embodiment of sort stage.
Figure 10:
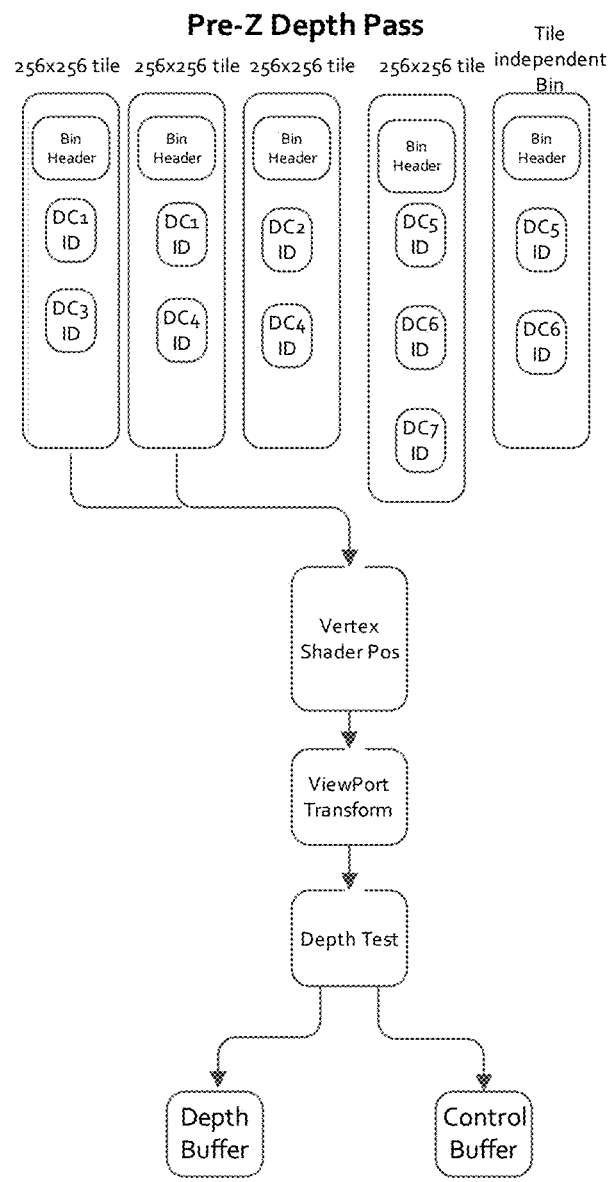
FIG. 10 shows an embodiment of efficient graph processing.
Figure 11:
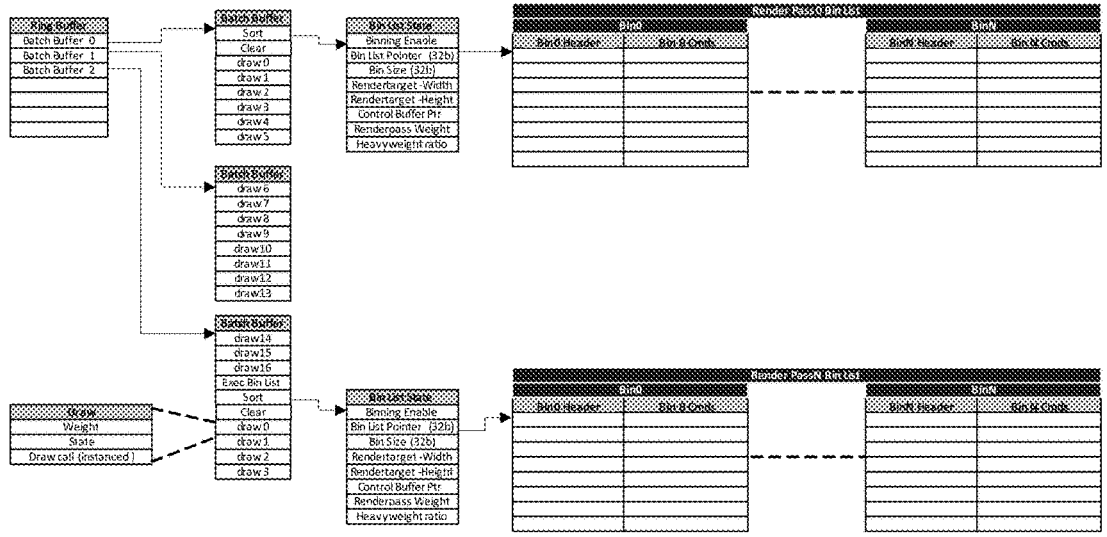
FIG. 11 shows an embodiment of efficient graph processing.
Figure 12:
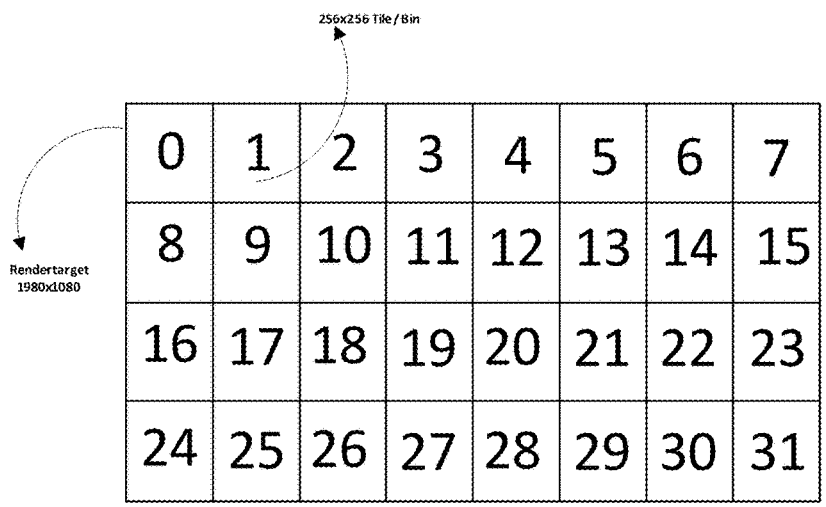
FIG. 12 shows an embodiment of efficient graph processing.

For textures with multiple base images (Eg: Cube textures), each base image has its own set of mip-maps. In this case, the multiple sets of base images and corresponding mip-maps are laid out in contiguous 4 KB memory blocks (FIG. 6). Eg: If a texture has 2 base images B0 and B1 and each of the base images have 2 mips associated with them i.e. B0Mip0, B0Mip1 for B0 and B1Mip0, B1Mip1 for B1, then the mips are laid out in memory in the following sequence: B0Mip0, B0Mip1, B1Mip0 and B1Mip1. The Cube textures have 6 base images and the number of base images for a 3D and 2D array texture is specified by the texture-depth and the texture-array-width parameters.

A noteworthy feature of the above layout of mip-maps is that the number of 4 KB tiles in X ($Tiles_x$) and Y direction ($Tiles_y$) of a $LOD_{n+1}$ comes out to be as follows:

$Tiles_x$ of $LOD_{n+1}$=ceil($Tiles_x$ of $LOD_n/2$)

$Tiles_y$ of $LOD_{n+1}$=ceil($Tiles_y$ of $LOD_n/2$)

5.3 Address Calculation
5.3.1 2D Textures

Given the above, the memory address for a Texel at (x, y) in a $LOD_t$ of a 2D texture is calculated as follows:

width=Base-Image-Width.

height=Base-Image-Height.

Tiles$X$[0]=Base-Image-Tiles$X$=Number of Tiles in the Base Image Along $X$-Axis.

Tiles$Y$[0]=Base-Image-Tiles$Y$=Number of Tiles in the Base Image Along $Y$-Axis.

for (int $j$=0;((width>1)&&(height>1));$j$++){ width=width/2; height=height/2;

Tiles$X$[$j$]=Ceil{Tiles$X$[$j$−1]/2};

Tiles$Y$[$j$]=Ceil{Tiles$Y$[$j$−1]/2};}

Base Address of $LOD_t$={$\Sum_{n=0}^{n=t}$(Tiles$x$[$n$]*Tiles$y$[$n$])}*4096+Base Address of $LOD_0$.

Cache-line Address of the Texel at (x,y) in $LOD_t$={$y$[13:(7−$Bppy$)]*pitch$_t$+$x$[13:(7−$Bppx$)]}*4096+{$y$[(6−$Bppy$):3]*8+$x$[(6−$Bppx$)]}*64+Base Address of $LOD_t$ Where pitch$_t$ is the number of tiles in X direction in $LOD_t$, y[a:b] is the part select of 14-bit y from bit position "b" to position "a" in little endian format (Eg: y[1:0] indicates the 2 least significant bits of y) and
x[a:b] is the part select of 14-bit x from bit position "b" to position "a" in little endian format.
The Bppy and Bppx depend on the texture format (Bytes per Texel) and the values are looked up from the following table:

| Bytes Per Texel | Texel Layout in a Tile | Texel Layout in a Cache-Line | Bppx | Bppy |
|---|---|---|---|---|
| 1 | 64 × 64 | 8 × 8 | 1 | 1 |
| 2 | 64 × 32 | 8 × 4 | 1 | 2 |
| 4 | 32 × 32 | 4 × 4 | 2 | 2 |
| 8 | 32 × 16 | 4 × 2 | 2 | 3 |
| 16 | 16 × 16 | 2 × 2 | 3 | 3 |

5.3.2 Cube and 2D Array Textures

The Cube and 2D array textures have multiple base-images. Cube textures have 6 faces (base-images): Positive-X, Negative-X, Positive-Y, Negative-Y, Positive-Z and Negative-Z. Each of the faces has a base image and associated mip-maps. For the Cube and 2D array texture types, the memory address of a Texel at (x, y) in a $LOD_t$ corresponding to the base texture index at depth "D" is calculated as follows:

width=Base-Image-Width.

height=Base-Image-Height.

Tiles$X$[0]=Base-Image-Tiles$X$=Number of Tiles in the Base Image Along $X$-Axis.

Tiles$Y$[0]=Base-Image-Tiles$Y$=Number of Tiles in the Base Image Along $Y$-Axis.

for (int $j$=0;((width>1)&&(height>1));$j$++){ width=width/2; height=height/2;

TilesX[j+1]=Ceil{TilesX[j]/2};

TilesY[j+1]=Ceil{TilesY[j]/2};

} j=Number of Mips per Base-Image.

Base Address of $LOD_t$={$(\Sigma_{n=0}^{n=j}$(TilesX[n]*TilesY[n]))*D*4096}+{{$\Sigma_{n=0}^{n=t}$(TilesX[n]*TileY[n])}*4096}+Base Address of Texture Where "D" indicates the index of the Base Image to which the LOD (being accessed) corresponds.

Cache-line Address of the Texel at position (x,y) in
$LOD_t$={y[13:(7−Bppy)]*pitch$_t$+x[13:(7−Bppx)]}*4096+{y[(6−Bppy):3]*8+x[(6−Bppx)]*64+ Base Address of $LOD_t$ Where pitch$_t$ is the number of tiles in X direction in $LOD_t$,
y[a:b] is the part select of 14-bit y from bit position "b" to position "a" in little endian format (Eg: y[1:0] indicates the 2 least significant bits of y) and
x[a:b] is the part select of 14-bit x from bit position "b" to position "a" in little endian format.
The Bppy and Bppx depend on the texture format (Bytes per Texel) and the values are looked up from the following table:

| Bytes Per Texel | Texel Layout in a Tile | Texel Layout in a Cache-Line | Bppx | Bppy |
|---|---|---|---|---|
| 1 | 64 × 64 | 8 × 8 | 1 | 1 |
| 2 | 64 × 32 | 8 × 4 | 1 | 2 |
| 4 | 32 × 32 | 4 × 4 | 2 | 2 |
| 8 | 32 × 16 | 4 × 2 | 2 | 3 |
| 16 | 16 × 16 | 2 × 2 | 3 | 3 |

3D Textures 3D textures are also arranged in the memory as the multi-base image textures. In case of 2D arrays the base images are all of the same size across the "depth" of the array and each base image has its own set of mip-maps. In case of 3D textures, the base image and the corresponding mip-maps are all considered in three dimensions and the mip-maps shrink in all the three dimensions unlike in 2D arrays where the mip-maps shrink only on width and height. Hence the mip-map1 of a base 3D image of dimensions (Width×Height×Depth) W×H×D will have dimensions of (W/2)×(H/2)×(D/2) and mip-map2 will have dimensions of (W/4)×(H/4)×(D/4) and so on. The memory address of a Texel at (x, y, z) in a LOD "t" of a 3D texture is calculated as follows:

TilesX[0]=Base-Image-at-depth0-TilesX=Number of Tiles in the Base Image at depth 0 along X-Axis.

TilesY[0]=Base-Image-at-depth0-TilesY=Number of Tiles in the Base Image at depth 0 along Y-Axis.

for(int k=0;k<t;k++){ if (Base-Image-Width<=2) {width=1;} else {width=Base-Image-Width/$2^k$;} if (Base-Image-Height<=2) {Height=1;} else {height=Base-Image-Height/$2^k$;} if (Base-Image-Depth<=2) {depth=1;} else {depth=Base-Image-Depth/$2^k$;}

TilesX[k+1]=Ceil{TilesX[k]/2};

TilesY[k+1]=Ceil{TilesY[k]/2};

Tiles=Tiles+TilesX[k]*TilesY[k]*depth;

} width=Base-Image-Width/$2^k$;

height=Base-Image-Height/$2^k$;

Tiles=Tiles+TilesX[k]*TilesY[k]*z;

Base Address of a mip-map slice at
$LOD_t$=Tiles*4096+Base Address of texture;

Cache-line Address of the Texel at position (x,y) in
mip-map slice at $LOD_t$={y[13:(7−Bppy)]*pitch$_t$+x[13:(7−Bppx)]}*4096+{y[(6−Bppy):3]*8+x[(6−Bppx)]*64+Base Address of $LOD_t$ Where pitch$_t$ is the number of tiles in X direction in $LOD_t$,
y[a:b] is the part select of 14-bit y from bit position "b" to position "a" in little endian format (Eg: y[1:0] indicates the 2 least significant bits of y) and
x[a:b] is the part select of 14-bit x from bit position "b" to position "a" in little endian format.
The Bppy and Bppx depend on the texture format (Bytes per Texel) and the values are looked up from the following table:

| Bytes Per Texel | Texel Layout in a Tile | Texel Layout in a Cache-Line | Bppx | Bppy |
|---|---|---|---|---|
| 1 | 64 × 64 | 8 × 8 | 1 | 1 |
| 2 | 64 × 32 | 8 × 4 | 1 | 2 |
| 4 | 32 × 32 | 4 × 4 | 2 | 2 |
| 8 | 32 × 16 | 4 × 2 | 2 | 3 |
| 16 | 16 × 16 | 2 × 2 | 3 | 3 |

6 A Unified GPU User-Mode-Driver Architecture for Cross-API Interoperability and Efficient Workload Scheduling on GPU The conventional Graphics Processing Units (GPU) support a large variety of Application-Programming-Interfaces (API) like DirectX, OpenGL, OpenVG, OpenCL, RenderScript etc. Most of these APIs follow a "SETUP-EXECUTE-CLEANUP" model. The SETUP phase sets up the State, Buffers and Synchronization Events needed by the GPU to process the commands in the EXECUTE phase. In the CLEANUP phase, all the objects created during the setup phase are deleted or freed. A unified User Mode Driver architecture is presented here which allows for sharing of contexts and memory structures across APIs with reduced overhead in the application. It also moves the cross-API interoperability from the application layer to the driver. This allows for an efficient workload scheduling on the GPU by the driver.

Most of the APIs follow a "SETUP-EXECUTE-CLEANUP" model. The SETUP phase sets up the State, Buffers and Synchronization Events needed by the GPU to process the commands in the EXECUTE phase. In the CLEANUP phase, all the objects created during the setup phase are deleted or freed. The API commands for each of these phases are categorized in the rest of this section.

6.1.1 Setup

During the SETUP phase, the API allows for the creation of structures to be used in the EXECUTE phase. The structures can be categorized into the following categories: BUFFERS, STATE, SYNC-EVENTS, COMMAND QUEUES and PROGRAMS/KERNELS.

6.1.1.1 Structures

Buffers

The APIs provide for the definition/creation of 1-D buffers/resources/surfaces. They also provide for the definition of the GPU-view or Resource-view of these buffers. The driver uses this resource-view definition and the GPU access pattern to swizzle the data in the buffers to optimize the buffer accesses from the GPU.

Ex: The glTexImage2D command of OpenGL API carries a 1-D buffer of 2-D Image/Texture. As the data is linearly organized in the DRAM in 4094-byte pages, when a 2-D image is stored linearly in X-Major fashion as a 1-D buffer in DRAM, the pixels of a column of the image will more-often-than-not straddle 64 Byte cache-lines and also multiple DRAM pages. The primitives (Triangles, Lines, Points) in 2-D/Screen Space are processed/rendered by GPUs in 2×2 (quad) blocks of pixels and the texture buffer is accessed for each of the pixels in the quad. If the texture buffer is accessed in its native 1-D layout, the access will straddle multiple 64 Byte Cache-lines and also 4 KB DRAM pages for large textures spanning multiple 4 KB pages. In a simple case this will mean a minimum of 2 cache-line reads for each quad. GPUs typically employ an optimization to cut down these cache-line straddles and DRAM page straddles by storing the linear 1D buffer into another buffer with a tiled layout.

The linear to tiled layout conversion is also handled by a DMA engine in the GPU. Hence, the glTexImage2D command is converted into a DMA command for hardware by the driver.

A. Objectless Buffers

This is the simplest form of buffer setup wherein a buffer is bound statically to a pre-defined buffer target of the pipeline (defined by the API and supported by hardware) as in a state machine. Once setup, the buffer gets docked to the current state of the pipeline and the buffer becomes available for access to all ensuing commands using the target till the buffer is unbound from the target. After a buffer is unbound from a target the implementation needn't guarantee the existence of the buffer with the implementation.

B. Buffer Objects

There are two kinds of buffer objects:

Indirectly-Loaded Buffer Objects

Indirectly-Loaded Buffer Objects are a more advanced form of buffer setup than the objectless buffers, wherein an object is created first with an empty size-less buffer and possibly some state also tied to the buffer. The buffer object is then bound to a pre-defined buffer target of the pipeline (defined by the API and supported by hardware) as in a state machine. The actual buffer contents are then bound to this pre-defined buffer target of the pipeline. These are categorized as Indirectly-Loaded because the buffer object identifier is not used in the command which binds the actual contents of the buffer. The buffer object identifier is indirectly references from the target field in the command.

Eg:
```
//------------------------------------------------------------
// Texture Buffer Object identifier generation.
//------------------------------------------------------------
glGenTextures( 2, &tex); //generates 2 empty size-less buffer object identifiers.
//------------------------------------------------------------
// setting up the first texture object. GL_TEXTURE_2D is the pre-defined
buffer target of the pipeline.
//------------------------------------------------------------
glBindTexture( GL_TEXTURE_2D, tex[0] );
// Setting up the state associated with the buffer object.
glTexParameteri( GL_TEXTURE_2D, GL_TEXTURE_MAG_FILTER,
GL_LINEAR );
glTexParameteri( GL_TEXTURE_2D, GL_TEXTURE_MIN_FILTER,
GL_LINEAR);
// Loading data into the buffer of the buffer object from the source buffer
TextureArray0.
glTexImage2D( GL_TEXTURE_2D, 0, 3, 256, 128, 0, GL_RGB,
GL_UNSIGNED_BYTE, TextureArray0 );
//------------------------------------------------------------
// setting up the second texture object. GL_TEXTURE_2D is the pre-
defined buffer target of the pipeline.
//------------------------------------------------------------
glBindTexture( GL_TEXTURE_2D, tex[1] );
// Setting up the state associated with the buffer object.
glTexParameteri( GL_TEXTURE_2D, GL_TEXTURE_MAG_FILTER,
GL_LINEAR );
glTexParameteri( GL_TEXTURE_2D, GL_TEXTURE_MIN_FILTER,
GL_LINEAR);
// Loading data into the buffer of the buffer object from the source buffer
TextureArray1.
glTexImage2D( GL_TEXTURE_2D, 0, 3, 256, 128, 0, GL_RGB,
GL_UNSIGNED_BYTE, TextureArray1);
```

Directly-Loaded Buffer Objects

Directly-Loaded Buffer Objects are a more advanced form of buffer setup than the objectless buffers, wherein an object is created with a sized buffer and possibly some state also tied to the buffer. The buffer could also be loaded at the time of creation itself. The API commands accessing the buffer object to access the content of the buffer come with the object identifier and hence the objects are directly accessed.

Eg:
cl_mem clCreateBuffer (cl_context context, cl_mem_flags flags, size_t size, void *host_ptr, cl_int *errcode_ret);

The host_ptr points to the buffer in the host space whose contents will be carried by the buffer object created.

Command Queues

The API commands from the application are queued for processing in software command queues by the driver. Some APIs support the explicit definition of these software command queues in a context. The definition of multiple command queues within a context could be used for enabling out-of-order execution of commands. In such cases, where multiple command queues are supported by an API, the commands also carry the destination software command queue identifier. All the commands which need hardware acceleration for execution and also which are order-dependent are taken through the software command queues.

State

The APIs also provide for commands to program the state of the hardware pipeline. There are three kinds of state setup model followed by the APIs:

Objectless State

This is the simplest form of state setup wherein the state parameter of the hardware pipeline is set as in a state-machine. The state programmed affects all the commands using the state thereafter. This style of state setup is typically used in APIs which follow a state-machine model. Eg: OpenGL.

State Objects
Indirectly-Loaded State Object

Indirectly-Loaded State Objects are a more advanced form of state setup than the objectless states, wherein an object is created first with a default state. The state object is then bound to a pre-defined buffer target of the pipeline (defined by the API and supported by the hardware) as in a state machine. The actual state is then programmed to this pre-defined buffer target of the pipeline. These are categorized as Indirectly-Loaded because the state object identifier is not used in the command to program the state. The state object identifier is obtained from the target field in the command.

Directly-Loaded State Object

Directly-Loaded State Object model is a more advanced form of state setup wherein the state is encapsulated in an object which can be bound-unbound-bound etc to the hardware pipeline state without the need of setting up all the parameters of the state during the bind.

Sync-Events

The sync-events are event objects carrying a status field which indicates the status of a command's execution. These event objects can be used to synchronize between commands by using them as a gate to the execution of commands. The event object creation can be done in two ways: Their creation is tied to the queuing of a command.

Also, they could be created stand-alone.

Programs

The programs are the shaders or the kernels.

Setup Commands

The setup of buffer objects, state objects and event objects is done through commands.

Queueable Commands

The setup commands which needn't be returned immediately can be queued into command queues and hence these are categorized as Queueable.

Non-Queueable Commands

The setup commands which need to be returned immediately are labeled Non-Queueable.

a. Direct Commands

Commands which can be executed without the indirection provided by a pre-defined target of the API are Direct commands.

Eg: Below is the clCreateBuffer API command of OpenCL. The expected functionality of the API is to create/allocate a buffer of a given size and return an identifier for the buffer object.

cl_mem clCreateBuffer (cl_context context, cl_mem_flags flags, size_t size, void *host_ptr, cl_int *errcode_ret);

b. Indirect Commands

The setup commands which can't be executed without the indirection provided by a pre-defined target of the API are Indirect Commands.

Eg: Below is the MapBufferRange API command of OpenGL. The expected result of the command is to map a portion of a buffer which is in GPU address space to the CPU address space. Applications use it when they wish to modify/access the contents of a buffer from the CPU.

void *MapBufferRange (enum target, intptr offset, sizeiptr length, bitfield access); This command doesn't carry the buffer id which needs to be mapped. It has to be extracted from the buffer object that is bound to the target defined by the target argument of the call.

6.1.2 Execute

Execute Commands

The execute commands carry the workload for the GPU. The execute commands reference the memory structures organized in the setup stage. Hence, the driver maps all the memory structures referenced by the execute commands into the GPU address space before queuing the execute commands in the hardware command queues.

Eg: glDraw* commands of openGL or clEn-queueNDRangeKernel command of OpenCL.

Queueable Commands

The execute commands which do not expect an immediate return are queuable in the software command queues.

Eg: glDrawElements of OpenGL API, clEn-queueNDRangeKernel of OpenCL API.

Non-Queueable Commands

The execute commands which expect an immediate return are non-queuable. These commands are queued in the single-entry global command queue. Eg: glFinish or glFlush of OpenGL.

6.1.3 Cleanup

In the cleanup phase, the structures created for execution are freed. The freeing up of a structure requires the release of the structure from both the application and also the implementation (driver and hardware). The freeing up of a structure is initiated by the application signaling the release of the structure from the application side. The driver deletes the structure if the hardware has also released the structure. If the hardware release is pending, the driver waits for the hardware to release the structure by queuing the freeing-up task as a deferred-command in the deferred task queue. The deferred task queue is a global queue for all the APIs. Hence, the deferred commands from all the runtimes get queued in this global queue. The command scheduler picks the commands from the deferred task queues as well for arbitration.

6.2 Interoperability

The interoperability and communication between the APIs is usually managed by the application. A GPU User Mode Driver architecture is presented below which allows the usage of multiple APIs with a shared context and to move the synchronization between APIs to the implementation from the application. This helps in reducing the API overhead for cross-referencing of memory structures across APIs and context switching.

The unified User Mode Driver architecture allows for:
 a. Sharing of contexts and all the memory structures across contexts with little API overhead in the application.
 b. Cross-API interoperability.
 c. Efficient mapping of workload onto hardware for better performance. There are instances when an execute command needs to be synchronized with the completion of some previous execute commands. The application handles such cases by either
  1. issuing a flush before the dependent commands or
  2. by creating events on the source commands and tag these events to the dependent command. Eg: A, B and C are three commands where C has to be issued to the hardware only after A and B are executed completely. In this case, the application creates A and B with an events, say Ea and Eb respectively. The application then issues command C tagged with an event wait list carrying Ea and Eb. The driver waits for the signaling of Ea and Eb before issuing the command C to the hardware command queue.

The issue with both the above methods is that the hardware might be under-utilized in both cases because:
1. When using the flush, if the commands before the flush are long-latency commands which require very little throughput from the cores in the GPU, then the cores could end-up lightly loaded with threads. This is under-utilization of the GPU.

2. When using event based synchronization of commands, if the commands before the dependent command are again long-latency commands requiring very little throughput from the cores in the GPU, then the cores could again end-up lightly loaded with threads resulting in under-utilization of GPU.

By moving the synchronization to the driver from the application, the application can jam as much of execute commands into the driver with multiple command queues and the driver can optimally distribute the load on the GPU.

6.3 Unified User Mode Driver Architecture

6.3.1 Memory Structures

A global parent context object hosts the lists of all the memory structures (context objects, buffer objects, state objects, program objects, event objects, command queue objects and deferred tasks). The objects of a type created by different runtimes (belonging to different APIs) are all listed in a common list i.e. all the lists hosted by the parent context object are global.

The buffer object list is a linked list of buffer objects created by all the runtimes used by the application. The buffer object identifiers are returned to the application and the application uses them to reference the buffer objects. The buffer objects can carry state as well.

The state object list is a linked list of state objects created by all the runtimes used by the application. The runtimes register all the different kinds of classes supported by them with the object manager in the services layer of the UMD at initialization time.

The program object list is a linked list of program objects and kernel objects. A program is a collection of kernels. When the program is compiled, the compiler returns the table of kernel functions which constitute the program and their corresponding byte code pointers. The program object carries this table and the kernel objects carry the state and kernel byte code buffer pointers. Shown below is an example program object list. It contains two program objects followed by their respective child kernel objects.

The event object list is a linked list of event objects which carry a state indicating the status of execution of a command. Each command en-queued in the software command buffers also carries the events that are tagged to the command. The driver updates the state of the events wherever required and then the driver also en-queues special memory write commands to the hardware command queue to pipeline the hardware execution status update of the command from the hardware.

The command queue list maintained by the parent context is a list of software command queues created by different runtimes (APIs). An implicit software command queue is created for every runtime (API) which does not support explicit command queues. All the commands from these APIs which do not support explicit command queues are queued into their respective implicit command queues. The head of the command queue list is a single-entry command queue called Queue-Zero which is used to en-queue commands which need to be immediately returned and requires back-end layer processing. The hardware command queues carry the commands to be executed by the hardware.

There are reference counts associated with all the object types. The User Mode Driver uses these reference counts to manage the object deletion (described in the next sections). The object types which cannot be accessed by hardware i.e. context objects, command queue objects and state objects have only two reference counts: application-reference-count (app-ref-cnt) and driver-reference-count (drv-ref-cnt). The application controls the app-ref-cnt using retain/release commands on an object. The drv-ref-cnt is managed by the user mode driver. The drv-ref-cnt is incremented by the UMD on enqueuing a command referencing the object in a software command queue. The drv-ref-cnt is then decremented when the command is popped out of the command queue for further processing. The object types which can be accessed by hardware i.e. buffer objects, event objects and program objects have two additional reference counts along with app-ref-cnt and drv-ref-cnt: hardware-en-queue-reference-count (hw-enq-ref-cnt) and hardware-release-reference-count (hw-rel-ref-cnt). The hw-enq-ref-cnt of an object is incremented by the driver when a command referencing the object is en-queued in the hardware command queue. The hardware increments the hw-rel-ref-cnt upon the successful execution of the command in the hardware command queue.

The deferred tasks list is a list of pre-defined tasks of freeing up an object which need to be put on wait till the hardware signals the release of the structure associated with the object.

6.3.2 User Mode Driver

The user mode driver presented below is divided into three layers.

A. Front-End.

The front-end layer is the top-most layer which receives all the API commands. The layer does the essential pre-processing of the received API commands before forwarding them down to the back-end layer.

b. Services.

The services layer offers various services for the front-end and back-end layers to process the API commands. The services layer manages all the memory structures across all the APIs. It also exports a compiler which the front-end layer uses to compile all the kernels in high-level languages. The services layer also exports functions for managing the GPU address space.

C. Back-End.

The bottom-most layer of the User-Mode piece of the driver, the back-end layer converts the commands picked by the scheduler from the software command queues into hardware commands and en-queues them in the hardware command queues for execution. The back-end layer also ensures all the memory referenced by the commands in the hardware command queues are mapped to the GPU address space using the functions exported by the Resource-Manager in the services layer.

6.3.2.1 Front-End

The Front-End layer is the entry point for all the API commands. The layer includes the following functionality:

1. Sanity Check: The first step in the processing of any API command: commands are processed for correctness. The API commands are checked if the arguments carry a valid value etc. If a command fails the sanity check, an appropriate status defined by the API is returned to the application immediately. The commands which pass the sanity check are taken to the next level of processing.

2. Object Creation and Management: All API commands which create objects (buffer objects, state objects, program objects, command queue objects and event objects) are processed in the front-end layer. The Object Manager block in the services layer is invoked for the creation of objects. The object manager maintains the list of objects in a global context structure for all APIs.

If the object creation command also carries the object state or contents, the command is queued in the appropriate software command queue. The directly-loaded state and buffer objects use object creation commands which carry the object contents.

Eg: clCreateBuffer of OpenCL carries the size of the buffer to be allocated and could also carry the content of the buffer. Also the command expects an immediate return. Hence, the command is queued to a global single-entry implicit software command queue and the command scheduler service in the services layer invoked. The command scheduler checks the global single-entry software command queue before beginning the arbitration of the commands from other command queues. Hence, the scheduler picks the clCreateBuffer command in this command queue and forwards it to the back-end layer for processing.

The object creation commands which do not carry the object contents are not en-queued to the software command queues. The indirectly-loaded state and indirectly-loaded buffer objects use object creation commands which do not carry the object contents. Eg: glGenBuffers of OpenGL.

The app-ref-cnt of the created object is initialized to one by the front-end. The app-ref-cnt is incremented and decremented by the front-end for every increment and decrement command from the application for the object.

3. State Setup: The setup commands which carry the state for all the three kinds of state structures: objectless, indirectly-loaded and directly loaded state objects are queued to the appropriate software command queue. The state object creation commands follow the same steps described in (2) above.

4. Program Object Processing: All program object processing like object creation and compilation are taken up by the front-end layer using the compiler in the services layer. The compiler is invoked with the source program which could be a collection of kernels. The compiler compiles the program and returns a table carrying the kernel names and the size of the byte code for each of these kernels. The front-end layer than allocates the kernel objects using the Object Manager in the layer for each kernel. The front-end then allocates a destination buffer for the byte code of each kernel using the Resource Manager block in the services layer. These buffers are loaded into the respective kernel objects.

5. Software Command Queue Loading: All queuable APIs are loaded in the software command queues. The API commands which do not carry the command queue identifier are loaded into an implicit command queue for the API. The API commands which are non-queuable and require to be processed by the backend are queued into the Queue-Zero. A sequence identifier is acquired using the services layer for each command and this sequence identifier is tagged with the command while en-queuing a command in the command queues. Also tagged with the enqueued command is an event-wait-list which is basically a list of event objects which need to signal a "GO" for the command to be executed by the hardware. After a command is enqueued to a command queue, the drv-ref-cnt of all the referenced objects with the command are incremented the command scheduler is invoked in the services layer. The sequence identifier is used by the command scheduler while picking commands from the command queue list. The scheduler checks the sequence identifier of all the commands at the top of all the command queues and picks the command with the smallest sequence identifier (the smallest indicates the earliest). The scheduler then parses the event objects in the event-wait-list to check if all the events are signaling a "GO". If it detects a "GO" from all the events, the command is forwarded for processing with the back-end. The back-end decrements the drv-ref-cnt for the objects referenced by the command.

6. State Queries: All state query API commands are executed in the front-end layer.

7. API State Machine: For APIs which use the state machine model (Eg. OpenGL), a state machine is maintained with the run-time. The state setting commands (objectless, directly loaded and indirectly loaded) set the state of this state machine. A similar state machine is maintained in the back-end as well. The front-end state machine is used to completely execute state query commands in the front-end layer.

6.3.2.2 Services

The services layer has the following blocks:

A. Compiler: The Front-End invokes the Compiler for compiling the Kernels, Programs, or Shaders with the input source code. A program is a collection of one or more kernels. The compiler returns a table carrying the kernels in the program and the size of the output byte code for each of the kernels. The front-end allocates the program and kernel objects using the Object Manager Block in the services layer and also allocates the buffers for the output byte code for each of the kernels using the Resource Manager block in the services layer. The front-end then copies the byte code of each of the kernel to these buffers and loads the buffer pointers in the respective kernel objects.

B. Command Scheduler: The command scheduler is a software arbiter scheduling commands from various command queues of a context. Each command queued in the command queues is assigned a unique sequence identifier. The command scheduler uses this identifier to pick the commands for scheduling. The sequence identifier of all the commands at the top of all the command queues is checked and the command with the smallest sequence identifier is picked for scheduling. The scheduler then checks the status of all the event objects in the event-wait-list tagged with the command. If all the event objects signal a "GO", the command is forwarded for further processing by the back-end. The command scheduler returns to check and pick the next command in the command queues. The command scheduler continues this arbitration for commands in the command queues till it finds no more commands ready for execution. At this point the command scheduler returns the control back to the block which invoked the command scheduler.

Queue-Zero (the first command queue in the command queue list) gets the highest priority over all the other command queues in the command queue list. The command scheduler checks the queue-zero before beginning the arbitration of the commands from other command queues.

C. Object Manager (OM): The object manager provides for the object creation and deletion services to the front-end layer. The object manager creates a global parent context object on the first invocation from the front-end layer. This object hosts the lists of global context objects, global command queue objects, global state objects, global event objects and global program objects. All these object lists are global i.e. the objects of a type created by all the runtimes are listed into one common list of the object type. All objects maintain four reference counts: One for the application (app-ref-cnt), one for the driver (drv-ref-cnt) and two for the hardware (hw-enq-ref-cnt and hw-rel-ref-cnt). The app-ref-cnt is incremented and decremented by appropriate increment and decrement API commands. The drv-ref-cnt is increment for all the objects being referenced by a command at the time of enqueue to the software command queue. The drv-ref-cnt is decremented when a command is popped out by the command scheduler for forward processing. The hw-enq-ref-cnt is incremented by the backend layer when an object is queued for reference by the hardware. Also, the backend layer queues a memory write command to the hardware command queue to update the hw-rel-ref-cnt. The hw-enq-ref-cnt and hw-rel-ref-cnt match indicates the complete hardware release of the object.

The Objects creation returns an Integer Identifier for the object. This identifier is returned to the application which then uses it for any future reference to the object.

D. Resource Manager (RM): The resource manager provides the functions for memory allocations in the GPU address space. These allocations are used for buffers, compiler output buffers and hardware command queues. The resource manager also provides the functions to map and un-map the buffers between GPU and CPU address spaces. The Front-End layer invokes the RM for non-queuable buffer object create commands and kernel object buffer allocation. The command Scheduler invokes the RM to allocate memory for hardware command queues. The back-end layer invokes the RM for all queuable buffer object creation commands and to map and un-map the allocations in the GPU and CPU address spaces.

E. Miscellaneous services: The miscellaneous services block provides the following services:
  Generates the sequence identifiers for commands in the command queue. The front-end layer tags the identifier with each command it en-queues in the software command queues.
  Function for processing the deferred task list.
  ObjectFreeup process. This deferred task list processing function uses the ObjectFreeup process to free up the objects and related memory structures.

6.3.2.3 Back-End

The back-end layer provides the functions for processing the commands picked by the scheduler from the command queues. The back-end layer uses a set of functions exported by the hardware abstraction layer (HAL) to program the hardware-native commands in the hardware command queue.

The back-end layer also holds the state machine for all the supported APIs. The objectless state setup commands set the state in these state machines. The directly-loaded or indirectly-loaded state setup commands set the state in the state objects managed by the object manager (OM).

The buffer setup commands are processed by first invoking the RM for buffer allocations and mapping the allocations to the GPU address space and then a command is queued in the hardware command queue for DMA.

The execute commands are processed by first loading all the hardware-state set-up commands and then the execute commands in the hardware command queue.

6.3.3 Execution Flow

The API commands can be broadly classified into the following categories:
a. Object Creation (Eg: glGenBuffers( ))
b. State Query (Eg: IsTexture( ))
c. Program Compilation (Eg: CompileShader( ))
d. State Setup (Eg: clSetKernelArg( ))
e. Buffer Setup (Eg: clCreateBuffer( ))
f. Execute (Eg: clEnqueueNDRangeKernel( ))
g. Cleanup (Eg: clReleaseMemObject( ))

Figure 44:
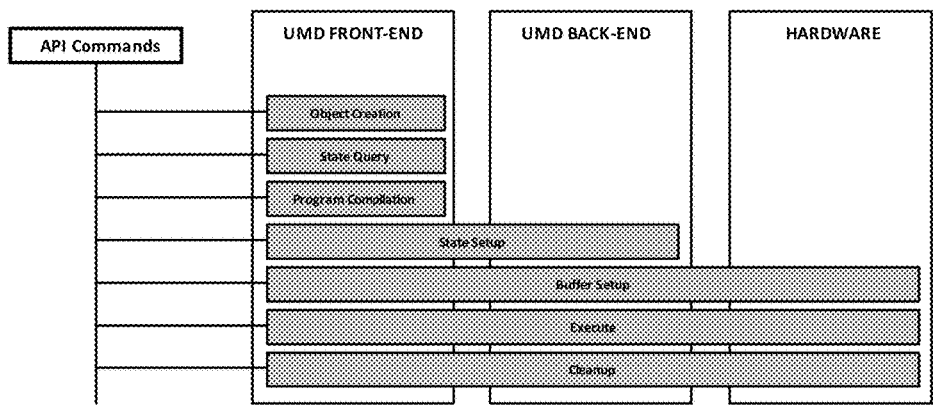
FIG. 44 shows an embodiment of efficient graph processing.

The FIG. 44 depicts the mapping of the above categories to the implementation (Driver and Hardware).

6.3.3.1 Object Creation

The object creation commands are entirely executed in the front-end layer. The API runtime invokes the object manager for object creation commands. The object manager creates an object and returns a handle for the object to the runtime. The runtime returns the object handle back to the application. The object manager maintains an object linked list for each object type in a global parent context.

Figure 45:
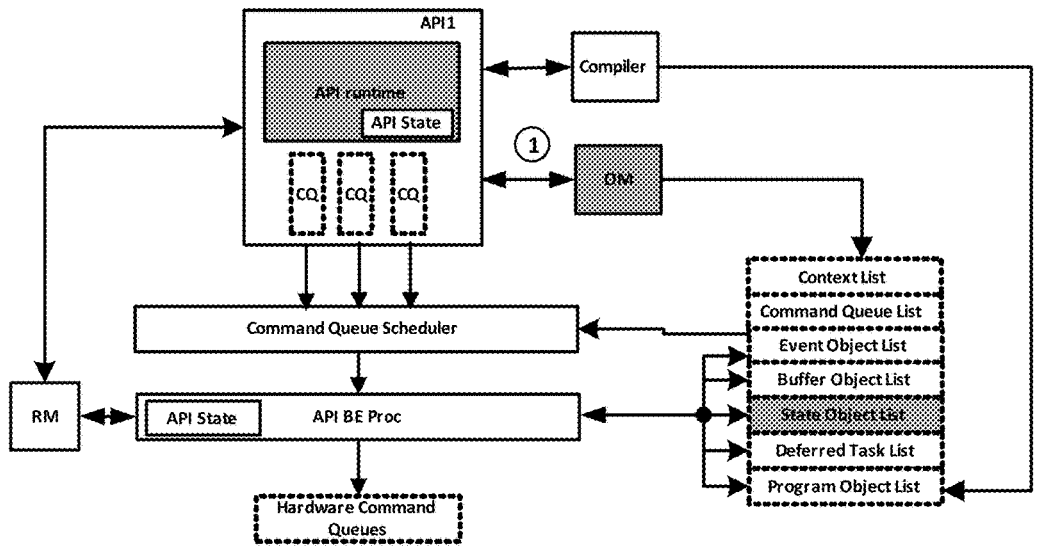
FIG. 45 shows an embodiment of efficient graph processing.

The FIG. 45 highlights the blocks in the UMD which are invoked during the processing of the Object Creation API commands.

6.3.3.2 State Query

The state query commands are also completely processed in the front-end layer. If the state query command is a direct state query, then it carries the state object handle. The runtime reads the contents of the state object and returns the relevant state to the application. For indirect query, the command will carry the target in the API state. In this case, the runtime obtains the object handle from the target in its API state.

Figure 46:
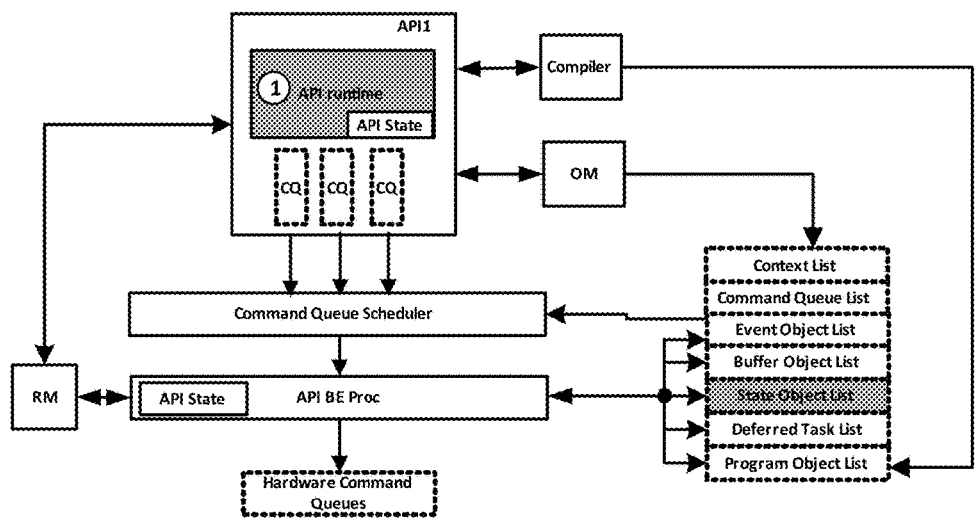
FIG. 46 shows an embodiment of efficient graph processing.

The FIG. 46 highlights the blocks in the UMD which are used for the execution of a Query State command.

6.3.3.3 Program Compilation

When the compile command is received, the runtime invokes the compiler with the source code for the program. A program is a collection of kernels. The compiler returns a table carrying the kernel function names which are part of the program, their byte code sizes and relevant state. The runtime then allocates a program object and a kernel object for each of the kernel in the table returned by the compiler using the Object manager in the services layer. After the object allocation, the runtime allocates a buffer for each of the kernel object using the resource manager in the services layer. The size of the buffer is the byte code size in the table returned by the compiler. The runtime then copies the byte code into each of these buffers from the compilers output.

Figure 47:
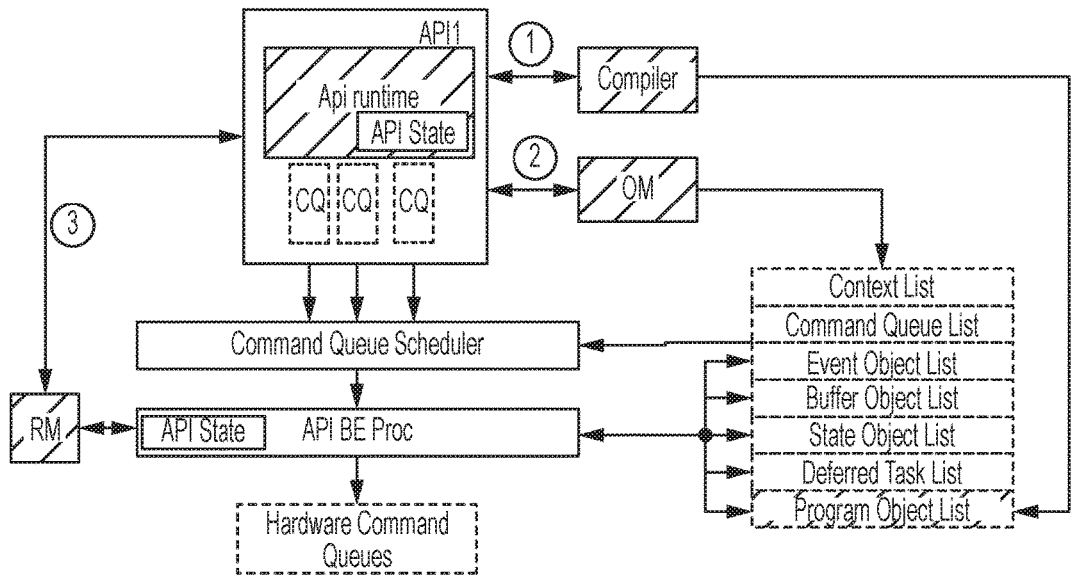
FIG. 47 shows an embodiment of efficient graph processing.

The FIG. 47 highlights the blocks in the UMD used for the execution of the compile command.

6.3.3.4 State Setup

For objectless state setup, the runtime sets the API state it maintains and en-queues the command in the software command queue. When the backend layer receives the command from the command scheduler, it sets the API state it maintains in the backend layer.

For indirect state objects, the state setup command is en-queued in the software command queue. When the backend layer receives this command from the command scheduler, it obtains the state object handle from the target in the API state and sets the state in the state object.

For direct state objects, the state setup command is en-queued in the software command queue. When the backend layer receives this command from the command scheduler, it obtains the state object handle from the command itself and sets the state in the state object.

Figure 48:
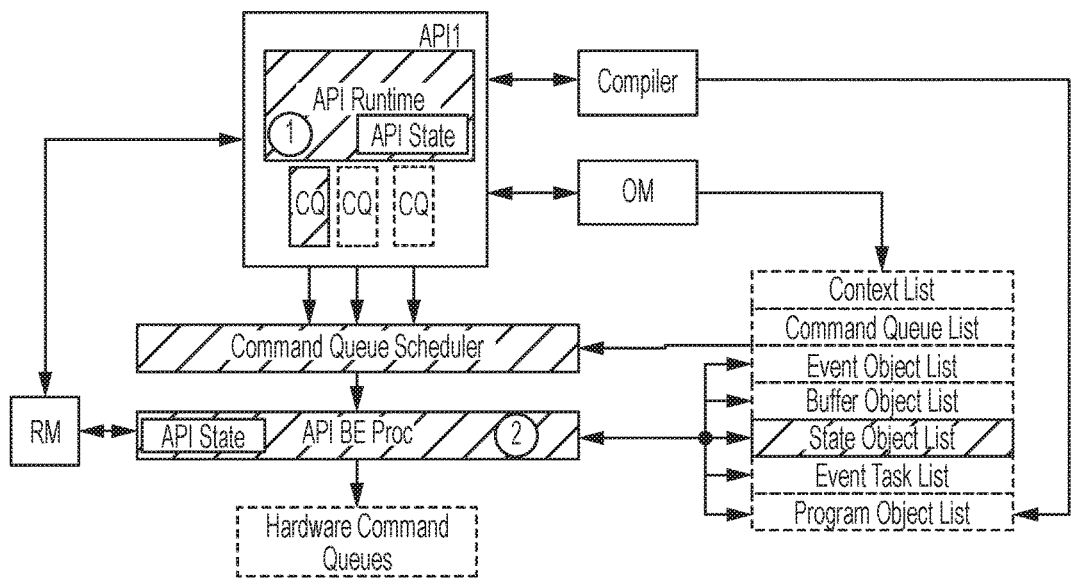
FIG. 48 shows an embodiment of efficient graph processing.

The FIG. 48 highlights the blocks in the UMD which are used for the processing of the state setup commands.

6.3.3.5 Buffer Object Setup

The objectless buffer setup commands are en-queued in the software command queue by the front-end layer. The back-end layer allocates the buffer using the resource manager block in the services layer and loads a DMA command in the hardware command queue if a copy is required to the buffer allocated.

The indirect buffer setup commands are en-queued in the software command queue by the front-end layer. The back-end layer allocates the buffer using the resource manager block in the services layer and loads the buffer pointer to the buffer object attached to the back-end API state target in the command. After this, a DMA command is en-queued to the hardware command queue if a copy is required to the buffer allocated.

The direct buffer setup commands are en-queued in the software command queue by the front-end layer. The back-end layer allocates the buffer using the resource manager block in the services layer and loads the buffer pointer to the buffer object pointed by the buffer object handle in the command. After this, a DMA command is en-queued to the hardware command queue if a copy is required to the buffer allocated.

Figure 49:
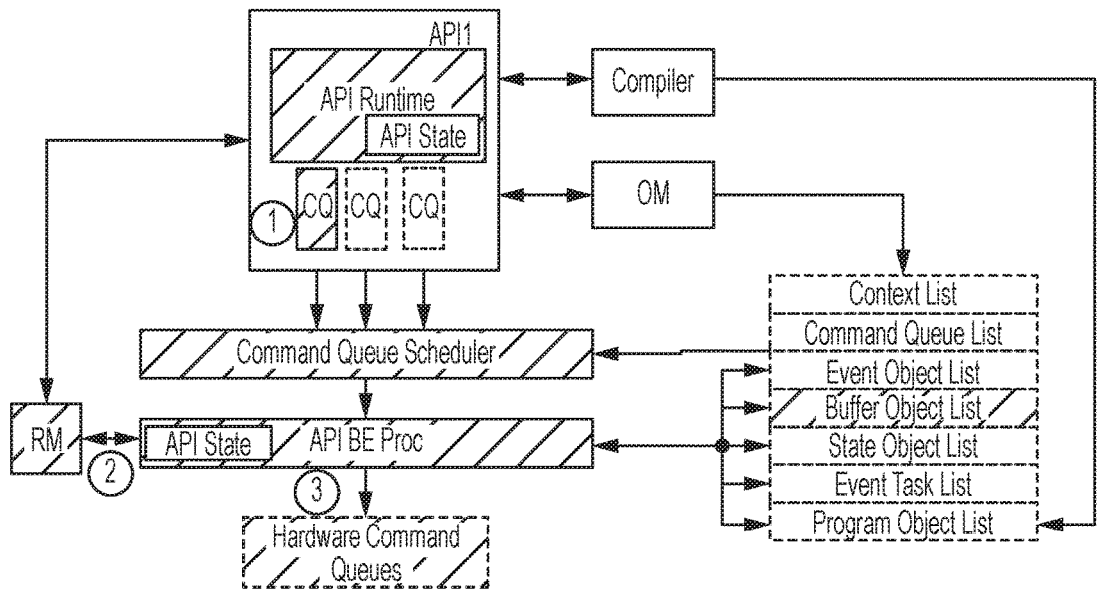
FIG. 49 shows an embodiment of efficient graph processing.

The FIG. 49 highlights the blocks in the UMD which are used for the processing of buffer setup commands.

6.3.3.6 Execute

The execute commands are loaded in the software command queue by the front-end layer. When the backend layer receives an execute command, it first en-queues all the hardware state setting commands in the hardware command queue. While en-queuing the hardware state commands it also invokes the resource manager to map all the buffers and memory structures referenced by these commands to the GPU address space. And finally, the execute command is en-queued to the command queue.

For a flush or finish command, the front-end puts the command in the software command queue and invokes the command scheduler. It also signals the command scheduler to return the control back when it schedules the flush or finish from the command queue to the back-end. For a flush command the front-end returns here. For a finish command, the front-end returns after a signal from hardware is received indicating the completion of execution of all the commands in the command queue. When a flush or a finish command is received by the backend layer, it en-queues a memory write command in the hardware command queue and forwards the hardware command queue to kernel mode driver which then triggers the hardware to execute the hardware command queue.

Figure 50:
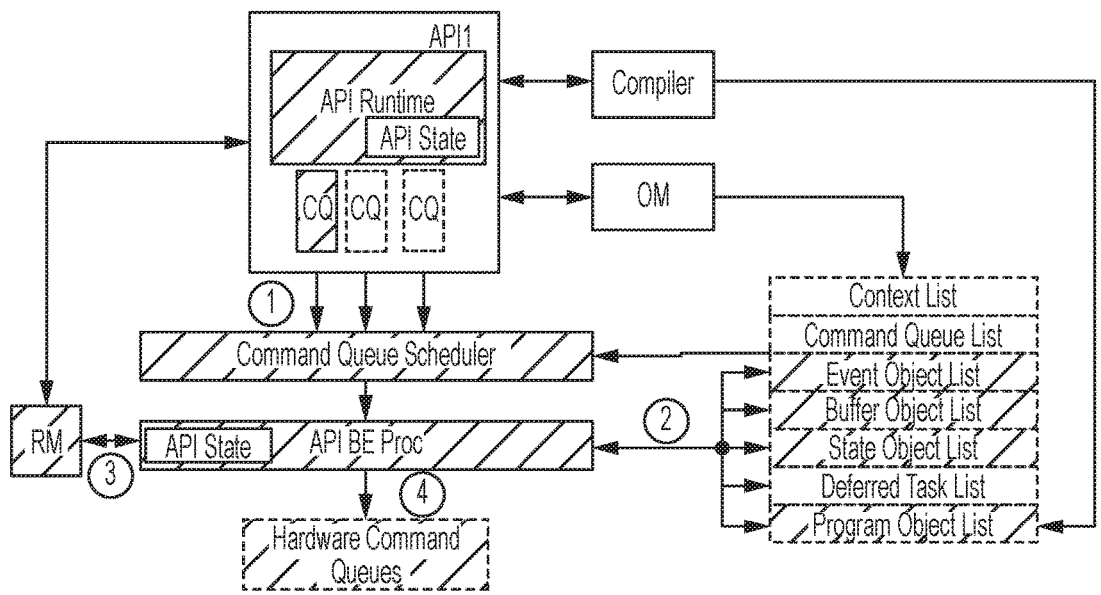
FIG. 50 shows an embodiment of efficient graph processing.
Figure 51:
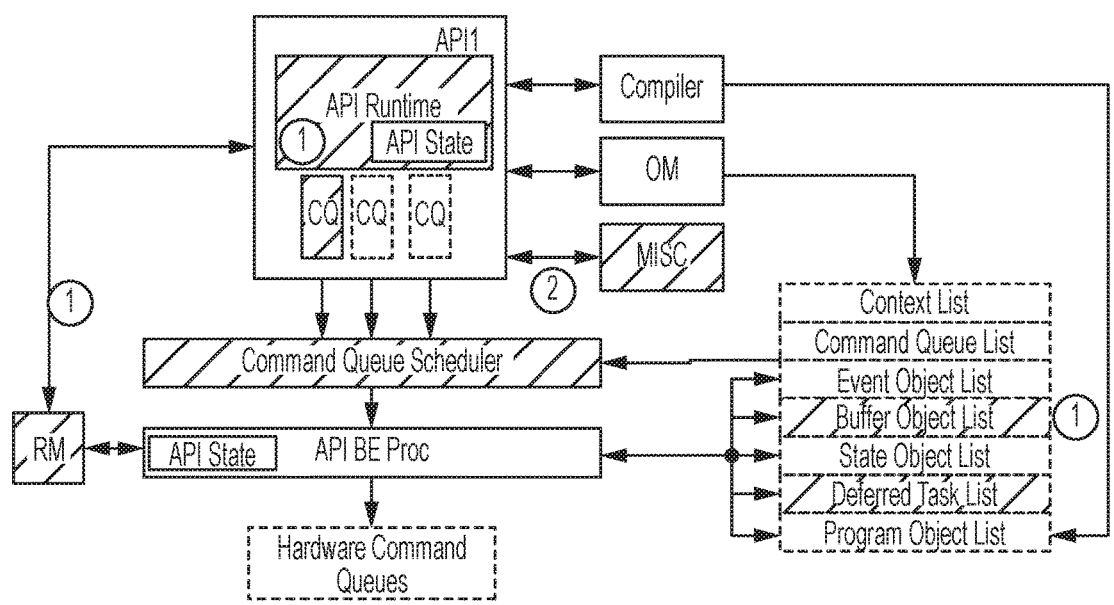
FIG. 51 shows an embodiment of efficient graph processing.

The FIG. 50 highlights the blocks active in the UMD while processing the execute commands.

6.3.3.7 Cleanup

The application issues an object-delete or release command to free up an object and when this command is received by the front-end layer it decrements the app-ref-cnt of the object. If the app-ref-cnt gets cleared on the decrement, the front-end checks the drv-ref-cnt of the object. If drv-ref-cnt is non-zero, then a deferred task is queued to the deferred task list. If the drv-ref-cnt is also cleared, then the hardware reference counts of the object are compared. If they do not match in the comparison, a deferred task is again queued to the deferred task list. If the counts match, then the object is freed using the OM and RM in the services layer.

The command scheduler uses the "objectfreeup" process in the MISC block while processing the deferred task list. The objectfreeup function compares the hardware reference counts and also checks drv-ref-cnt. If the hardware reference counts match and the drv-ref-cnt is zero, then the objectfreeup routine frees the object using the OM and RM.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed:

1. A system for executing code, comprising:
    a plurality of nodes with one or more processors operative to process a plurality of code blocks generated by a compiler;
    a memory comprising data buffers to store data associated with each of the plurality of nodes, constant buffers to store data constants required for each of the plurality of nodes, command buffers to store an index indicating location of data in data buffers, and a code block buffer to store the plurality of code blocks; and
    a scheduler to retrieve the plurality of code blocks from the code block buffer, and schedule execution of the plurality of code blocks across plurality of nodes, and coupled to a plurality of the command buffers;
    the scheduler comprising a plurality of stages and the plurality of command buffers located between each of the plurality of stages;
    wherein each stage includes a physical hardware operative to schedule each of the plurality of code blocks across one or more of the plurality of nodes, wherein the plurality of nodes are configured in a logical network topology;
    wherein the plurality of nodes comprises one or more threads with each thread running a same code block but on different data and producing different output data;
    the scheduler further retrieves initial values of the index from the plurality of command buffers generated and stored by the compiler;
    wherein each stage of the scheduler is operative to interpret commands within a corresponding input command buffer and generate the plurality of threads, execute thread blocks processing indexed data, and the scheduler dispatches instances of at least one of the plurality of nodes for execution;
    wherein dispatching is triggered by execution of a special code embedded in the plurality of code blocks and updating the index to the command buffer, the index storing location in the data buffers for receiving data by the at least one of the plurality of nodes.

2. The system of claim 1, where in the index indicates location of data output to a node and the index to the location of data input to the node is computed.

3. The system of claim 1 wherein each of the data buffers is associated with at least two of the plurality of nodes, where in the results of execution of a first node is written to a first data buffer and the data for second node is read from the first data buffer.

4. The system of claim 3, wherein data for a third node is read from the first data buffer.

5. The system of claim 1, wherein the scheduler further provides a pointer to a code block.

6. The system of claim 1, where in a portion of the scheduler is implemented in hardware.

7. The system of claim 1, where in the scheduler provides information about a task to be performed and location of input data in the command buffer.

8. The system of claim 1, wherein each of the plurality of stages further comprises an input command buffer and an output command buffer.

9. The system of claim 1, wherein each of the plurality of stages is associated with one or more of the plurality of nodes.

10. The system of claim 1, wherein each node of the plurality of nodes has a depth associated herewith, wherein each node of the plurality of nodes of a same depth is associated with a same stage.

11. The system of claim 10, a plurality of first nodes of a first depth provide data to a second node of a second depth, a node of the first depth providing data last spawns a process in the second node of the second depth, where the second depth is larger than the first depth.

12. The system of claim 10, wherein at least one of the instances of first nodes of a first depth is executed before the spawning a process in a second node of a second depth, where the second depth is larger than the first depth.

13. The system of claim 10, wherein all instances of the plurality of nodes providing data to nodes in later stages are scheduled to execute before a node in a next stage is scheduled.

14. The system of claim 1, wherein one or more of the plurality of nodes receive input from more than one node, a node that provides data last spawns a process in a next node.

15. The system of claim 1, wherein the logical network topology a logical network is includes a directed acyclical graph comprising the plurality of stages.

16. The system of claim 1, wherein the logical network topology of a logical network includes a top node, a terminal node and a plurality of intermediate nodes connected between the top node and the terminal node.

17. The system of claim 16, where in an instance of the top node is scheduled to execute before the plurality of intermediate nodes or the terminal node.

18. The system of claim 16, where in the nodes output data to the data buffer.

19. The system of claim 16, wherein terminal node outputs a result.

20. A method comprising:
processing, by a plurality of nodes with one or more processors, a plurality of code blocks generated by a compiler;
storing data associated with each of the plurality of nodes, by a memory, wherein the memory comprises data buffers, constant buffers to store data constants required for each of the plurality of nodes, command buffers to store an index indicating location of data in data buffers, and a code block buffer to store the plurality of code blocks;
retrieving, by a scheduler, the plurality of code blocks from the code block buffer, and scheduling execution of the plurality of code blocks across plurality of nodes, wherein the scheduler is coupled to a plurality of the command buffers;
wherein the scheduler comprising a plurality of stages and the plurality of command buffers are located between each of the plurality of stages;
wherein each stage includes a physical hardware operative to schedule each of the plurality of code blocks across one or more of the plurality of nodes, wherein the plurality of nodes are configured in a logical network topology;
wherein the plurality of nodes comprises one or more threads with each thread running a same code block but on different data and producing different output data;
retrieving, by the scheduler, initial values of the index from the plurality of command buffers generated and stored by the compiler;
interpreting commands, by each stage of the scheduler, within a corresponding input command buffer and generating the plurality of threads, executing thread blocks processing indexed data, and dispatching, by the scheduler, instances of at least one of the plurality of nodes for execution;
wherein dispatching is triggered by execution of a special code embedded in the plurality of code blocks and updating the index to the command buffer, the index storing location in the data buffers for receiving data by the at least one of the plurality of nodes.

21. The method of claim 20, further comprises scheduling a thread in a first node.

22. The method of claim 21, further comprising executing at least an instance of the first node before scheduling a thread in other nodes.

23. The method of claim 21, checking if data for a next node is ready before scheduling a next node for execution.

* * * * *